(12) United States Patent
Mukae

(10) Patent No.: US 12,269,620 B2
(45) Date of Patent: Apr. 8, 2025

(54) SPACE TRAFFIC MANAGEMENT SYSTEM, SPACE TRAFFIC MANAGEMENT DEVICE, AND TERMINAL

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 323 days.

(21) Appl. No.: 17/770,301

(22) PCT Filed: Nov. 26, 2020

(86) PCT No.: PCT/JP2020/044108
§ 371 (c)(1),
(2) Date: Sep. 28, 2022

(87) PCT Pub. No.: WO2021/107051
PCT Pub. Date: Jun. 3, 2021

(65) Prior Publication Data
US 2023/0010570 A1 Jan. 12, 2023

(30) Foreign Application Priority Data
Nov. 28, 2019 (JP) .................................. 2019-215665

(51) Int. Cl.
*B64G 1/10* (2006.01)
*B64G 1/24* (2006.01)
(Continued)

(52) U.S. Cl.
CPC ............. *B64G 3/00* (2013.01); *B64G 1/1085* (2013.01); *B64G 1/242* (2013.01); *G08G 7/02* (2013.01)

(58) Field of Classification Search
CPC ........ B64G 3/00; B64G 1/1085; B64G 1/242; B64G 1/2429; B64G 1/68; G08G 7/02;
(Continued)

(56) References Cited

U.S. PATENT DOCUMENTS

2013/0124079 A1* 5/2013 Olivier ..................... B64G 3/00
701/301
2013/0275036 A1* 10/2013 Olivier ................... B64G 1/242
701/301
(Continued)

FOREIGN PATENT DOCUMENTS

EP 3493428 A1 6/2019
JP 2017-114159 A 6/2017

OTHER PUBLICATIONS

Extended European Search Report issued May 4, 2023 in European Patent Application No. 20893287.1, 14 pages.
(Continued)

*Primary Examiner* — Adam R Mott
*Assistant Examiner* — Heather J Keniry
(74) *Attorney, Agent, or Firm* — XSENSUS LLP

(57) ABSTRACT

To achieve an objective to enable a plurality of management business operators managing space objects flying in space, to share and carry out danger analysis efficiently. In a space traffic management system, a plurality of space traffic management devices are connected to each other via a communication line. Each of the plurality of space traffic management devices includes a space information recorder, a danger alarm device, a danger analysis device, a danger avoidance action assist device, and a security device. The space information recorder includes a space object ID, orbital information, and public condition information; and a business device ID and public condition information. The plurality of space traffic management devices have data format compatibility and share the space object ID and the
(Continued)

business device ID, and share orbital information corresponding to the space object ID among business devices that comply with the public condition information.

22 Claims, 44 Drawing Sheets

(51) Int. Cl.
    *B64G 1/68*         (2006.01)
    *B64G 3/00*         (2006.01)
    *G01S 13/933*     (2020.01)
    *G08G 7/02*         (2006.01)
    *H04B 7/185*      (2006.01)

(58) Field of Classification Search
    CPC .............. G01S 13/933; H04B 7/18519; H04B 7/18521
    See application file for complete search history.

(56) References Cited

U.S. PATENT DOCUMENTS

| | | |
|---|---|---|
| 2016/0188176 A1 | 6/2016 | Runnels |
| 2018/0022474 A1 | 1/2018 | Meek |
| 2018/0305042 A1 | 10/2018 | Vaughan et al. |
| 2018/0346153 A1 | 12/2018 | Kaplan |
| 2018/0370658 A1 | 12/2018 | Amimoto et al. |
| 2022/0247678 A1 | 8/2022 | Atwal et al. |
| 2023/0052469 A1* | 2/2023 | Mukae ................. B64G 1/1085 |

OTHER PUBLICATIONS

Office Action issued on May 17, 2024, in corresponding co-pending U.S. Appl. No. 17/770,310, 24 pages.
William L. Stefanov et al., "The International Space Station: A Unique Platform for Remote Sensing of Natural Disasters", 2012, pp. 108-111, total 4 pages.
U.S. Office Action issued Sep. 24, 2024 in co-pending U.S. Appl. No. 17/770,310, 60 pages.
International Search Report and Written Opinion mailed on Feb. 9, 2021, received for PCT Application PCT/JP2020/044108, Filed on Nov. 26, 2020, 12 pages including English Translation.
International Search Report and Written Opinion mailed on Feb. 9, 2021, received for PCT Application PCT/JP2020/044115, Filed on Nov. 26, 2020, 13 pages including English Translation.
Office Action issued Dec. 11, 2024 in European Patent Application No. 20 893 287.1, 5 pages.

* cited by examiner

Fig. 10

51: ORBIT PREDICTION INFORMATION
512: PREDICTED EPOCH   513: PREDICTED ORBITAL ELEMENTS   514: PREDICTED ERRORS
511: SPACE OBJECT ID
52: SATELLITE ORBIT PREDICTION INFORMATION
53: DEBRIS ORBIT PREDICTION INFORMATION

| Satellite Debris ID | | Epoch | Keplerian 6 Orbital Elements | | | | | | Predicted Error | | |
|---|---|---|---|---|---|---|---|---|---|---|---|
| | | | Mean Motion | Eccentricity | Inclination | Right Ascension of Ascending Node RAAN | Argument of Perigee | Mean Anomaly | Traveling Direction | Orthogonal Direction | Basis |
| | | Year and Day | Orbiting per Day | No Unit | deg | deg | deg | deg | km | km | |
| A | | a1 | a2 | a3 | a4 | a5 | a6 | a7 | a8 | a9 | On-Orbit Measurement Value |
| B | | b1 | b2 | b3 | b4 | b5 | b6 | b7 | b8 | b9 | On-Orbit Measurement Value |
| C | | c1 | c2 | c3 | c4 | c5 | c6 | c7 | c8 | c9 | Analysis Value |
| D | | d1 | d2 | d3 | d4 | d5 | d6 | d7 | d8 | d9 | Terrestrial Measurement Value |
| E | | e1 | e2 | e3 | e4 | e5 | e6 | e7 | e8 | e9 | Terrestrial Measurement Value |
| F | | f1 | f2 | f3 | f4 | f5 | f6 | f7 | f8 | f9 | SSA Measurement Value |
| | α | α1 | α2 | α3 | α4 | α5 | α6 | α7 | α8 | α9 | SSA Measurement Value |
| | β | β1 | β2 | β3 | β4 | β5 | β6 | β7 | β8 | β9 | SSA Measurement Value |
| | γ | γ1 | γ2 | γ3 | γ4 | γ5 | γ6 | γ7 | γ8 | γ9 | SSA Measurement Value |
| | δ | δ1 | δ2 | δ3 | δ4 | δ5 | δ6 | δ7 | δ8 | δ9 | SSA Measurement Value |

Fig. 12

| Operator | Device |
|---|---|
| GOVERNMENT-AFFILIATED BUSINESS OPERATOR | BUSINESS OPERATOR A — GOVERNMENT-AFFILIATED BUSINESS DEVICE A |
| | BUSINESS OPERATOR B — GOVERNMENT-AFFILIATED BUSINESS DEVICE B |
| VARIOUS-COUNTRY SPACE AGENCY BUSINESS OPERATOR | BUSINESS OPERATOR A — SPACE AGENCY BUSINESS DEVICE A |
| | BUSINESS OPERATOR B — SPACE AGENCY BUSINESS DEVICE B |
| MEGA-CONSTELLATION BUSINESS OPERATOR | BUSINESS OPERATOR A — MEGA-CONSTELLATION BUSINESS DEVICE A |
| | BUSINESS OPERATOR B — MEGA-CONSTELLATION BUSINESS DEVICE B |
| CONSTELLATION BUSINESS OPERATOR | BUSINESS OPERATOR A — CONSTELLATION BUSINESS DEVICE A |
| | BUSINESS OPERATOR B — CONSTELLATION BUSINESS DEVICE B |
| ROCKET BUSINESS OPERATOR | BUSINESS OPERATOR A — ROCKET BUSINESS DEVICE A |
| | BUSINESS OPERATOR B — ROCKET BUSINESS DEVICE B |
| REMOVAL BUSINESS OPERATOR | BUSINESS OPERATOR A — REMOVAL BUSINESS DEVICE A |
| | BUSINESS OPERATOR B — REMOVAL BUSINESS DEVICE B |
| SSA BUSINESS OPERATOR | BUSINESS OPERATOR A — SSA BUSINESS DEVICE A |
| | BUSINESS OPERATOR B — SSA BUSINESS DEVICE B |
| ANALYSIS BUSINESS OPERATOR | BUSINESS OPERATOR A — ANALYSIS BUSINESS DEVICE A |
| | BUSINESS OPERATOR B — ANALYSIS BUSINESS DEVICE B |
| COLLISION AVOIDANCE ASSIST BUSINESS OPERATOR | BUSINESS OPERATOR A — COLLISION AVOIDANCE ASSIST BUSINESS DEVICE A |
| | BUSINESS OPERATOR B — COLLISION AVOIDANCE ASSIST BUSINESS DEVICE B |
| SPACE INSURANCE BUSINESS OPERATOR | BUSINESS OPERATOR A — SPACE INSURANCE BUSINESS DEVICE A |
| | BUSINESS OPERATOR B — SPACE INSURANCE BUSINESS DEVICE B |

SPACE TRAFFIC MANAGEMENT SYSTEM, SPACE TRAFFIC MANAGEMENT DEVICE, AND TERMINAL

CROSS-REFERENCE TO RELATED APPLICATIONS

The present application is based on PCT filing PCT/JP2020/044108, filed Nov. 26, 2020. which claims priority to Japanese Application No. 2019-215665, filed Nov. 28, 2019. This application is also related to U.S. patent application Ser. No.; 17/770,310, entitled SPACE TRAFFIC MANAGEMENT SYSTEM, SPACE TRAFFIC MANAGEMENT DEVICE, TOTAL SPACE OBJECT NUMBER LIMITING METHOD, AND SPACE INFORMATION RECORDER, filed Apr. 20, 2022. The entire contents of each are incorporated herein by reference.

TECHNICAL FIELD

The present invention relates to a space traffic management system, a space traffic management device, a satellite business device, a satellite constellation business device, a mega-constellation business device, a rocket launch business device, a debris removal business device, a space situational awareness business device, a danger avoidance assist business device, a space insurance business device, a space information recorder, a danger alarm device, a danger analysis device, a danger avoidance action assist device, a security device, a terminal, a portable terminal, a space traffic management portal, and a danger alarm tool.

BACKGROUND ART

In recent years, construction of large-scale satellite constellations including several hundred to several thousand satellites, or so-called mega constellations, has begun, and a risk of satellite collisions on orbits is increasing. In addition, space debris such as satellites that have become uncontrollable due to breakdowns and wreckage of rockets are increasing.

With this rapid increase of space objects such as satellites and space debris in outer space, there is an increasing need in space traffic management (STM) to create international rules for avoiding collisions of space objects.

Patent Literature 1 discloses a technique of forming a satellite constellation consisting of a plurality of satellites located on the same circular orbit.

Conventionally, a framework exists in which the U.S. Combined Space Operations Center (CSpOC) continuously monitors space objects and issues an alarm when approach of space objects to each other or collision of space objects against each other is anticipated. In response to this alarm, manned space stations and commercial communication satellites carry out avoidance operations when they are determined to be necessary.

CITATION LIST

Patent Literature

Patent Literature 1: JP 2017-114159 A

SUMMARY OF INVENTION

Technical Problem

With an increase of debris in outer space, an increase in a number of satellites due to advent of mega-constellations, and an improvement of ground-based monitoring capability, it is becoming difficult to continue conventional alarm service run by the US CSpOC.

However, Patent Literature 1 does not describe a method of avoiding collisions of space objects accompanying the increase of debris in outer space, the increase in the number of satellites due to the advent of mega-constellations, and the improvement of ground-based monitoring capability.

The present invention has as its objective to enable a plurality of management business operators which manages space objects flying in space, to share and carry out danger analysis efficiently, in view of an increase of debris in outer space, an increase in number of satellites due to advent of mega constellations, and an improvement of ground-based monitoring capability.

Solution to Problem

A space traffic management system according to the present invention includes a plurality of space traffic management devices each mounted in a business device of each of a plurality of management business operators which manage a space object flying in space, the space traffic management device performing flight safety management of the space object, wherein the plurality of space traffic management devices are connected to each other via a communication line, wherein each of the plurality of space traffic management devices comprises:

a space information recorder to record orbital information of the space object;

a danger alarm device to announce approach or danger of collision of the space object;

a danger analysis device to perform orbital analysis of the space object;

a danger avoidance action assist device to display role division of an avoidance action against the space object; and a security device to prevent information falsification, wherein the space information recorder includes a space object Identifier (ID) which identifies the space object, the orbital information, and public condition information; and a business device ID which identifies a business device, and public condition information, and wherein the plurality of space traffic management devices have data format compatibility, share the space object ID and the business device ID, and share orbital information corresponding to the space object ID among business devices that comply with the public condition information.

Advantageous Effects of Invention

A space traffic management system according to the present invention has an effect that a plurality of management business operators which manage space objects flying in space can share and carry out danger analysis efficiently.

BRIEF DESCRIPTION OF DRAWINGS

FIG. 10 presents an example of orbit prediction information according to Embodiment 1.

FIG. 12 is a diagram illustrating Example 5-2 of the space traffic management system according to Embodiment 1.

DESCRIPTION OF EMBODIMENTS

Figure 1:
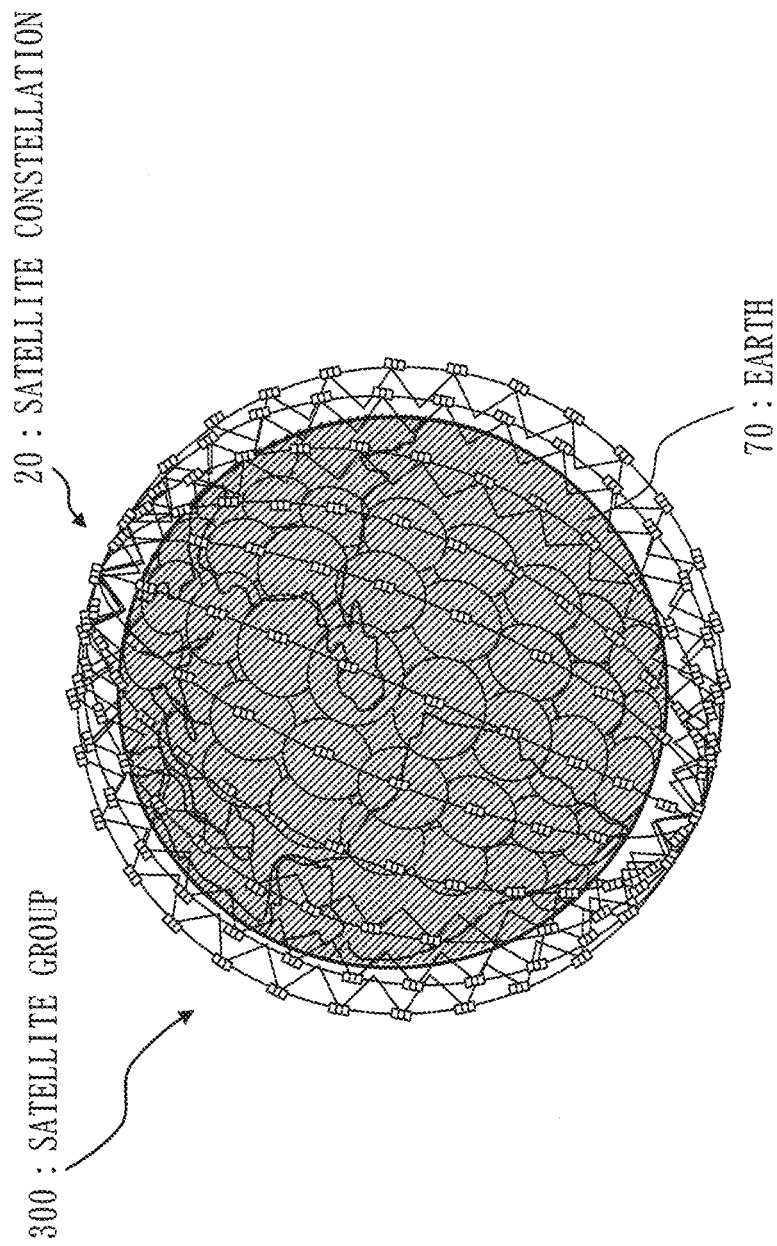
FIG. 1 presents an example in which a plurality of satellites cooperate with each other to realize a global communication service around the entire Earth.

Embodiments of the present invention will now be described below with referring to drawings. In the drawings, the same or equivalent portion is denoted by the same reference sign. In description of the embodiments, where appropriate, the same or equivalent portion will not be described or will be described only briefly. Further, in the drawings below, a relationship among sizes of configurations may differ from what it really is. Further, in description of the embodiments, sometimes a direction or position such as "upper", "lower", "left", "right", "forward", "backward", "front", and "rear" is indicated. These notations are merely given for descriptive convenience and do not limit a layout and orientation of a configuration such as a device, an appliance, and a component.

Embodiment 1

An example of a satellite constellation, which is a prerequisite for a space traffic management system according to the following embodiment, will be described.

FIG. 1 is a diagram illustrating an example in which a plurality of satellites cooperate with each other to realize a global communication service around the entire Earth 70.

FIG. 1 illustrates a satellite constellation 20 that realizes the global communication service.

For each one of a plurality of satellites flying on the same orbital plane and at the same altitude, a communication service range for the ground overlaps with a communication service range of a following satellite. Hence, with the plurality of such satellites, the plurality of satellites on the same orbital plane can provide a communication service for a particular point on the ground while taking turns in a time-division manner. If an adjacent orbital plane is formed, the communication service can planarly cover the ground between adjacent orbits exhaustively. Likewise, if a large number of orbital planes are arranged almost evenly around the Earth, it is possible to provide a global communication service for the ground around the entire Earth.

Figure 2:
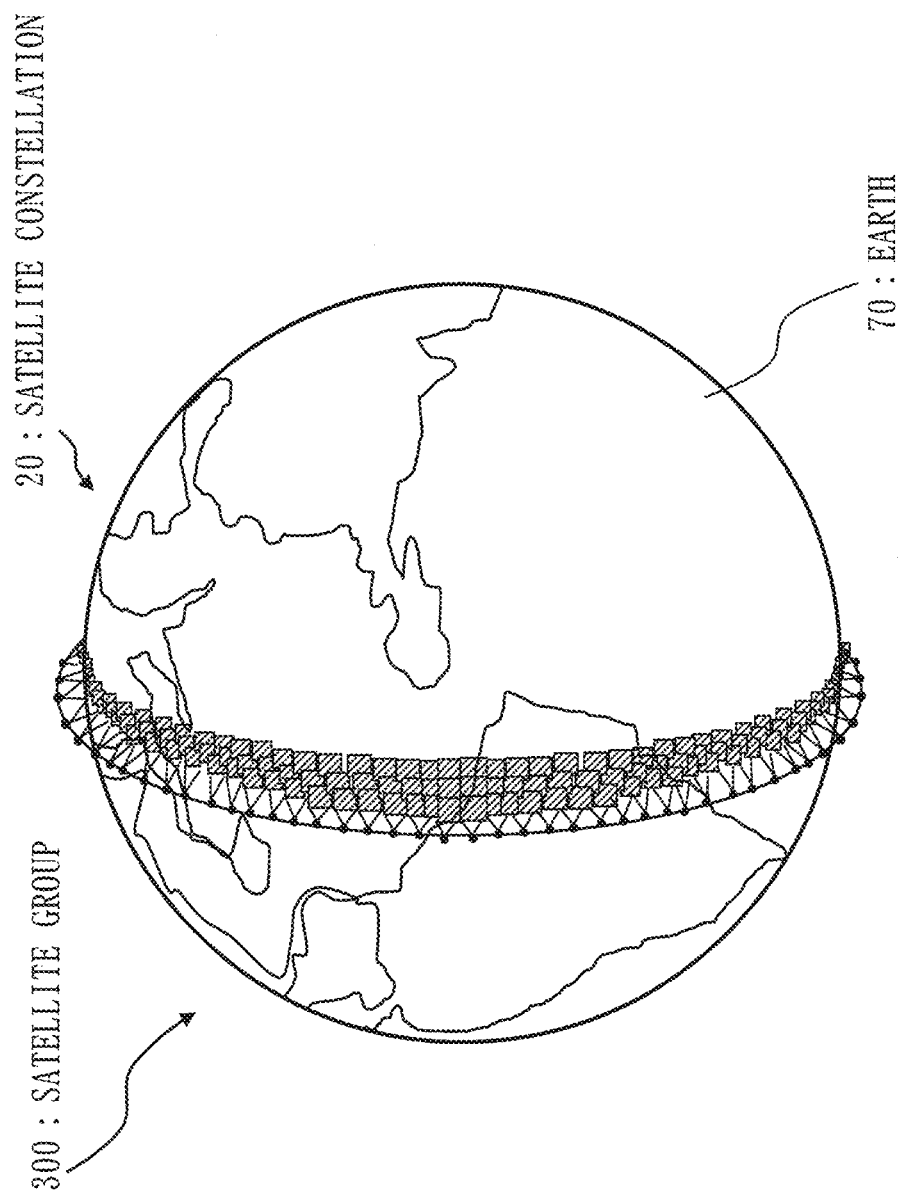
FIG. 2 presents an example in which a plurality of satellites having the same single orbital plane implement an Earth observation service.

FIG. 2 is a diagram illustrating an example in which a plurality of satellites having the same single orbital plane realize an Earth observation service.

FIG. 2 illustrates a satellite constellation 20 that realizes the Earth observation service. In the satellite constellation 20 in FIG. 2, satellites each equipped with an Earth observation device, which is an optical sensor or a radio wave sensor such as a synthetic aperture radar, fly on the same orbital plane and at the same altitude. In this manner, with a satellite group 300 in which the ground imaging range is overlapped by a following satellite with a time delay, the plurality of satellites on the orbit provide the Earth observation service by picking up a ground image of a particular point on the ground while taking turns in a time-division manner.

In this manner, the satellite constellation 20 is constituted of the satellite group 300 formed of the plurality of satellites having various orbital planes. In the satellite constellation 20, the service is provided by cooperation of the satellite group 300. The satellite constellation 20 specifically refers to a satellite constellation formed of one satellite group run by a communication business service company as illustrated in FIG. 1 or by an observation business service company as illustrated in FIG. 2.

Figure 3:
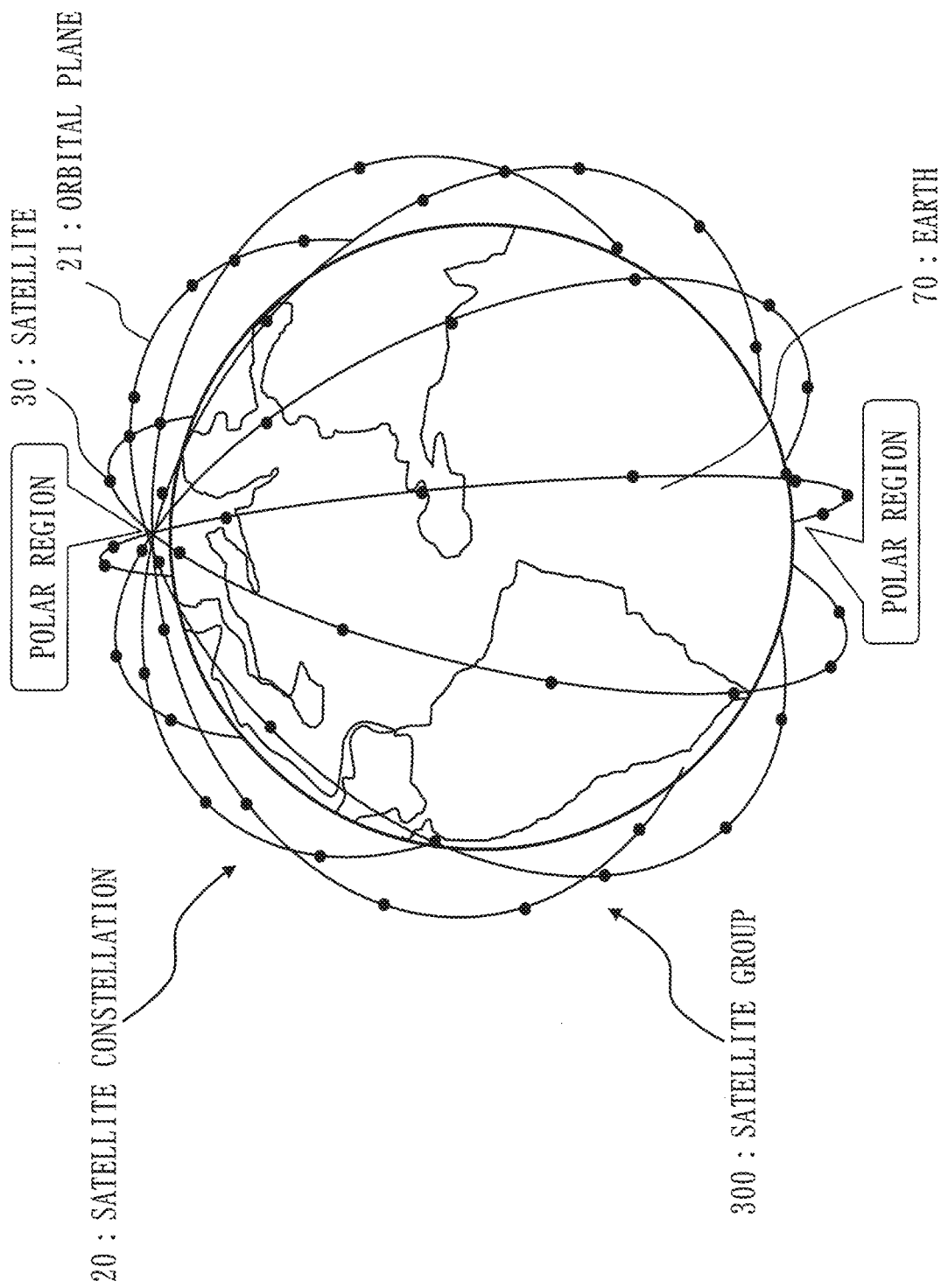
FIG. 3 presents an example of a satellite constellation having a plurality of orbital planes intersecting in a vicinity of polar regions.
Figure 4:
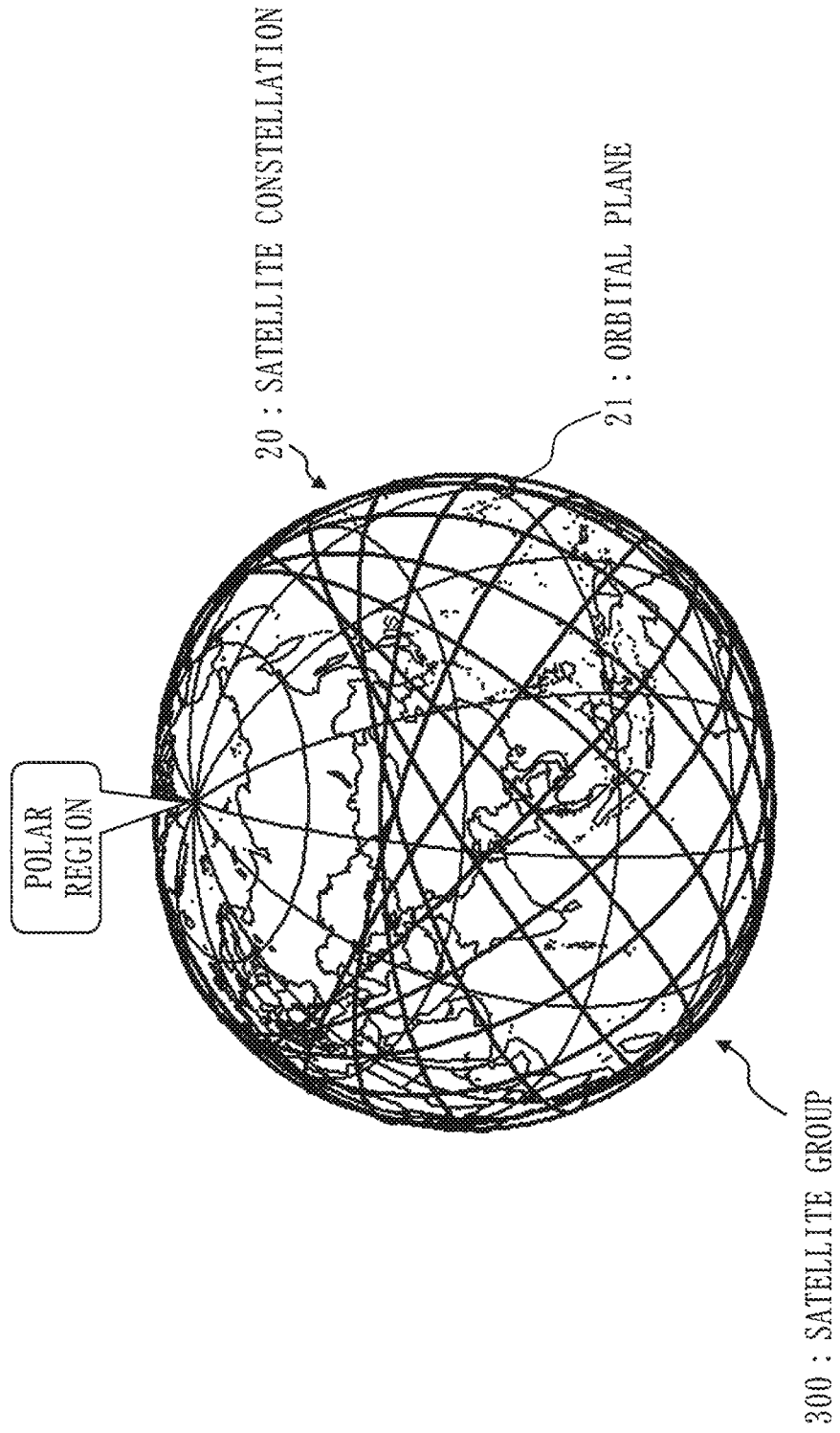
FIG. 4 presents an example of a satellite constellation having a plurality of orbital planes intersecting outside of the polar regions.

FIG. 3 presents an example of a satellite constellation 20 having a plurality of orbital planes 21 intersecting in vicinities of polar regions. FIG. 4 presents an example of a satellite constellation 20 having a plurality of orbital planes 21 intersecting outside of the polar regions.

In the satellite constellation 20 of FIG. 3, orbital inclinations of orbital planes of the plurality of orbital planes 21 are approximately 90 degrees, and the orbital planes of the plurality of orbital planes 21 exist on different planes.

In the satellite constellation 20 of FIG. 4, orbital inclinations of orbital planes of the plurality of orbital planes 21 are not approximately 90 degrees, and the orbital planes of the plurality of orbital planes 21 exist on different planes.

In the satellite constellation 20 of FIG. 3, two arbitrary orbital planes intersect at points in the vicinities of polar regions. In the satellite constellation 20 of FIG. 4, two arbitrary orbital planes intersect at points other than the polar regions. In FIG. 3, there is a possibility that collision of satellites 30 occurs in the vicinities of the polar regions. As illustrated in FIG. 4, intersections of the plurality of orbital planes having orbital inclinations smaller than 90 degrees separate from the polar regions according to the orbital inclinations. Also, depending on a combination of the orbital planes, there is a possibility that the orbital planes intersect at various positions including a vicinity of an equator. Accordingly, a location where collision of the satellites 30 can occur varies. The satellites 30 are also called artificial satellites.

Particularly, in recent years, construction of a large-scale satellite constellation having several hundred to several thousand satellites has started, and a collision risk of satellites on the orbit increases. Also, debris such as an artificial satellite that has become uncontrollable due to breakdown and wreckage of rockets increases. The large-scale satellite constellation is also called a mega-constellation. Such debris is also called space debris.

In this manner, as the debris increases in outer space and a number of satellites represented by mega-constellations increases rapidly, demands for a space traffic management (STM) have arisen.

Also, to perform orbital transfer of a space object, demands have arisen for post-mission disposal (PMD) that takes place after a mission on the orbit is ended, or for ADR according to which debris such as a broken satellite and a floating upper block of a rocket is subjected to orbital disposal by an external means such as a debris removal satellite. International discussion for STM of such ADR demands has begun. PMD stands for Post Mission Disposal. ADR stands for Active Debris Removal. STM stands for Space Traffic Management.

As a system of space situational awareness (SSA) including international cooperation is fortified and an observation accuracy improves, it has become possible to monitor even a space object of a much smaller recognizable size. Also, a total number of space objects that can be monitored is increasing.

A sharp increase in a number of space objects due to development of mega-constellations is one of factors that increase the collision risk in outer space. Even if, however, collision of man-made space objects can be avoided as an effect of a human activity such as STM, a chained-collision risk triggered by collision of debris floating in outer space is still a serious problem.

Even when the debris itself is a small object, if collision occurs under a condition of a high relative velocity, a risk of explosive destruction of a satellite exists, and a risk of chained high-order damages caused by scattering fragments exists.

For a mega-constellation consisting of several thousand satellites, an idea of framework has been made public in which approximately 2,500 satellites fly at the same altitude. According to the mainstream policy, in regular operation, collision in an own system is avoided by performing time management of a flying position of a preceding satellite. However, if debris collision triggers an abnormality in orbital attitude control of one satellite leading to a deviation from initial time management control, or causes fragment scattering, there is a very high risk of collision with another satellite flying at the same orbital altitude.

To avoid such a collision risk, it is rational to perform central management of debris orbital information and mega-constellation orbital information and to perform collision prediction analysis. Concerning debris information, it has been said that approximately 20,000 pieces of basketball-size debris can be monitored in the field of SSA. It has been also said that as a monitoring capability called space fence of the US improves in the future, it would be possible to monitor 200,000 pieces of softball-sized debris.

Supposing that an SSA business operator performs maintenance and management of 200,000 pieces of debris information while updating the information, central management of orbital information of 10,000 or more satellites owned by a mega-constellation business operator poses many problems. For example, if not only orbit prediction based on natural phenomena but also orbital attitude control held by a satellite itself is employed, their effects must be reflected in orbit prediction analysis, which requires an enormous amount of work. Also, the mega-constellation business operator does not always disclose up-to-date and high-accuracy satellite information to the SSA business operator. In addition, monitoring 200,000 pieces of debris is absolutely not a necessary and sufficient scale at all. Even small debris smaller than a softball can have a potential to destroy a satellite. Therefore, need will increase in the future for monitoring a huge amount of debris of much smaller sizes.

Meanwhile, it is not practical for the mega-constellation business operator to perform central management including as many as 200,000 pieces of debris information, from a viewpoint of an amount of work. Furthermore, it is not easy to centrally integrate information of a plurality of mega-constellation business operators.

In the above circumstances, it is preferable that the SSA business operator give the debris orbital information to the mega-constellation business operator, and that the mega-constellation business operator perform analysis of collision with a satellite in its own system. In the mega-constellation, several thousand satellites fly at a particular orbital altitude. Therefore, if, as the debris orbital information, a predicted time and position about passage of the debris through a particular orbital altitude operated by the mega-constellation, and velocity vector information are available, the mega-constellation business operator side can identify a satellite involving a collision risk and perform collision prediction analysis.

With referring to FIGS. 5 to 8, a description will be made on examples of a satellite 30 and a ground facility 700 in a satellite constellation forming system 600 that forms the satellite constellation 20. For example, the satellite constellation forming system 600 is operated by a business operator that runs a satellite constellation business such as a mega-constellation business device 41, an LEO constellation business device 42, and a satellite business device 43.

Figure 5:
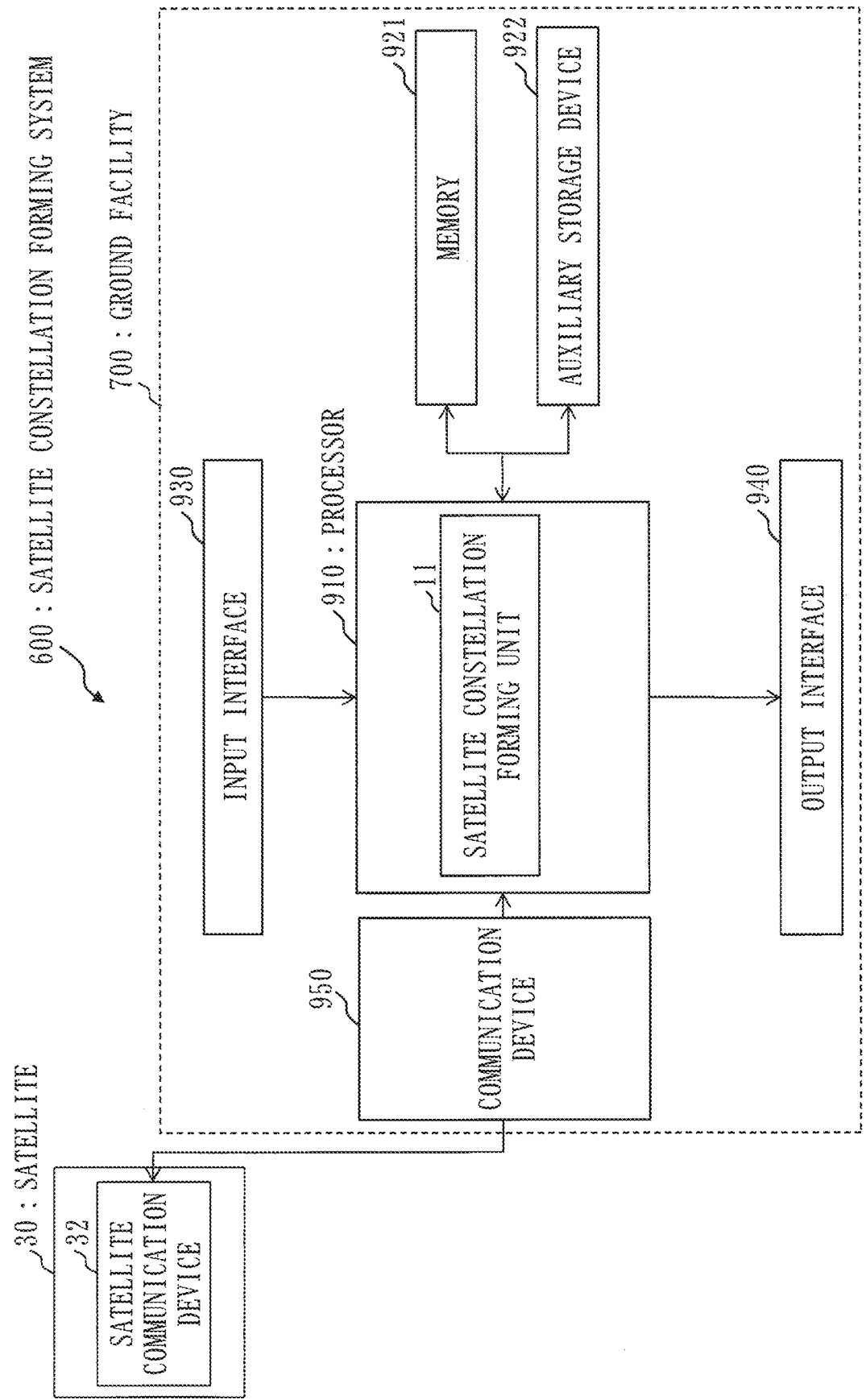
FIG. 5 is a configuration diagram of a satellite constellation forming system.

FIG. 5 is a configuration diagram of the satellite constellation forming system 600.

The satellite constellation forming system 600 is provided with a computer. FIG. 5 illustrates a one-computer configuration. In practice, a computer is provided to each of a plurality of satellites 30 constituting the satellite constellation 20, and each of the ground facilities 700 that communicate with the satellites 30. The computers provided to the plurality of satellites 30 and the computers provided to the ground facilities 700 communicating with the satellites 30 cooperate with each other to implement functions of the satellite constellation forming system 600. In the following, an example of a configuration of a computer that implements the functions of the satellite constellation forming system 600 will be described.

The satellite constellation forming system 600 is provided with the satellites 30 and the ground facilities 700. Each satellite 30 is provided with a satellite communication device 32 to communicate with a communication device 950 of the ground facility 700. FIG. 5 illustrates the satellite communication device 32 out of the configuration provided to the satellite 30.

The satellite constellation forming system 600 is provided with a processor 910 and other hardware devices as well, such as a memory 921, an auxiliary storage device 922, an input interface 930, an output interface 940, and a communication device 950. The processor 910 is connected to the other hardware devices via a signal line and controls the other hardware devices. The hardware of the satellite constellation forming system 600 is the same as hardware of a space traffic management device 100 to be described later with referring to FIG. 9.

The satellite constellation forming system 600 is provided with a satellite constellation forming unit 11 as a function element. A function of the satellite constellation forming unit 11 is implemented by hardware or software.

The satellite constellation forming unit 11 controls formation of the satellite constellation 20 while communicating with the satellite 30.

Figure 6:
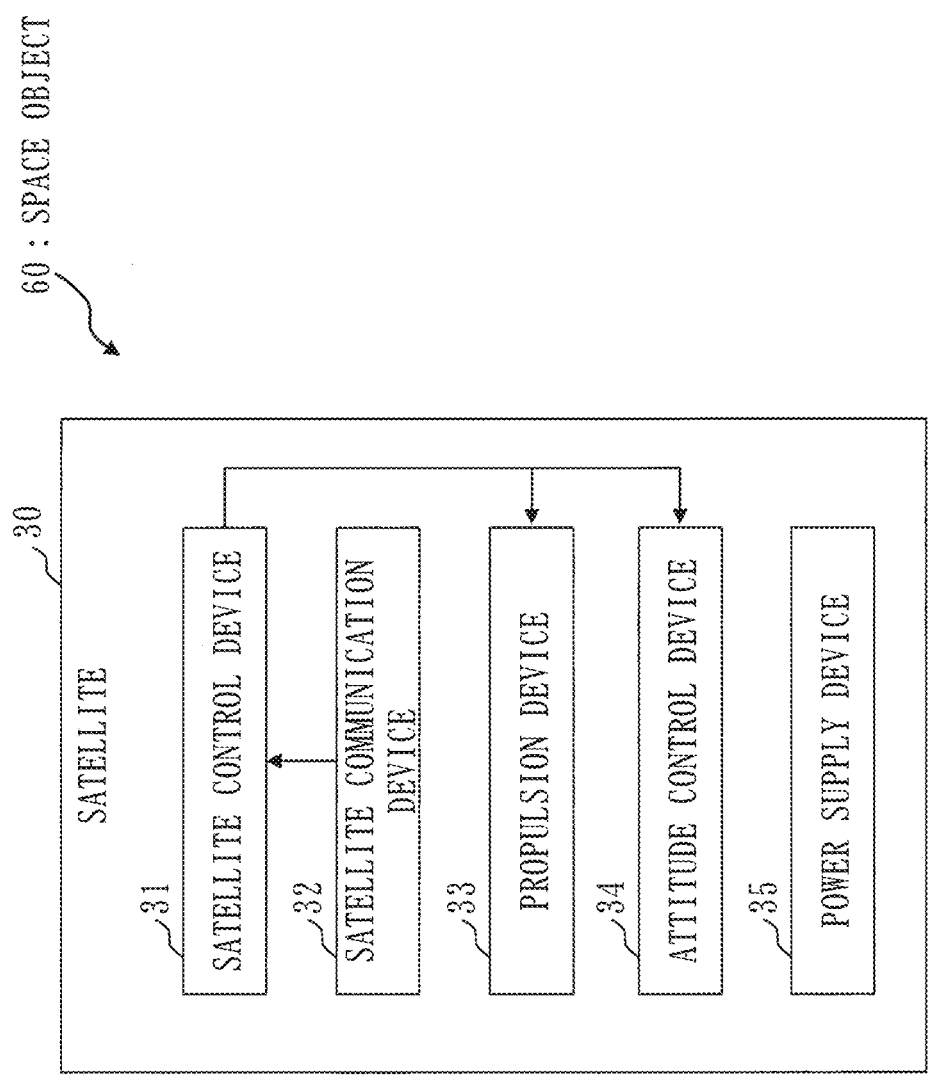
FIG. 6 is a configuration diagram of a satellite of the satellite constellation forming system.

FIG. 6 is a configuration diagram of the satellite 30 of the satellite constellation forming system 600.

The satellite 30 is provided with a satellite control device 31, a satellite communication device 32, a propulsion device 33, an attitude control device 34, and a power supply device 35. The satellite 30 is provided with other constituent elements that implement various types of functions. With referring to FIG. 6, description will be made on the satellite control device 31, the satellite communication device 32, the propulsion device 33, the attitude control device 34, and the power supply device 35. The satellite 30 is an example of a space object 60.

The satellite control device 31 is a computer that controls the propulsion device 33 and the attitude control device 34, and is provided with processing circuitry. Specifically, the satellite control device 31 controls the propulsion device 33 and the attitude control device 34 in accordance with various types of commands transmitted from the ground facility 700.

The satellite communication device 32 is a device that communicates with the ground facility 700. Specifically, the satellite communication device 32 transmits various types of data concerning its own satellite to the ground facility 700. The satellite communication device 32 receives various types of commands transmitted from the ground facility 700.

The propulsion device 33 is a device to give propulsion to the satellite 30 and changes a speed of the satellite 30. Specifically, the propulsion device 33 is an apogee kick motor, a chemical propulsion device, or an electric propulsion device. The apogee kick motor (AKM) is an upper-block propulsion device used for orbital insertion of an artificial satellite, and is also called an apogee motor (when a solid rocket motor is employed) or an apogee engine (when a liquid engine is used).

The chemical propulsion device is a thrustor that uses a one-component or two-component fuel. An example of the electric propulsion device is an ion engine or a Hall thrustor. Apogee kick motor is a name of a device used for orbital transfer and sometimes refers to a kind of a chemical propulsion device.

The attitude control device 34 is a device to control attitude elements such as an attitude of the satellite 30, and an angular velocity and a Line of Sight of the satellite 30. The attitude control device 34 changes the attitude elements in a desired direction. Alternatively, the attitude control device 34 maintains the attitude elements in a desired direction. The attitude control device 34 is provided with an attitude sensor, an actuator, and a controller. The attitude sensor is a device such as a gyroscope, an Earth sensor, a sun sensor, a star tracker, a thrustor, and a magnetic sensor. The actuator is a device such as an attitude control thrustor, a momentum wheel, a reaction wheel, and a control moment gyro. The controller controls the actuator in accordance with measurement data of the attitude sensor or in accordance with various types of commands from the ground facility 700.

The power supply device 35 is provided with apparatuses such as a solar cell, a battery, and a power control device, and supplies power to the apparatuses mounted in the satellite 30.

The processing circuitry provided to the satellite control device 31 will be described.

The processing circuitry may be dedicated hardware, or may be a processor that runs a program stored in the memory.

In the processing circuitry, some of its functions may be implemented by dedicated hardware, and its remaining functions may be implemented by software or firmware. That is, the processing circuitry can be implemented by hardware, software, or firmware; or a combination of hardware, software, and firmware.

The dedicated hardware is specifically a single circuit, a composite circuit, a programmed processor, a parallel-programmed processor, an ASIC, or an FPGA; or a combination of a single circuit, a composite circuit, a programmed processor, a parallel-programmed processor, an ASIC, and an FPGA.

Note that ASIC stands for Application Specific Integrated Circuit. FPGA stands for Field Programmable Gate Array.

Figure 7:
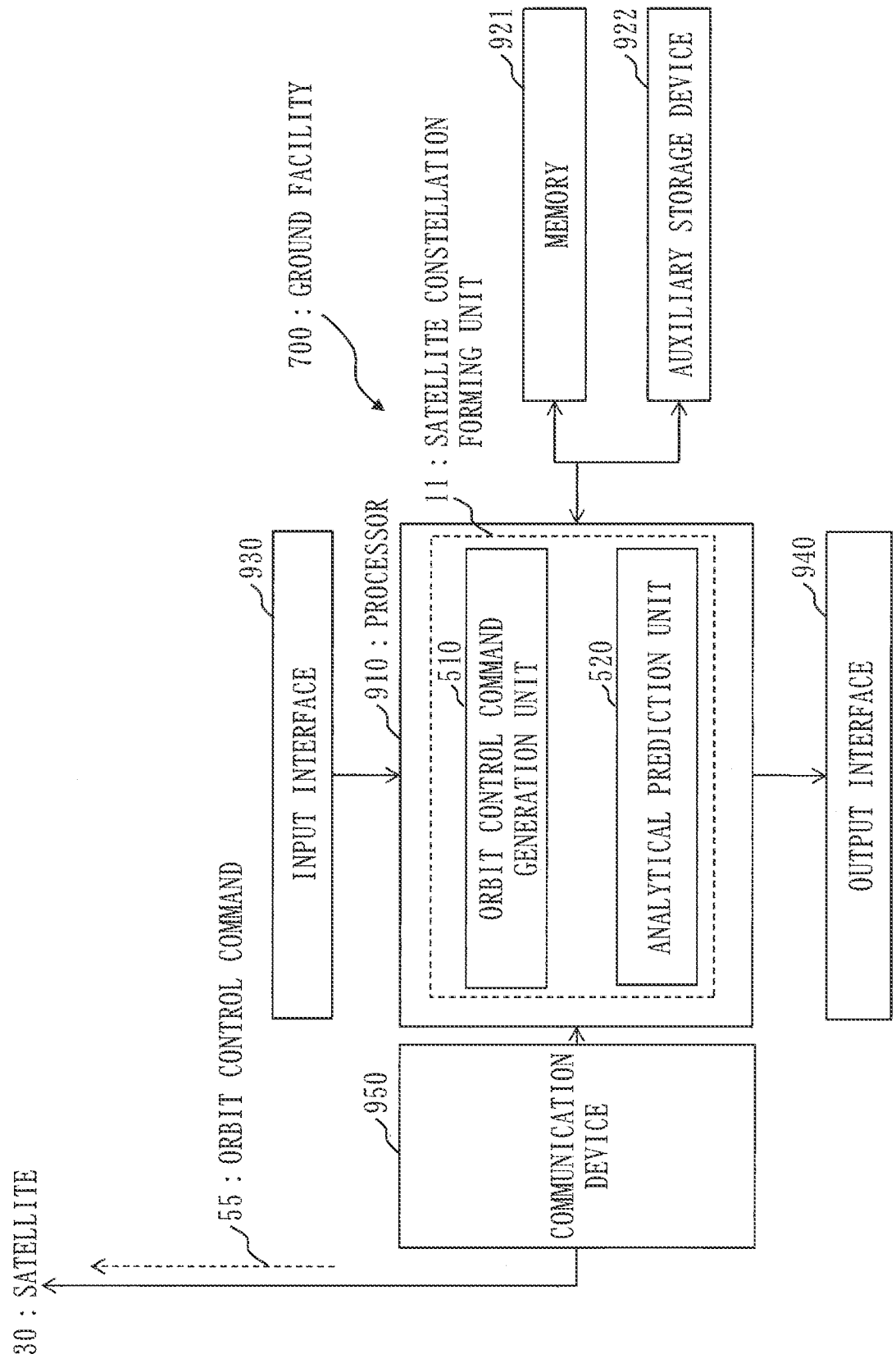
FIG. 7 is a configuration diagram of a ground facility of the satellite constellation forming system.

FIG. 7 is a configuration diagram of the ground facility 700 provided to the satellite constellation forming system 600.

The ground facility 700 program-controls a large number of satellites on every orbit plane. The ground facility 700 is an example of a ground device. The ground device is constituted of a ground station such as: a ground antenna device, a communication device connected to the ground antenna device, and an electronic calculator; and a ground facility serving as a server or terminal connected to the ground station via a network. The ground device may include a communication device mounted in a mobile body such as an aircraft, an automotive vehicle, and a mobile terminal.

The ground facility 700 forms the satellite constellation 20 through communication with the satellites 30. The ground facility 700 is provided to a space traffic management device 100. The ground facility 700 is provided with the processor 910 and other hardware devices such as the memory 921, the auxiliary storage device 922, the input interface 930, the output interface 940, and the communication device 950. The processor 910 is connected to the other hardware devices via the signal line and controls the other hardware devices. The hardware of the ground facility 700 is the same as hardware of the space traffic management device 100 to be described later with referring to FIG. 9.

The ground facility 700 is provided with an orbit control command generation unit 510 and an analytical prediction unit 520, as function elements. Functions of the orbit control command generation unit 510 and analytical prediction unit 520 are implemented by hardware or software.

The communication device 950 transmits/receives a signal that performs tracking control of the satellites 30 of the satellite group 300 constituting the satellite constellation 20. Also, the communication device 950 transmits an orbit control command 55 to the satellites 30.

The analytical prediction unit 520 analytically predicts orbits of the satellites 30.

The orbit control command generation unit 510 generates the orbit control command 55 to be transmitted to the satellites 30.

The orbit control command generation unit 510 and the analytical prediction unit 520 implement the function of the satellite constellation forming unit 11. That is, the orbit control command generation unit 510 and the analytical prediction unit 520 are examples of the satellite constellation forming unit 11.

Figure 8:
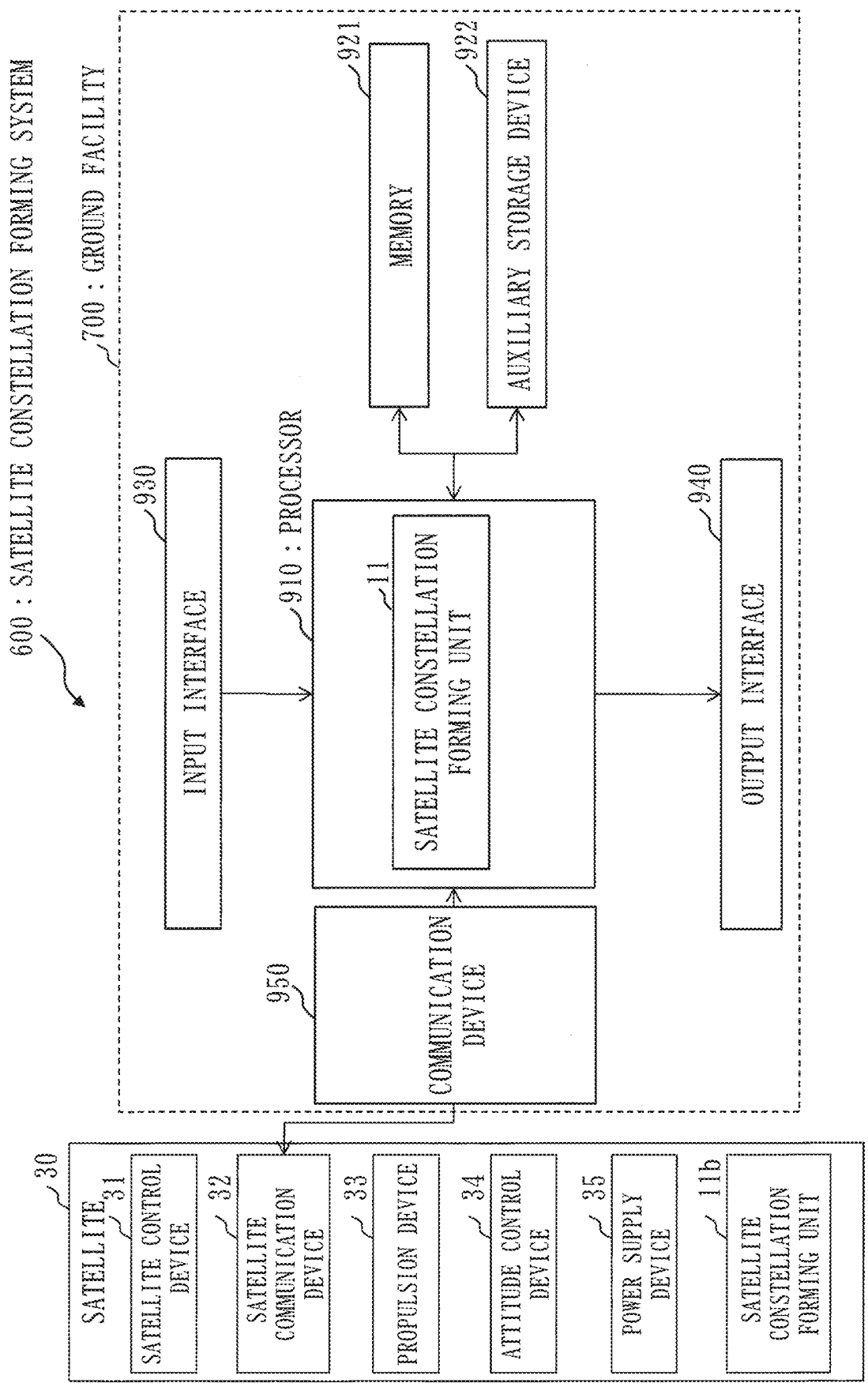
FIG. 8 presents a functional configuration example of the satellite constellation forming system.

FIG. 8 is a diagram illustrating a function configuration example of the satellite constellation forming system 600.

The satellite 30 is further provided with a satellite constellation forming unit 11b which forms the satellite constellation 20. The satellite constellation forming units 11b of the plurality of satellites 30 and the satellite constellation forming units 11 provided to the ground facilities 700 cooperate with each other to implement the functions of the satellite constellation forming system 600. Alternatively, the satellite constellation forming unit 11b of the satellite 30 may be provided to the satellite control device 31.

* Description of Configuration *

A space traffic management system 500 is provided with the space traffic management device 100. The space traffic management system 500 is also called a space object intrusion alarm system. The space traffic management device 100 is also called a space object intrusion alarm device.

The space traffic management system 500 is provided with a plurality of space traffic management devices 100 each mounted in a business device of each of a plurality of management business operators which manage a space object flying in space. The space traffic management device 100 includes a plurality of space traffic management devices 100 which perform flight safety management of the space object. The plurality of space traffic management devices 100 are connected to each other via a communication line.

Figure 9:
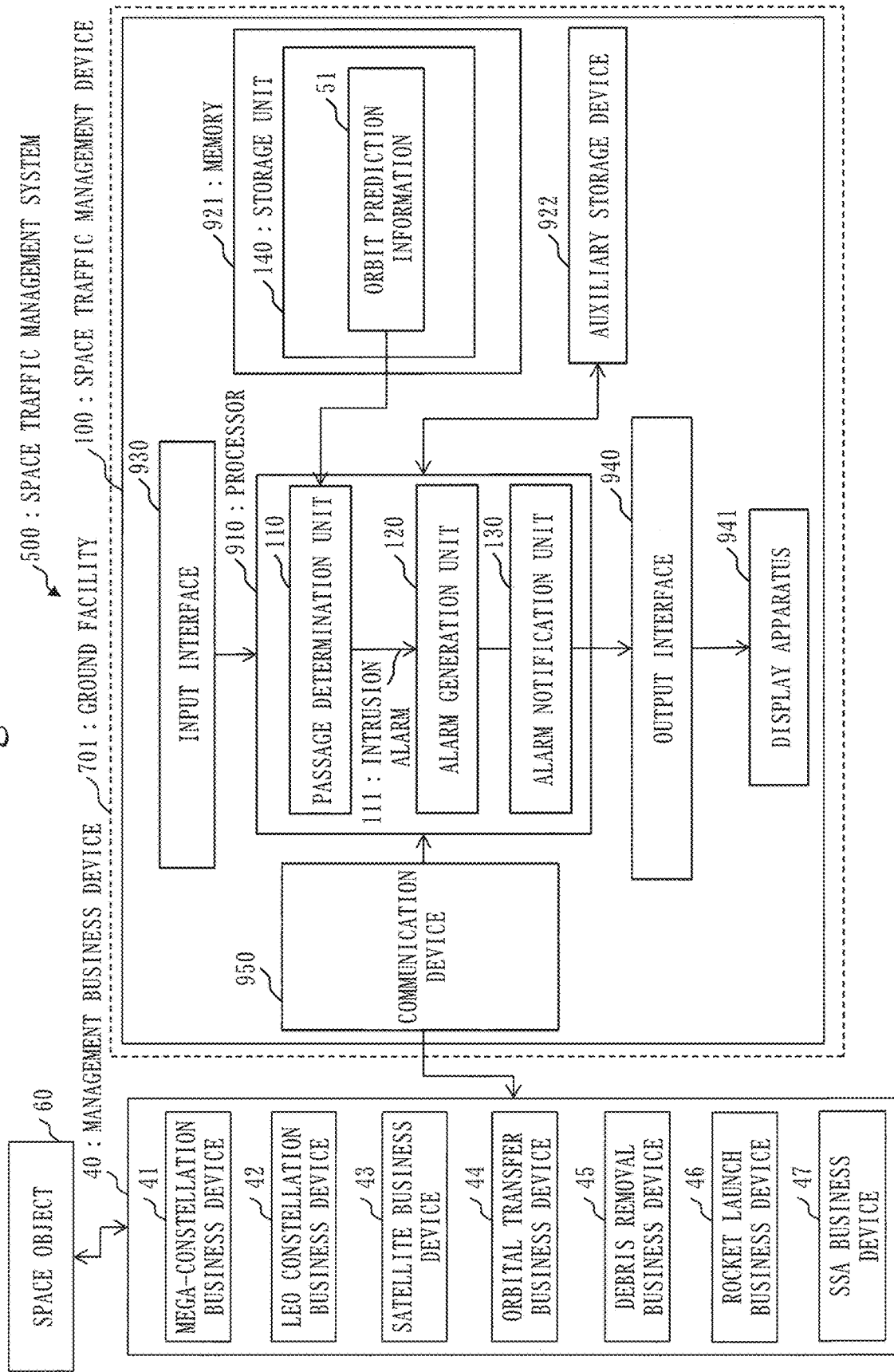
FIG. 9 is a configuration diagram of a space traffic management system according to Embodiment 1.

FIG. 9 is a configuration diagram illustrating Example 5-1 of the space traffic management system 500 according to the present embodiment and Example 1-1 of the space traffic management device 100 according to the present embodiment.

The space traffic management device 100 communicates with another management business device 40. The space traffic management device 100 may be mounted in a ground facility 701. The space traffic management device 100 may be mounted in the satellite constellation forming system 600.

The management business device 40 provides information concerning the space object 60 such as an artificial satellite and debris. The management business device 40 is a business operator's computer that collects information concerning the space object 60 such as the artificial satellite and debris.

The management business device 40 includes devices such as a mega-constellation business device 41, an LEO constellation business device 42, a satellite business device 43, an orbital transfer business device 44, a debris removal business device 45, a rocket launch business device 46, and an SSA business device 47. LEO stands for Low Earth Orbit.

The mega-constellation business device 41 is a computer of a mega-constellation business operator which runs a large-scale satellite constellation business, namely, a mega-constellation business.

The LEO constellation business device 42 is a computer of an LEO constellation business operator which runs a low-orbital constellation business, namely, an LEO constellation business.

The satellite business device 43 is a computer of a satellite business operator which handles one to several satellites.

The orbital transfer business device 44 is a computer of an orbital transfer business operator which carries out a space object intrusion alarm for a satellite.

The debris removal business device 45 is a computer of a debris removal business operator which runs a business of collecting debris.

The rocket launch business device 46 is a computer of a rocket launch business operator which runs a rocket launch business.

The SSA business device 47 is a computer of an SSA business operator which runs an SSA business, namely, a space situational awareness business.

The management business device 40 can be replaced by another device that collects information concerning a space object such as an artificial satellite and debris and provides the collected information to the space traffic management system 500. If the space traffic management device 100 is mounted in a public server of the SSA, the space traffic management device 100 may function as the public server of the SSA.

Information provided by the management business device 40 to the space traffic management device 100 will be described later in detail.

The space traffic management device 100 is provided with a processor 910 and other hardware devices as well, such as a memory 921, an auxiliary storage device 922, an input interface 930, an output interface 940, and a communication device 950. The processor 910 is connected to the other hardware devices via a signal line and controls the other hardware devices.

The space traffic management device 100 is provided with a passage determination unit 110, an alarm generation unit 120, an alarm notification unit 130, and a storage unit 140, as examples of function elements. Orbit prediction information 51 is stored in the storage unit 140.

Functions of the passage determination unit 110, alarm generation unit 120, and alarm notification unit 130 are implemented by software. The storage unit 140 is provided to the memory 921. Alternatively, the storage unit 140 may be provided to the auxiliary storage device 922. Also, the storage unit 140 may be divided between the memory 921 and the auxiliary storage device 922.

FIG. 9 describes the space traffic management device 100 as implementing a function of space object intrusion alarm. However, the space traffic management device 100 has various functions other than the function of space object intrusion alarm, as will be described later.

The processor 910 is a device that runs a space traffic management program. The space traffic management program is a program that implements the functions of the various constituent elements of the space traffic management device 100 and space traffic management system 500.

The processor 910 is an Integrated Circuit (IC) that performs computation processing. Specific examples of the processor 910 are a Central Processing Unit (CPU), a Digital signal Processor (DSP), and a Graphics Processing Unit (GPU).

The memory 921 is a storage device that stores data temporarily. A specific example of the memory 921 is a Static Random-Access Memory (SRAM) or a Dynamic Random-Access Memory (DRAM).

The auxiliary storage device 922 is a storage device that keeps data. A specific example of the auxiliary storage device 922 is an HDD. Alternatively, the auxiliary storage device 922 may be a portable storage medium such as an SD (registered trademark) memory card, a CF, a NAND flash, a flexible disk, an optical disk, a compact disk, a Blu-ray (registered trademark) Disc, and a DVD. HDD stands for Hard Disk Drive. SD (registered trademark) stands for Secure Digital. CF stands for CompactFlash (registered trademark). DVD stands for Digital Versatile Disk.

The input interface 930 is a port to be connected to an input device such as a mouse, a keyboard, and a touch panel.

The input interface 930 is specifically a Universal Serial Bus (USB) terminal. Alternatively, the input interface 930 may be a port to be connected to a Local Rear Network (LAN).

The output interface 940 is a port to which a cable of a display apparatus 941 such as a display is to be connected. The output interface 940 is specifically a USB terminal or a High-Definition Multimedia Interface (HDMI, registered trademark) terminal. The display is specifically a Liquid Crystal Display (LCD).

The communication device 950 has a receiver and a transmitter. The communication device 950 is specifically a communication chip or a Network Interface Card (NIC). The space traffic management device 100 communicates with the management business device 40 via the communication device 950.

The space traffic management program is read by the processor 910 and run by the processor 910. Not only the space traffic management program but also an Operating System (OS) is stored in the memory 921. The processor 910 runs the space traffic management program while running the OS. The space traffic management program and the OS may be stored in the auxiliary storage device 922. The space traffic management program and the OS stored in the auxiliary storage device 922 are loaded into the memory 921 and run by the processor 910. The space traffic management program may be incorporated in the OS partly or entirely.

The space traffic management device 100 may be provided with a plurality of processors that substitute for the processor 910. The plurality of processors share running of the program. Each processor is a device that runs the program, just as the processor 910 does.

Data, information, signal values, and variable values which are used, processed, or outputted by the program are stored in the memory 921, the auxiliary storage device 922, or a register or cache memory in the processor 910.

The term "unit" in each unit of the space traffic management device may be replaced by "process", "procedure", "means", "phase", or "stage". The term "process" in each of a passage determination process, an alarm generation process, and an alarm notification process may be replaced by "program", "program product", or "program-recorded computer-readable recording medium". The terms "process", "procedure", "means", "phase", and "stage" are replaceable by one another.

The space traffic management program causes the computer to execute processes, procedures, means, phases, or stages corresponding to the various units of the space traffic management system with their "units" being replaced by "processes", "procedures", "means", "phases", or "stages". A space traffic management method is a method that is carried out by the space traffic management device 100 running the space traffic management program.

The space traffic management program may be provided as being stored in a computer-readable recording medium. Each program may be provided in the form of a program product.

FIG. 10 is a diagram illustrating an example of the orbit prediction information 51 according to the present embodiment.

The space traffic management device 100 stores in the storage unit 140 the orbit prediction information 51 in which prediction values of the orbit of the space object 60 are set. For example, the space traffic management device 100 may acquire prediction values of orbits of a plurality of space objects 60 from the management business device 40 utilized by a management business operator which manages the plurality of space object 60, and may store the prediction values as orbit prediction information 51. Alternatively, the space traffic management device 100 may acquire, from the management business operator, orbit prediction information 51 in which prediction values of orbits of a plurality of space objects 60 are set, and may store the orbit prediction information 51 to the storage unit 140.

The management business operator is a business operator that manages the space object 60 such as a satellite constellation, various types of satellites, a rocket, and debris which fly in outer space. As described above, the management business device 40 utilized by each management business operator is a computer such as the mega-constellation business device 41, the LEO constellation business device 42, the satellite business device 43, the orbital transfer business device 44, the debris removal business device 45, the rocket launch business device 46, and the SSA business device 47.

The orbit prediction information 51 includes satellite orbit prediction information 52 and debris orbit prediction information 53. Prediction values of an orbit of a satellite are set in the satellite orbit prediction information 52. Prediction values of an orbit of debris are set in the debris orbit prediction information 53. In the present embodiment, the satellite orbit prediction information 52 and the debris orbit prediction information 53 are included in the orbit prediction information 51. However, the satellite orbit prediction information 52 and the debris orbit prediction information 53 may be stored in the storage unit 140 as separate pieces of information.

Information such as, for example, a space object Identifier (ID) 511, a predicted epoch 512, predicted orbital element 513, and predicted error 514 are set in the orbit prediction information 51.

The space object ID 511 includes identifiers which identify a space object 60. In FIG. 10, a satellite ID and a debris ID are set as the space object ID 511. The space object is specifically an object such as a rocket launched to outer space, an artificial satellite, a space base, a debris removal satellite, a planetary space probe, and a satellite or rocket that turned into after mission was over.

The predicted epoch 512 is an epoch where orbits of the plurality of space objects are predicted.

The predicted orbital elements 513 are orbital elements which identify an orbit of each of the plurality of space objects. The predicted orbital elements 513 are orbital elements predicted for the orbit of each of the plurality of space objects. In FIG. 10, Keplerian six orbital elements are set as the predicted orbital elements 513.

The predicted errors 514 are errors predicted for an orbit of each of the plurality of space objects. As the predicted errors 514, a traveling-direction error, an orthogonal-direction error, and an error basis are set. In this manner, error amounts involved in performance values are explicitly indicated in the predicted errors 514, together with a basis. The basis of the error amounts includes contents of data processing carried out as a measurement means and as an accuracy improving means of position coordinate information, and statistic evaluation results of past data, partly or entirely.

In the orbit prediction information 51 according to the present embodiment, the predicted epoch 512 and the predicted orbital elements 513 are set concerning the space object 60. A time and position coordinates in the near future of the space object 60 can be obtained from the predicted epoch 512 and the predicted orbital elements 513. For example, the time and position coordinates in the near future of the space object 60 may be set in the orbit prediction information 51.

In this manner, the orbit prediction information 51 is provided with orbital information of the space object, including the epoch and the orbital elements or the time and the position coordinates, so that predicted values in the near future of the space object 60 are explicitly indicated.

Other examples of the space traffic management device 100 and space traffic management system 500 will now be described. The hardware configuration of the space traffic management device 100 has been described above.

Figure 11:
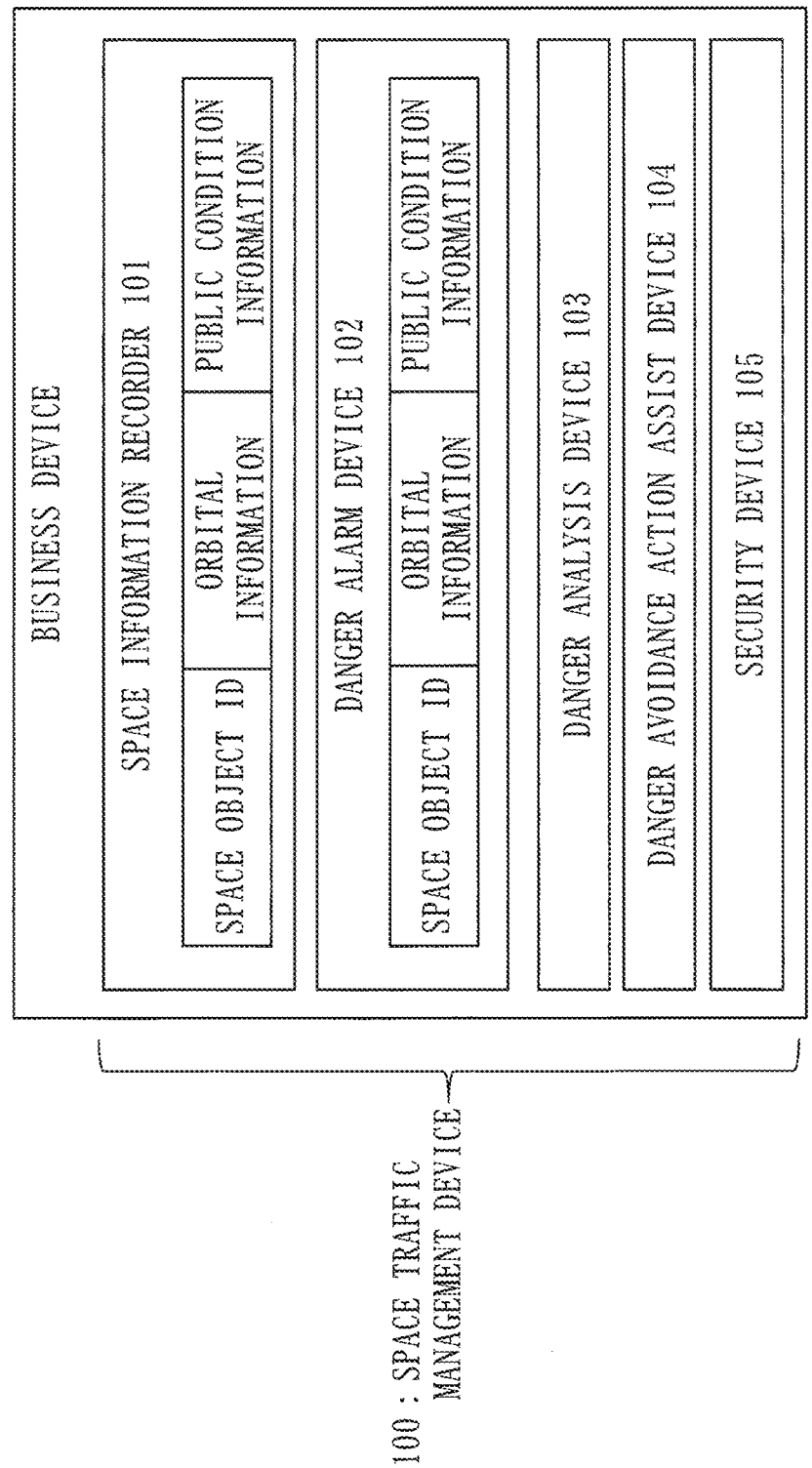
FIG. 11 is a configuration diagram illustrating Example 1-2 of a space traffic management device according to Embodiment 1.

FIG. 11 is a configuration diagram illustrating Example 1-2 of the space traffic management device 100 according to the present embodiment.

FIG. 12 is a diagram illustrating Example 5-2 of the space traffic management system 500 according to the present embodiment.

The plurality of space traffic management devices 100 provided to the space traffic management system 500 are connected to each other via a communication line. The space traffic management device 100 is provided to each of the plurality of management business devices 40. In the following, sometimes the management business device 40 is simply referred to as business device.

The space traffic management device 100 is provided with a space information recorder 101, a danger alarm device 102, a danger analysis device 103 which performs orbital analysis of the space object, a danger avoidance action assist device 104, and a security device 105.

The space information recorder 101 records orbital information of the space object. A specific example of the space information recorder 101 is the orbit prediction information 51 of FIG. 10.

The danger alarm device 102 announces approach or danger of collision of a space object.

The danger analysis device 103 performs orbital analysis of the space object.

The danger avoidance action assist device 104 displays role division of an avoidance action against the space object.

The security device 105 prevents information falsification.

The space information recorder 101 is provided with a space object ID which identifies a space object, orbital information, and public condition information; and a business device ID which identifies a business device, and public condition information.

The plurality of space traffic management devices 100 have data format compatibility, share the space object ID and the business device ID, and share orbital information corresponding to the space object ID among business devices that comply with the public condition information.

A framework is conventionally available in which a single business operator centrally manages every information of a space object that can be monitored and issues an alarm when danger of collision is anticipated. However, as a total number of objects in outer space increases and a number of identifiable objects in SSA increases, it has become difficult to realize a space traffic management system in which a single business operator updates orbital information of every space object in a real-time manner. Another framework is thus required in which decentralized management of orbital information is performed.

In addition, advent of a mega-constellation business operator has created a situation where it is difficult to share business operator management information of real-time orbit control of a satellite group consisting of more than one thousand satellites, with another business operator. This makes it difficult for a business operator other than a mega-constellation business operator to perform collision analysis of a space object including a mega-constellation satellite.

Meanwhile, it is also difficult for a mega-constellation business operator to perform collision analysis including orbital information of every space object. A new framework that realizes collision analysis is thus required.

Also, when handling the orbital information of the space object, it is rational to handle accuracy and update frequency separately, for example, real-time high-accuracy orbital information for performing real-time tracking control and orbit control of its own space object and low-accuracy orbital information to be information-disclosed to the other business operator separately, according to the use. Hence, a framework has been sought in which after data format compatibility and identification IDs are shared, business operators to share information with can be selected according to the purpose, and contents of information to be shared can be inspected.

In a case where approach involving a collision risk on an orbit or intrusion into a dangerous region is anticipated, this must be shared as information quickly and with a minimum effort.

Furthermore, when avoiding a collision risk, a collision avoidance action by human orbit control is effective. Regarding this, it is necessary to clearly divide roles as to which one of objects anticipated to collide with each other takes a collision avoidance action.

According to the space traffic management system 500 illustrated in FIGS. 11 and 12, if decentralized management of the orbital information is performed and another business operator announces intrusion of a space object into the dangerous region where a mega-constellation satellite group is flying, an effect is achieved that the mega-constellation business operator can realize collision analysis on its own.

Necessary information can be shared in a normal situation. In addition, an environment can be provided in which danger analysis can be performed only with an identification ID of a space object whose danger is anticipated. Therefore, an effect that sharing information quickly and with a minimum effort can be realized is achieved, and thus an effect that a danger avoidance action can be taken at an early stage is achieved.

Furthermore, with danger avoidance action assist that offers options of a rational danger avoidance action in advance, an action to cope with the danger can be taken at an early stage, providing a large risk-reducing effect.

Figure 13:
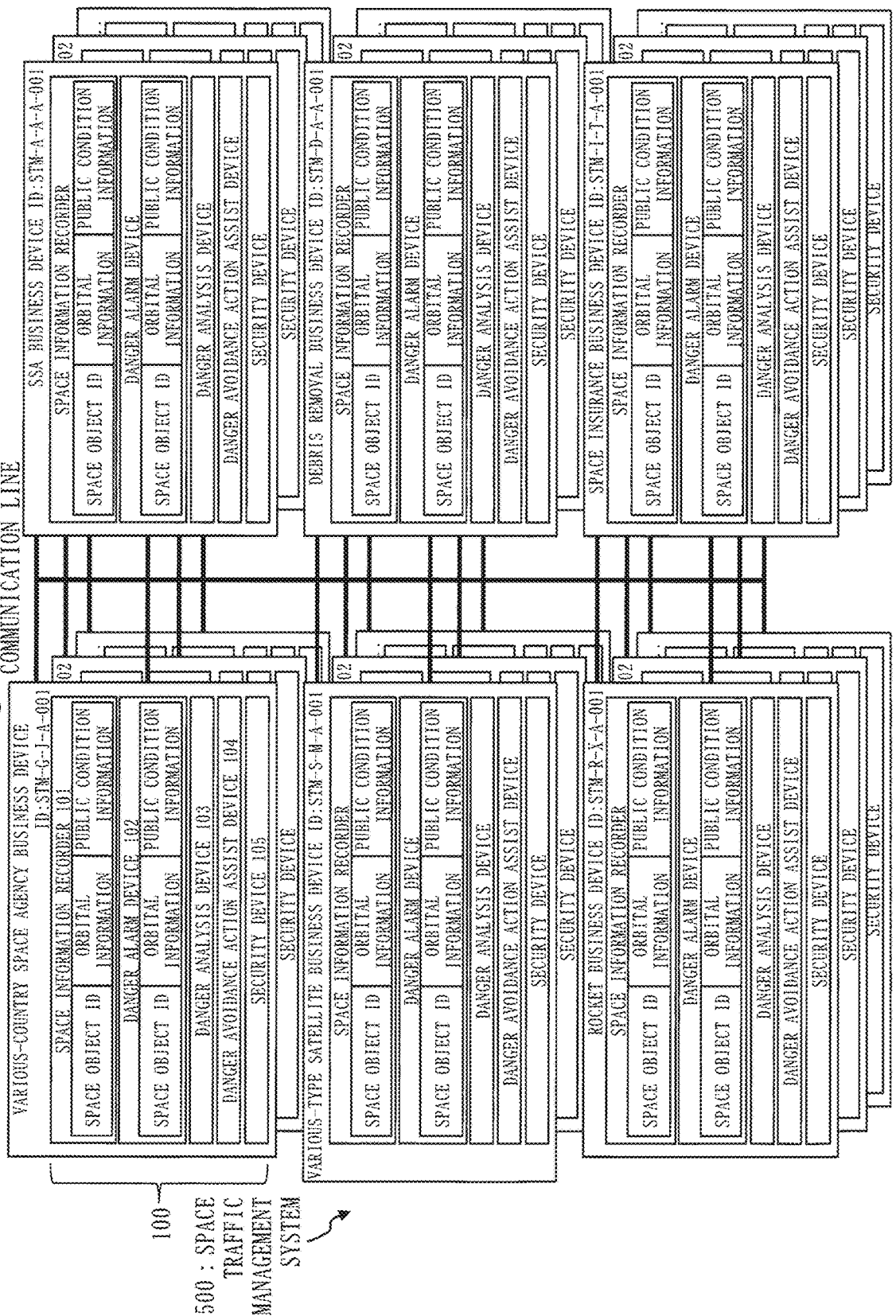
FIG. 13 is a configuration diagram illustrating Example 5-3 of the space traffic management system according to Embodiment 1.

FIG. 13 is a configuration diagram illustrating Example 5-3 of the space traffic management system 500 according to the present embodiment.

In FIG. 13, the business devices in the space traffic management system 500 are constituted of all or some of following business devices.

A government-affiliated business device which manages domestic and foreign government-affiliated satellites A space agency business device which manages satellites owned by domestic and foreign space agencies A mega-constellation business device which manages a satellite constellation constituted of a satellite group of 100 or more satellites A constellation business device which manages a satellite constellation constituted of a satellite group of 10 or more satellites A satellite business device constituted of less than 10 single-function satellites or a small number of satellites A rocket launch business device An SSA business device which manages information of self-generated space objects An SSA business device which manages information of artificial space objects A debris removal business device which captures and removes a space object being debris A danger avoidance assist business device which manages assist information that prevents a collision accident of a space object A space insurance business device which operates space insurance.

Example 5-3 of the space traffic management system 500 illustrated in FIG. 13 achieves an effect that business operators of all artificial space objects can share information regardless of whether they are public business operators or private business operators.

Also, an effect is achieved that business operators of various types of space objects such as a mega-constellation satellite group, a small- or middle-scale constellation satellite group, an individual satellite, a rocket, and a debris removal satellite can share information.

Also, an effect is achieved that information can be shared even with an SSA business operator which acquires object information of outer space with a ground-based radar or telescope and manages an information database.

Furthermore, an effect is achieved that by sharing information with a space insurance business operator, preparation to cope with anticipated collision of a space object in a normal situation, and emergency response for damage compensation after occurrence of a collision accident can be carried out rationally.

Also, flight safety management of a space object is constituted of all or some of following management items.

Orbit management of a space object

Management of rocket launch timing

De-orbit orbit management of a space object

Prediction management of collision among a plurality of space objects

Monitoring management of a space object

Prevention management of collision of a plurality of space objects

Information management after occurrence of a collision accident

Damage compensation management after occurrence of a collision accident

When flight safety management of a space object is constituted as described above, flight safety can be ensured for a mega-constellation business of a satellite group in which several thousand satellites fly at the same nominal orbital altitude.

Also, flight safety is ensured not only for a steadily operated satellite. Flight safety can also be ensured for a rocket being launched, a space object during orbital transfer, a de-orbiting space object, a debris removal satellite, and so on.

Also, a danger alarm can be quickly and with a minimum effort received from and sent to the SSA business operator and the analysis business operator which acquire object information of outer space with the ground-based radar or telescope and manage an information database. This achieves an effect of carrying out danger avoidance rationally.

By building a contractual relationship with the security business operator, an effect of improving the sense of commitment and motivation to ensure flight safety is achieved.

The space object ID provided to the space information recorder 101 and having compatibility is constituted of all or some of: a satellite ID which identifies an individual satellite; and a satellite group ID which identifies a satellite group in which a plurality of satellites cooperate with each other to fulfill a single function or performance.

Orbital information of the individual satellite includes an orbital epoch, an orbital element, and a predicted error of the individual satellite.

Orbital information of the satellite group includes an upper limit value and a lower limit value of an orbital altitude of the constituent satellite group, and an upper limit value and a lower limit value of an orbital inclination.

Information of a region where the satellite group flies is shared with a mega-constellation satellite group with which real-time high-accuracy orbital information is difficult to exchange. This information sharing achieves an effect that another business operator can announce an intrusion alarm for the region where the satellite group flies, without performing collision analysis of each individual satellite.

Also, it is possible to perform group management of space objects of a plurality of business operators, flying in the vicinity of 10:30 LST of a sun-synchronous orbit or in a dangerous region such as a polar region where a large number of polar-orbit satellite groups fly. This achieves an effect of sharing information quickly and with a minimum effort.

Figure 14:
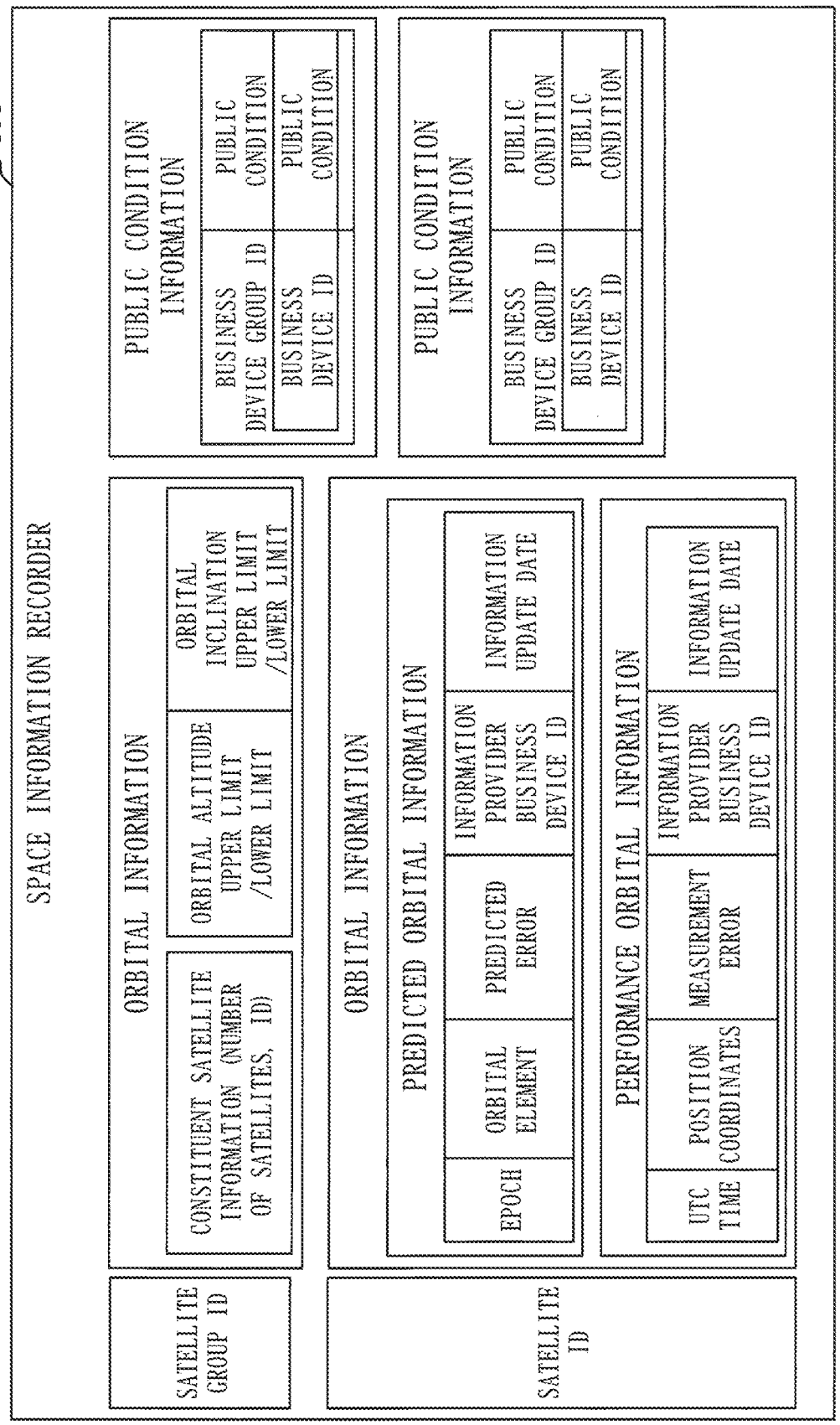
FIG. 14 is a diagram illustrating an example of a space information recorder according to Embodiment 1.

FIG. 14 is a diagram illustrating an example of the space information recorder 101 according to the present embodiment.

The public condition information provided to the space information recorder 101 includes a business device ID, and a business device group ID which identifies a business device group formed of a plurality of business devices.

A public condition is constituted of all or some of: a condition for permitting publication or not; a condition of cost allocation; and an information update condition indicating a frequency of information update or an event that triggers information update.

According to the space information recorder 101 of FIG. 14, an information public condition for an individual business operator can be managed. In addition, the information public condition can be managed for a business device group. Therefore, management of the information public condition for a plurality of SSA business operators, a plurality of space security business operators, a plurality of debris removal business operators, and the like can be can be performed at once. This achieves an effect of sharing information quickly and with a minimum effort.

Also, it is possible to perform group management of a plurality of business operators which run flight in the vicinity of 10:30 LST of a sun-synchronous orbit or in a dangerous region such as a polar region where a large number of polar-orbit satellite groups fly. This achieves an effect of sharing information quickly and with a minimum effort.

Figure 15:
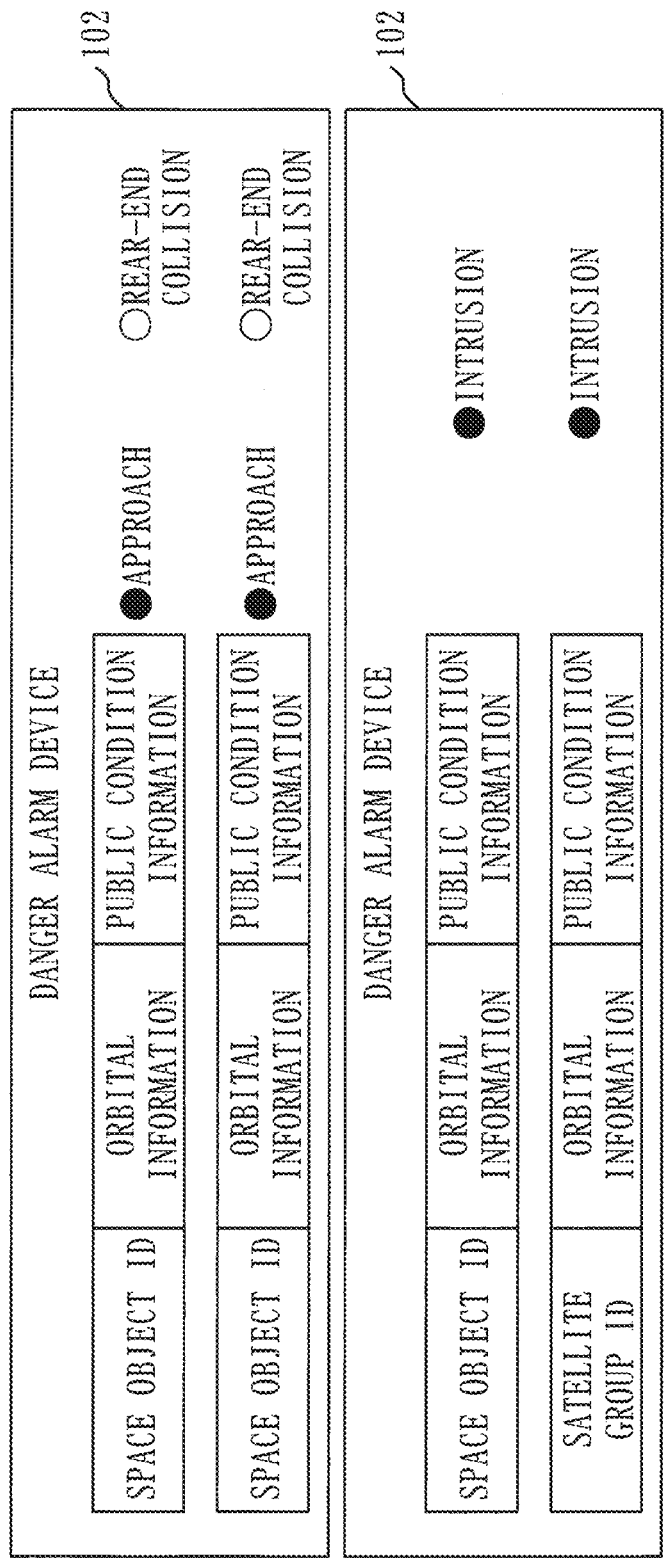
FIG. 15 is a diagram illustrating examples of a danger alarm device according to Embodiment 1.

FIG. 15 is a diagram illustrating examples of the danger alarm device 102 according to the present embodiment.

The danger alarm device 102 includes all or some of the following pieces of information.

A collision alarm displayed when collision between a space object A and a space object B is anticipated An approach alarm displayed when approach of a space object A and a space object B to each other to fall within a dangerous distance is anticipated An intrusion alarm displayed when intrusion of a space object A into a flight region of a satellite group C is anticipated A space object ID of a space object A A space object ID of a space object B A satellite group ID of a satellite group C intrusion into which is anticipated.

According to the danger alarm device 102 of FIG. 15, an effect is achieved that if any one of a plurality of business operators anticipates danger, information of the anticipation can be shared among related business operators quickly and with a minimum of effort.

By announcing only a space object ID or a satellite group ID, the orbital information can be shared by the space object recorders. This achieves an effect of sharing information quickly and with a minimum effort.

Figure 16:
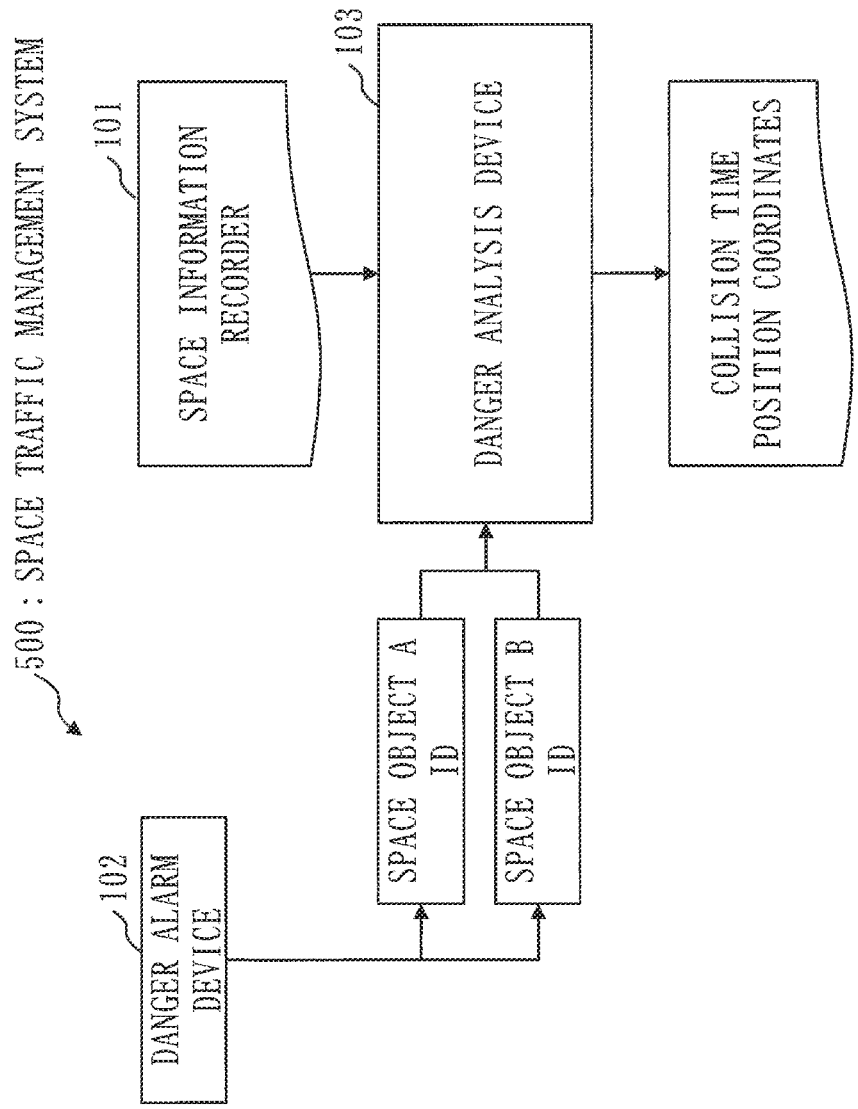
FIG. 16 is a diagram illustrating Example 5-4 of the space traffic management system according to Embodiment 1.

FIG. 16 is a diagram illustrating Example 5-4 of the space traffic management system 500 according to the present embodiment.

A danger analysis device 103 mounted in each of the plurality of business devices is provided with a common algorithm. Upon input of a space object ID of a space object A and a space object ID of a space object B which are included in a danger alarm device 102, the danger analysis device 103 can reproduce an analysis result of a danger analysis device 103 owned by a business operator that has transmitted a danger alarm.

Upon acquisition of the space object ID of the space object A and the space object ID of the space object B from the danger alarm device 102 of another business device, the danger analysis device 103 outputs a collision time and collision position coordinates by the common algorithm, using the space information recorder 101.

With the space traffic management device 100 of FIG. 16, information such as a span of time and an approach distance at which dangerous approach or collision is anticipated can be produced only by exchanging the space object ID. This achieves an effect that danger information can be recognized and shared quickly and with a minimum effort.

Figure 17:
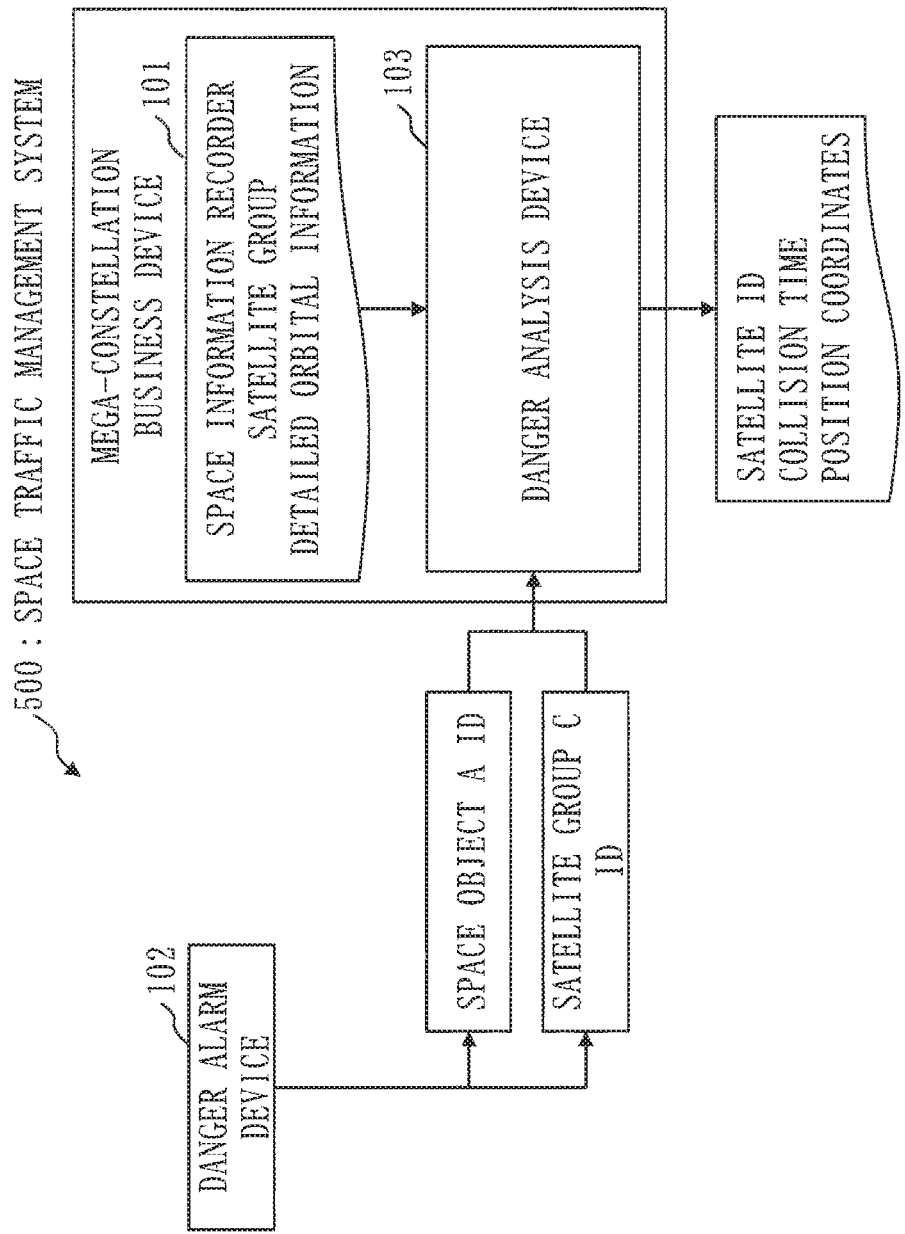
FIG. 17 is a diagram illustrating Example 5-5 of the space traffic management system according to Embodiment 1.

FIG. 17 is a diagram illustrating Example 5-5 of the space traffic management system 500 according to the present embodiment.

In a case where an intrusion alarm against a space object A intruding into a dangerous region is displayed and the dangerous region is a region in which a mega-constellation or constellation satellite group C flies, following processing can be performed in a danger analysis device 103.

Under the above condition, assume that a space object ID of a space object A and a space object ID of a space object B which are included in a danger alarm device 102 are inputted to the danger analysis device 103. Then, a mega-constellation business device or a constellation business device performs danger analysis using detailed satellite-group orbital information from a space information recorder 101 mounted in its own device. The mega-constellation business device or the constellation business device anticipates collision of an individual satellite and outputs a collision time and collision point coordinates.

An effect is achieved that a business operator not having real-time high-accuracy information of a mega-constellation satellite can announce a danger alarm to a mega-constellation business operator.

Also, an effect is achieved that a mega-constellation business operator can analyze whether there is a collision risk against the individual satellite, and analyze a satellite ID, a collision time, and point coordinates in a case where danger is anticipated, from the real-time detailed orbital information managed by the mega-constellation business operator itself.

As a result, an effect of realizing a new framework that enables decentralized management of the orbital information and danger anticipation is achieved.

The danger avoidance action assist device 104 displays to the space object A, the space object B, or the satellite group C whose danger is announced by the danger alarm device 102, all or some of followings.

A business device of the space object A takes a danger avoidance action
A business device of the space object B takes a danger avoidance action
A business device of the satellite group C takes a danger avoidance action
A debris removal business device takes a danger avoidance action
Neither the space object A nor the space object B takes a danger avoidance action
Neither the space object A nor the satellite group C takes a danger avoidance action
A rocket launch business device takes a danger avoidance action
A business device of a space object during orbital transfer takes a danger avoidance action
A business device of a de-orbiting space object takes a danger avoidance action
Consensus has been made among related parties
Consensus has not been made yet among related parties and adjustment is required In a case where collision of a space object is anticipated, if a plurality of business operators execute a collision avoidance action at the same time without control, another risk of collision occurs after the avoidance.

In a dangerous region where a satellite having an avoidance function and a satellite not having even a propulsion device coexist as in the vicinity of 10:30 LST of the sun-synchronous orbit, a situation may occur where the plurality of business operators cannot execute a collision avoidance action even under control. Therefore, it is effective to categorize roles of taking an avoidance action in accordance with a situation of a space object concerning a danger alarm and to prepare options in advance.

In a mega-constellation satellite group, a situation where danger alarms are produced successively and frequently may occur. Not taking an avoidance action in response to each danger alarm can be beneficial in a viewpoint of economic rationality.

If these options are prepared, an effect of setting danger avoidance action guidelines quickly and with a minimum effort is achieved.

It is also required to form consensus among a plurality of business operators for which collision is anticipated. There is a possibility that with the danger avoidance action assist device 104 described above, consensus can be formed swiftly. Also, there is another effect that if consensus cannot be formed, an adjusting work can be initiated at an early stage.

The security device 105 is constituted of all or some of: an encryption device; a password system; and a biometric system, which are designed to prohibit an unauthorized user from changing information.

Figure 18:
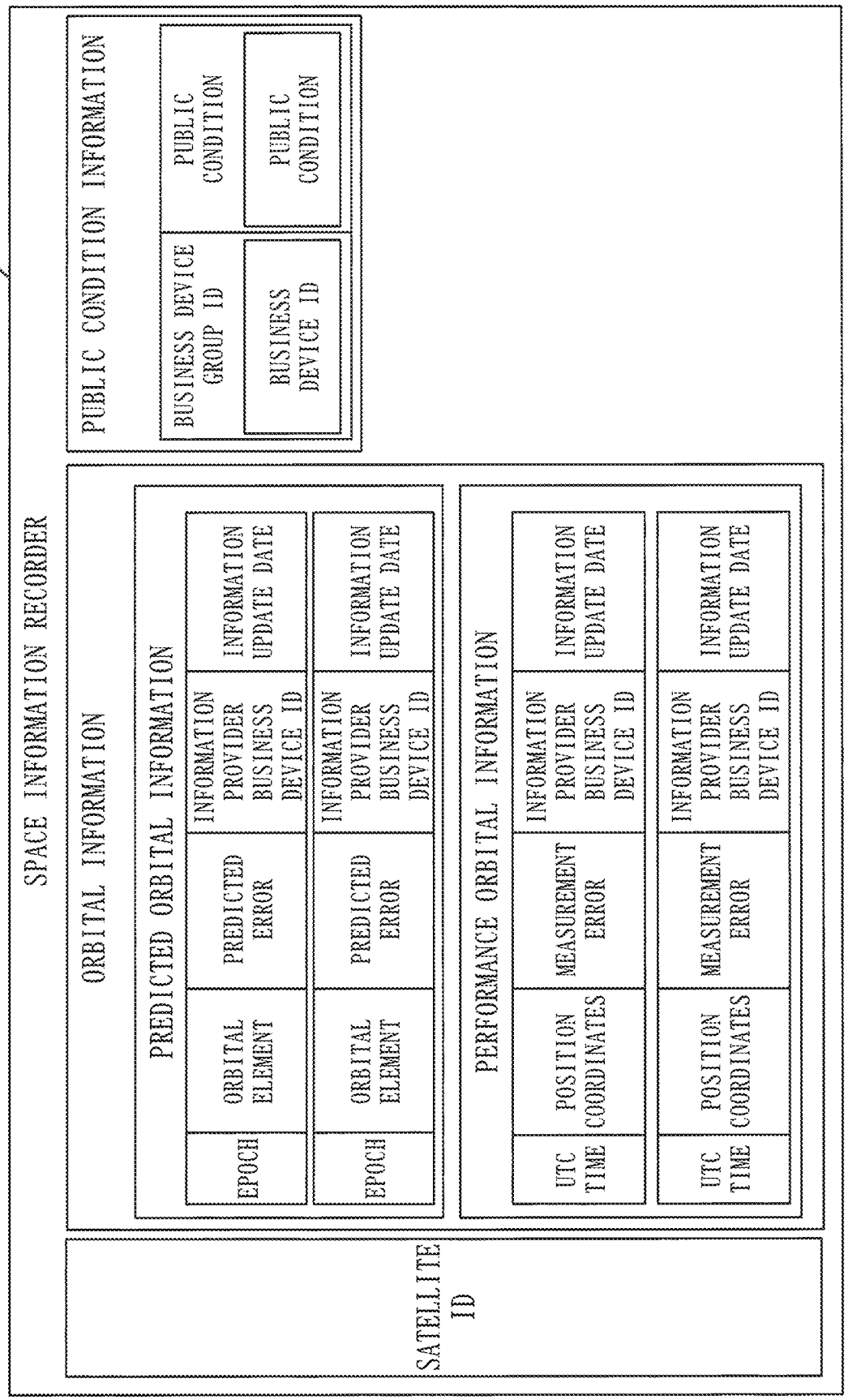
FIG. 18 is a diagram illustrating an example of the space information recorder according to Embodiment 1.

FIG. 18 is a diagram illustrating an example of the space information recorder 101 according to the present embodiment.

The space information recorder 101 is constituted of all or some of: a plurality of pieces of orbital information which are provided by different business devices; and a plurality of pieces of orbital information which are updated at different information update dates, concerning a space object ID.

Predicted errors and measurement errors differ among information provider business operators. For example, orbital information used by a satellite-owning business operator to track and control its own satellite has a smaller predicted error and a smaller measurement error than orbital information measured by an SSA business operator with a ground-based radar or telescope has.

The space information recorder 101 according to the present embodiment achieves an effect that when a predicted error or measurement error is used as a calculation criteria for assessing an insurance rate and insurance money of a space insurance, higher-accuracy information can be chosen.

The space traffic management device 100 functions as a portal site.

A business device and a space traffic management device mounted in the business device serve as an information processing function that can be implemented even by a virtual device in a virtual space of a cloud. Therefore, an implementation method of setting a portal by using a server display function of an SSA business operator is valid, achieving an effect of facilitating centralized management of public information.

* Description of Operations *

Figure 19:
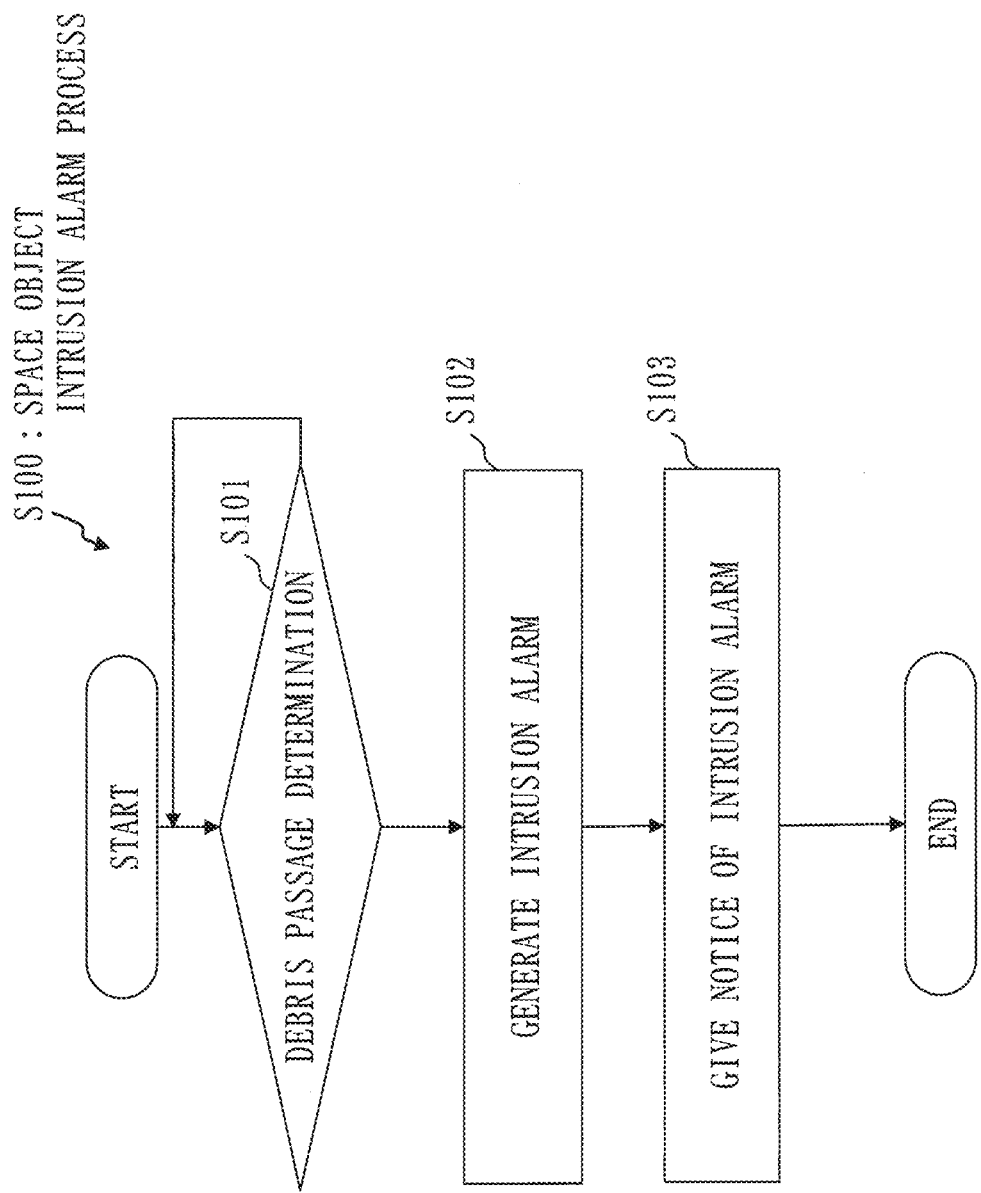
FIG. 19 is a flowchart of a space traffic management process performed by the space traffic management system according to Embodiment 1.

FIG. 19 is a flowchart illustrating space object intrusion alarm process S100 as an example of the space traffic management process performed by the space traffic management device 100 according to the present embodiment.

Figure 20:
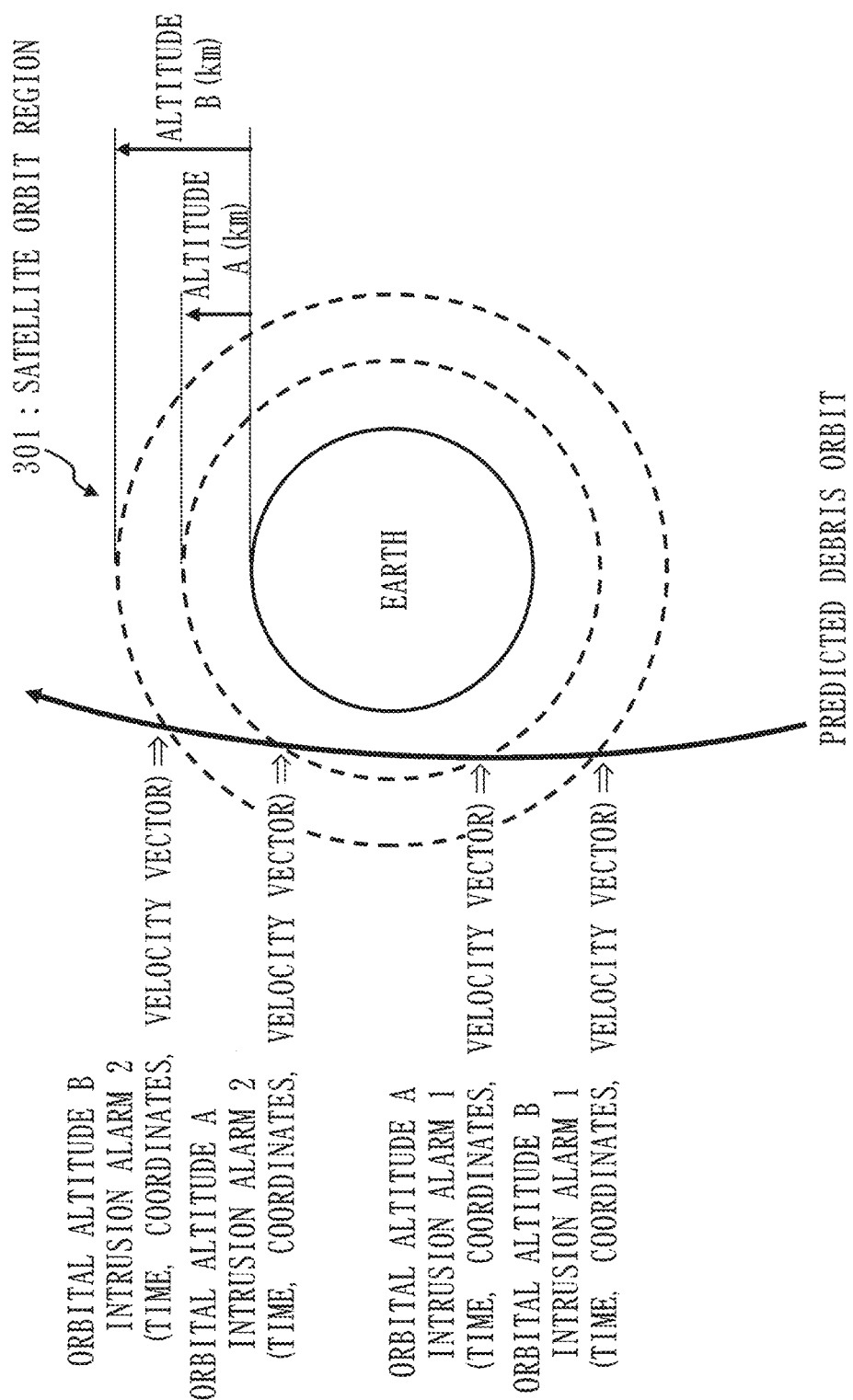
FIG. 20 presents examples of a predicted orbit of debris passing through a satellite constellation according to Embodiment 1, and examples of an intrusion alarm.

FIG. 20 is a diagram illustrating examples of a predicted orbit of debris passing through the satellite constellation 20 according to the present embodiment, and examples of an intrusion alarm 111.

<Operations of Space Object Intrusion Alarm Process S100>

In step S101, on the basis of the satellite orbit prediction information 52 and the debris orbit prediction information 53, the passage determination unit 110 determines whether or not debris passes through a satellite orbit region 301 which is an orbit or region where a plurality of satellites forming the satellite constellation 20 fly. Specifically, the satellite orbit region 301 is an orbit on which the satellite constellation 20 is formed. If it is determined that the debris passes through the satellite orbit region 301, the processing proceeds to step S102. If it is not determined that the debris passes through the satellite orbit region, the process of step S101 is repeated.

In step S102, the alarm generation unit 120 generates the intrusion alarm 111 including a predicted time, predicted position coordinates, and predicted velocity vector information about passage of the debris.

FIG. 20 illustrates how the debris passes through the satellite orbit region 301 where a satellite constellation A at an orbital altitude of A km and a satellite constellation B at an orbital altitude of B km are formed. On the basis of the satellite orbit prediction information 52 and the debris orbit prediction information 53, the passage determination unit 110 determines whether or not the predicted orbit of the debris passes through the satellite constellation. In FIG. 20, an entrance and exit of the satellite constellation A and an entrance and exit of the satellite constellation B are the passage points of the satellite constellation 20.

The alarm generation unit 120 generates, about each of the four passage points, the intrusion alarm 111 including "time, coordinates, and velocity vector" which are predicted at the time of passage.

In step S103, the alarm notification unit 130 notifies the management business device 40 utilized by a management business operator which manages satellites flying in the satellite orbit region 301, of the intrusion alarm 111. Specifically, the intrusion notification unit notifies the satellite constellation business device used by a satellite constellation business operator which operates the satellite constellation, of the intrusion alarm. The satellite constellation business device is a business operator that runs a satellite constellation business, and is, for example, the mega-constellation business device 41, the LEO constellation business device 42, or the satellite business device 43.

Figure 21:
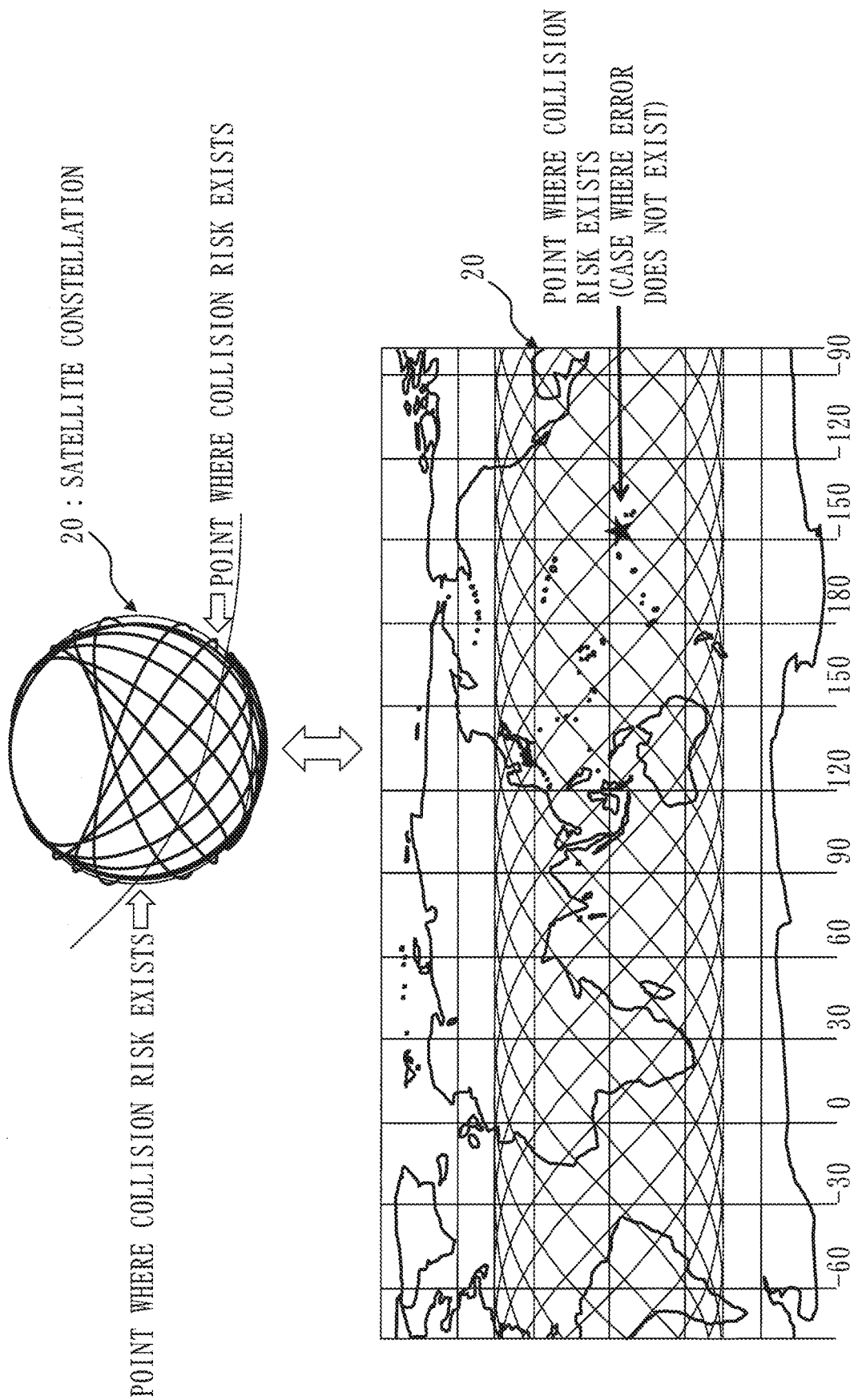
FIG. 21 presents an example of a collision risk of a satellite constellation and debris in a case where there is no an error.

FIG. 21 is a diagram illustrating an example of a collision risk of the satellite constellation 20 and debris in a case where there is no error.

Figure 22:
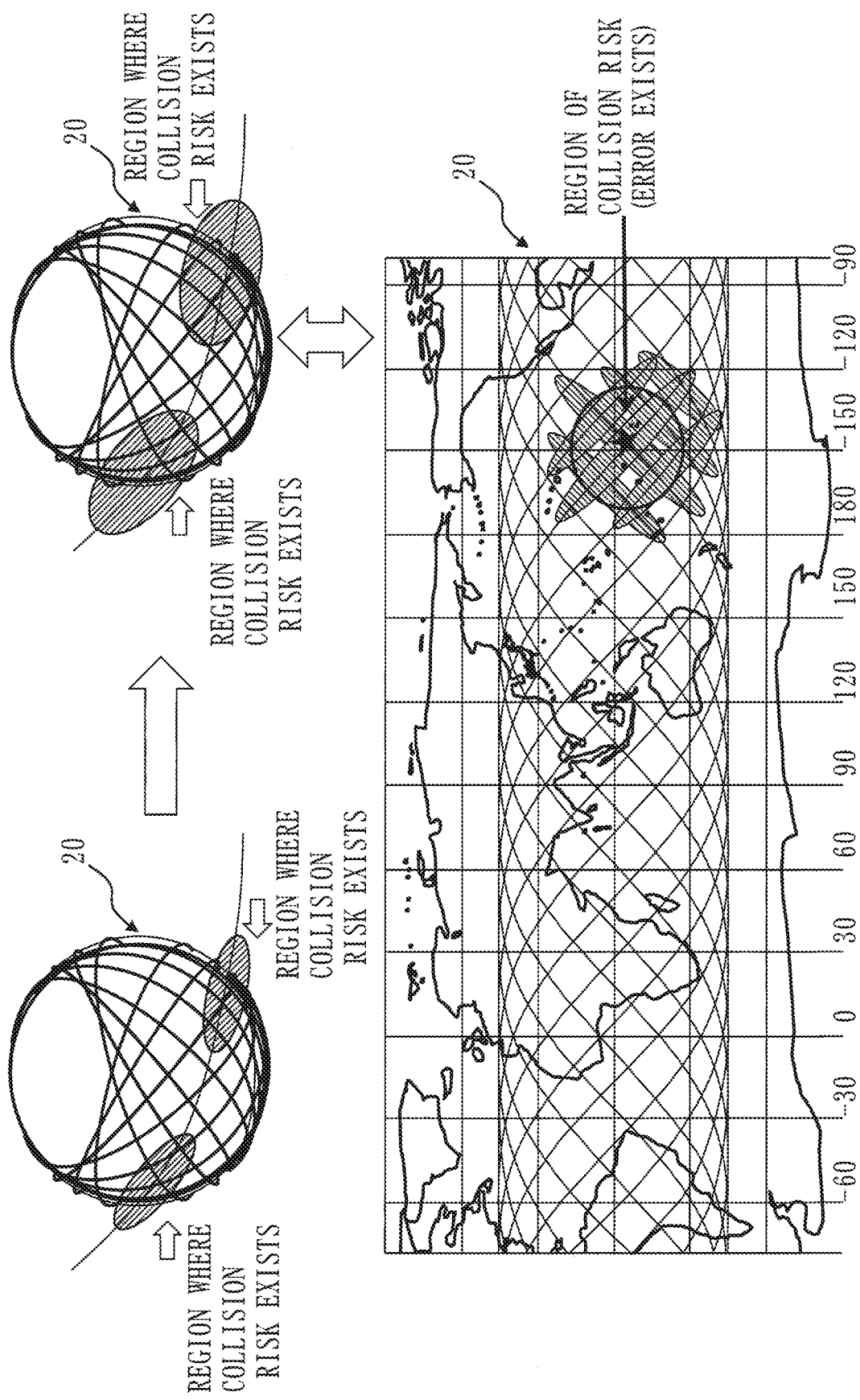
FIG. 22 presents an example of a collision risk of a satellite constellation and debris in a case where an error exists.

FIG. 22 is a diagram illustrating an example of a collision risk of a satellite constellation 20 and debris according to the present embodiment.

When a debris intrusion alarm is issued for a satellite group of a mega-constellation as a target, it is difficult for the alarm issuing side to distinguish an approach alarm and a collision alarm. A notion of a collision risk and approach risk in the mega-constellation will now be described.

A collision risk is present only at two portions: an entrance and an exit that pass at a particular altitude. Meanwhile, satellites that may collide are a large number of satellites flying along a nearby orbit. If a predicted orbit of the debris does not include an error, and orbital altitudes at which the satellites of the mega-constellation fly do not vary, points where a collision risk exists can be identified, which are limited to the two points: the entrance and the exit.

In practice, however, the predicted orbit of the debris has an error, and the orbital altitudes at which the satellites of the mega-constellation fly vary or include an error. Therefore, the collision risk does not exist at a point but has a spatial spread as a region. Also, a time error in a debris flying direction is reduced to a spatial error in the flying direction. Furthermore, on the mega-constellation side, satellites involving a collision risk increase as the flight distance increases in accordance with the time error.

There is a case where an approach alarm is issued when a relative distance is reduced to 100 km or less. In this case, an area enlarged by about 100 km from the predicted error is the "area involving an approach risk". Hence, the target satellites for the mega-constellation side increase furthermore.

A low-orbital satellite generally flies for approximately 7 km/sec to 10 km/sec. Hence, a time difference of 10 seconds will lead to an area enlargement of approximately 100 km.

Regarding the position coordinates, the position can be uniquely identified if a coordinate system such as Earth-fixed coordinate system WGS84 is employed. However, a satellite orbital plane of a mega-constellation is constantly changing relative to the Earth. Accordingly, strictly speaking, only the mega-constellation business operator is able to recognize at which position the orbital plane is located at a particular time. In addition, it is only the mega-constellation business operator that accurately recognizes on what part of the orbital plane the satellite is flying.

Hence, in a case where an SSA business operator appears to succeed the alarm service of the US CSpOC, it suffices for the SSA business operator to notify the mega-constellation business operator of a predicted time, predicted position coordinates, and a predicted velocity vector about passage at a concerned orbital altitude, as an "alarm". In the present embodiment, this "alarm" is referred to as the intrusion alarm 111. The role of a satellite constellation business operator such as a mega-constellation business operator is to take an avoidance action in response to the intrusion alarm 111.

<Collision Avoidance by Satellite Constellation Forming System>

The satellite constellation forming system 600 described with referring to FIGS. 5 to 8 controls the satellite constellation 20 on the basis of the intrusion alarm 111 by the space traffic management device 100, so as to avoid debris intruding into the satellite constellation 20.

As illustrated in FIGS. 5 to 8, the satellite constellation forming system 600 may be mounted in the ground facility 700. In that case, the ground facility 700 controls an avoidance action of avoiding collision caused by the debris intruding into the satellite orbit region 301 and a satellite constituting the satellite constellation 20, on the basis of the intrusion alarm 111 by the space traffic management device 100.

The satellite constellation business operator is capable of performing an operation of avoiding collision using the satellite constellation forming system 600, without largely changing the relative positional relationship among all the satellites by, for example, a method of at least accelerating or decelerating all satellites at once. Therefore, using the intrusion alarm 111 according to the present embodiment, the satellite constellation forming system 600 can avoid debris collision.

* Description of Effect of Present Embodiment *

When it is determined that debris will intrude into the satellite constellation, the space traffic management device 100 according to the present embodiment can issue an intrusion alarm including a predicted time, predicted position coordinates, and predicted velocity vector information. In this manner, the space traffic management device 100 according to the present embodiment can determine whether or not debris will intrude into an orbital region of the satellite constellation, and can issue an appropriate intrusion alarm. Also, a satellite constellation forming system or a ground facility that has been notified of the intrusion alarm according to the present embodiment can take an appropriate avoidance action.

* Other Configurations *

In the present embodiment, the functions of the space traffic management device 100 are implemented by software. A modification may be possible in which the functions of the space traffic management device 100 are implemented by hardware.

Figure 23:
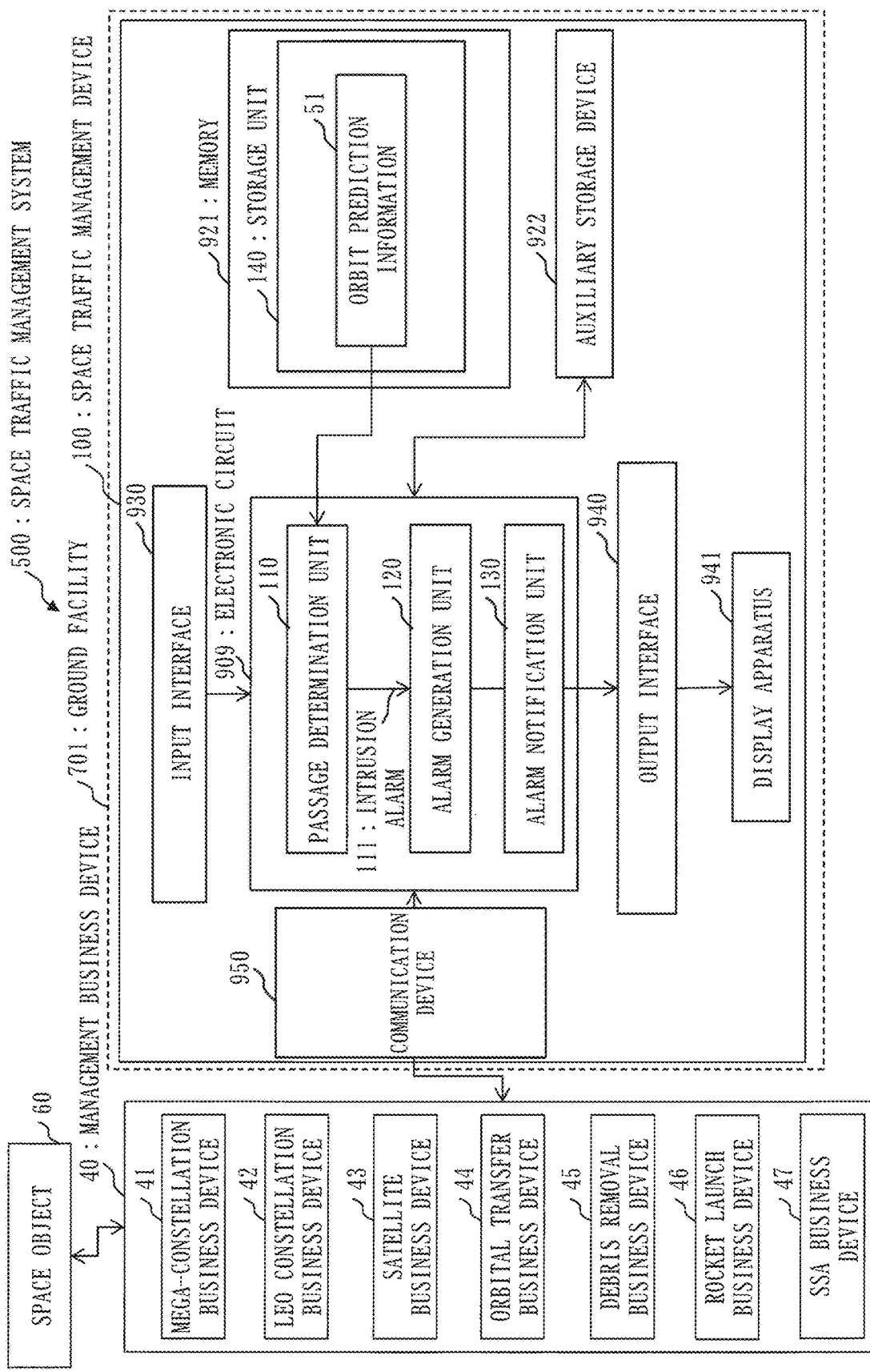
FIG. 23 is a configuration diagram of a space traffic management system according to a modification of Embodiment 1.

FIG. 23 is a diagram illustrating a configuration of a space traffic management device 100 according to a modification of the present embodiment.

The space traffic management device 100 is provided with an electronic circuit 909 in place of a processor 910.

The electronic circuit 909 is a dedicated electronic circuit that implements functions of the space traffic management device 100.

The electronic circuit 909 is specifically a single circuit, a composite circuit, a programmed processor, a parallel-programmed processor, a logic IC, a GA, an ASIC, or an FPGA. Note that GA stands for Gate Array.

The functions of the space traffic management device 100 may be implemented by one electronic circuit, or by a plurality of electronic circuits by dispersion.

Another modification may be possible in which some of the functions of the space traffic management device 100 are implemented by an electronic circuit and the remaining functions are implemented by software.

The processor and the electronic circuit are called processing circuitry as well. That is, the functions of the space traffic management device 100 are implemented by processing circuitry.

Embodiment 2

In the present embodiment, a difference from Embodiment 1 or an additional point to Embodiment 1 will mainly be described. In the present embodiment, the same configuration as in Embodiment 1 will be denoted by the same reference sign, and its description will sometimes be omitted.

In vicinities of 10:30, 13:00, 06:00, and 18:00 LST of the sun-synchronous orbit, there exist crowded regions where a large number of Earth observation satellites fly. In polar regions, there exists a crowded region where intersections of all orbital planes of the sun-synchronous orbit satellite group are concentrated and all satellites pass.

Meanwhile, a framework idea of a mega-constellation business operator includes the following plans that are announced.

- A plan in which approximately 7,500 satellites fly as an inclined-orbit satellite group in the vicinity of an orbital altitude of 340 km
- A plan in which approximately 2,500 satellites fly as an inclined-orbit satellite group in the vicinity of an orbital altitude of 550 km
- A plan in which approximately 3,200 satellites fly as an inclined-orbit satellite group in the vicinity of an orbital altitude of 610 km
- A plurality of plans in which an inclined-orbit satellite group of several hundred to more than 1,000 satellites flies at an orbital altitude of 1,000 km or more These plans involve a crowded region where a satellite group flies in a particular-altitude region exhaustively.

The region described above where the crowded regions intersect is a dangerous region involving a very high risk of space object collision. In addition, this is a region where once space object collision occurs, it causes chained collision very likely, with the highest danger of leading to the Kessler syndrome.

When formulating international rules of the space traffic management STM, one of the most urgent and important issues is to determine traffic rules for a region where crowded regions intersect. However, as a wide variety of stakeholders are involved, it is difficult to coordinate discussions at international conferences and the like.

Under these circumstances, the present embodiment has as its objective to prevent a catastrophic space-object collision accident, and to alert the stakeholders to making a de-facto collision avoidance rule that is prompt and effective. Also, the present embodiment presents, in a space traffic management device proposed as an information sharing tool of the related business operators, a traffic rule for a region where a plurality of crowded regions intersect, a means for prompting alert to a dangerous region, and a means for promoting formulation of the de-facto collision avoidance rule. By doing so, an effect of avoiding collision of a space object and preventing the Kessler syndrome is achieved.

* Description of Configurations *

In the present embodiment, configurations of a satellite constellation forming system 600, space traffic management system 500, and space traffic management device 100 are the same as those described in Embodiment 1 with referring to FIGS. 5 to 9.

Figure 24:
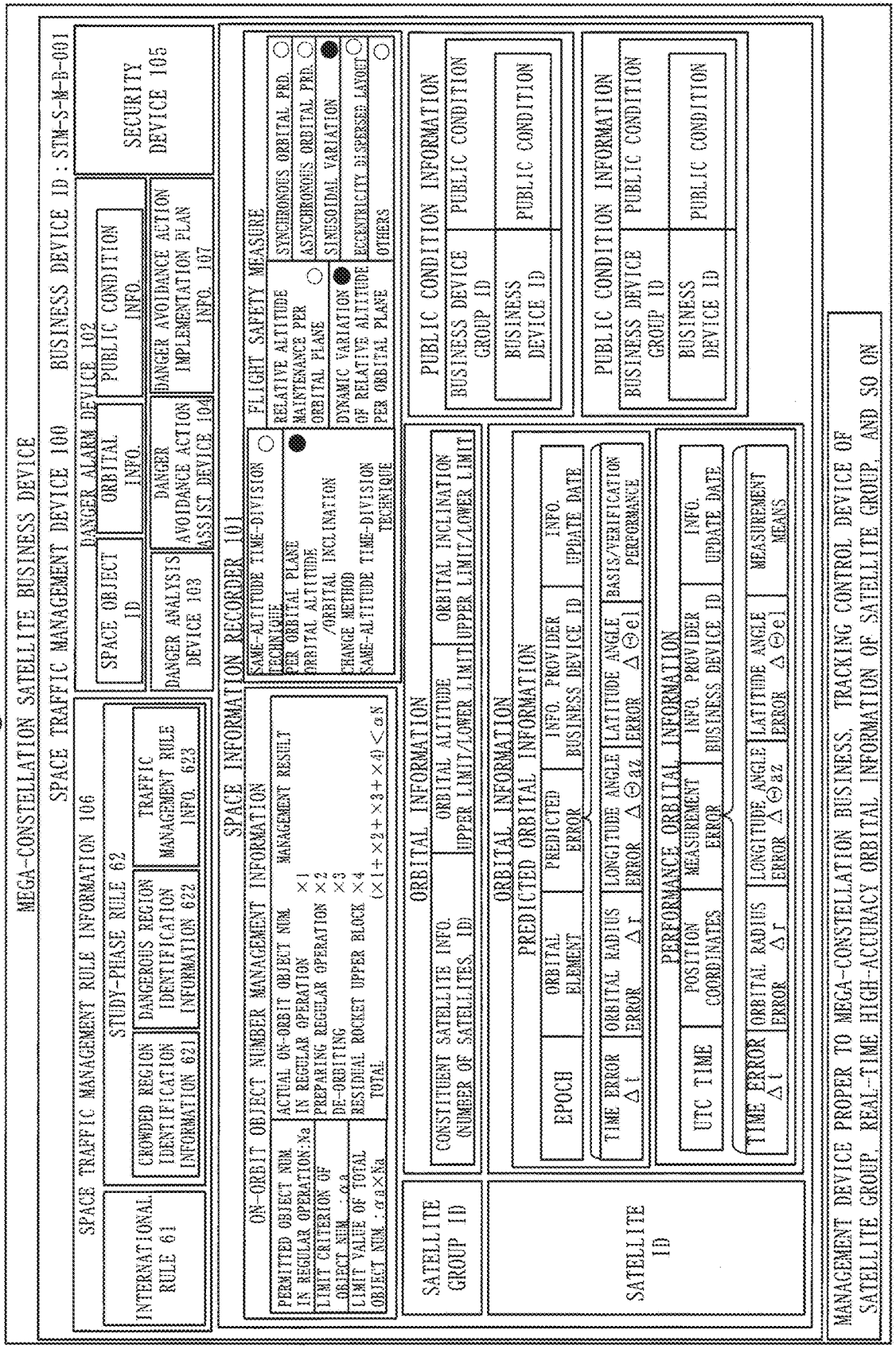
FIG. 24 is a diagram illustrating Example 1-3 of a space traffic management device according to Embodiment 2.

FIG. 24 is a diagram illustrating Example 1-3 of the space traffic management device 100 according to the present embodiment.

Figure 25:
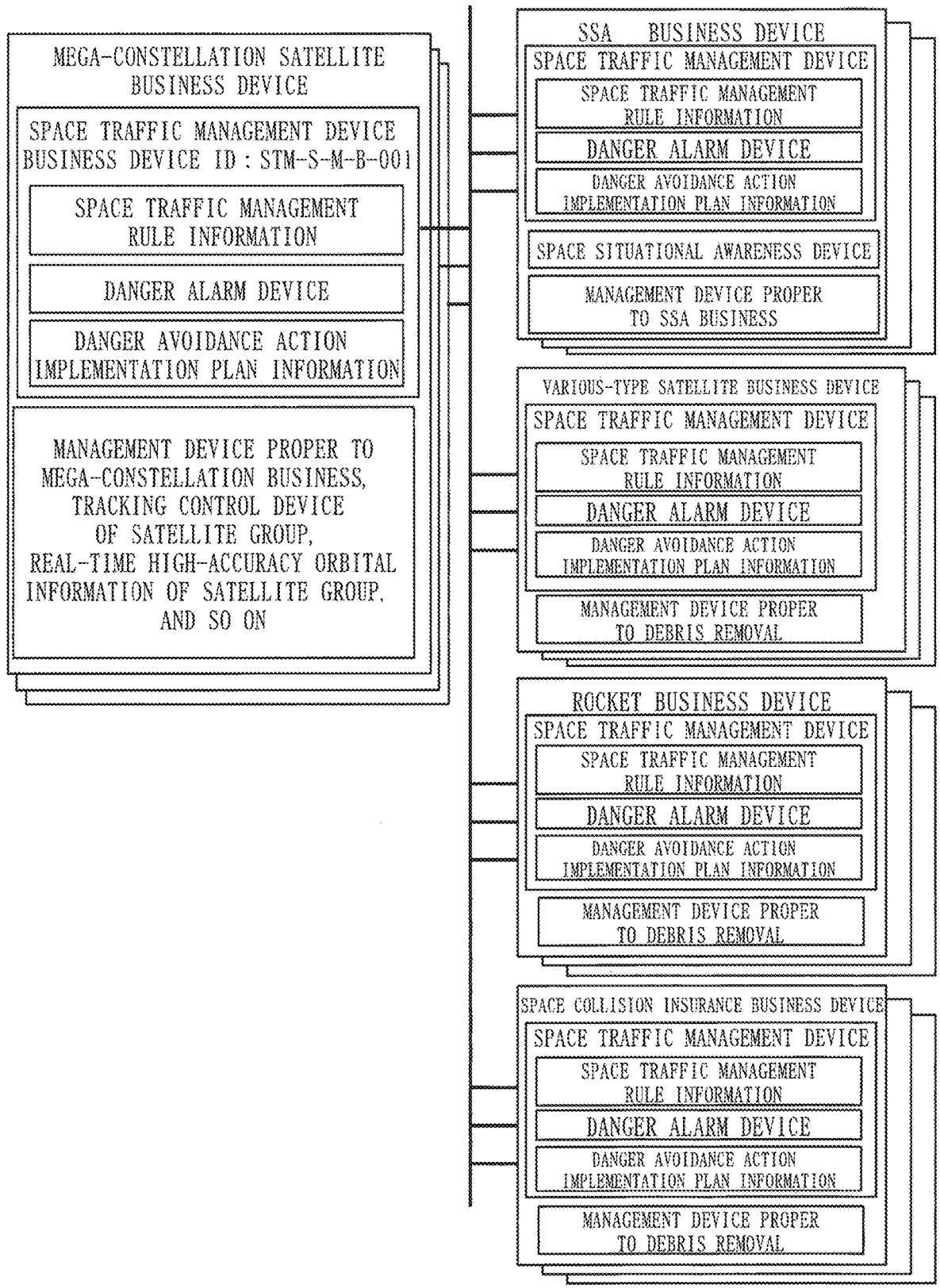
FIG. 25 is a diagram illustrating Example 5-5 of a space traffic management device according to Embodiment 2.

FIG. 25 is a diagram illustrating Example 5-5 of the space traffic management system 500 according to the present embodiment.

In FIG. 25, a detailed configuration of the space traffic management device 100 is not illustrated.

Each of the plurality of space traffic management devices 100 is provided with space traffic management rule information 106, a danger alarm device 102, and a danger avoidance action implementation plan information 107.

The space traffic management rule information 106 includes an international rule 61 internationally accepted according to Space Law, and a study-phase rule 62 before international acceptance.

The study-phase rule 62 includes all or some of: crowded region identification information 621 which identifies a crowded region; dangerous region identification information 622 which identifies a dangerous region where crowded regions intersect; and traffic management rule information 623 in a dangerous region.

On the basis of the effect described in Embodiment 1 of sharing information among the management business operators of the space objects, in the present embodiment, the space traffic management rule information is shared. This information sharing realizes flight safety in normal-situation design and in actual operation By making it a rule to announce anticipated danger and to share information of a danger avoidance action implementation plan, an effect of avoiding danger and realizing space traffic safety is achieved.

<Crowded Region Identification Information 621>

Figure 26:
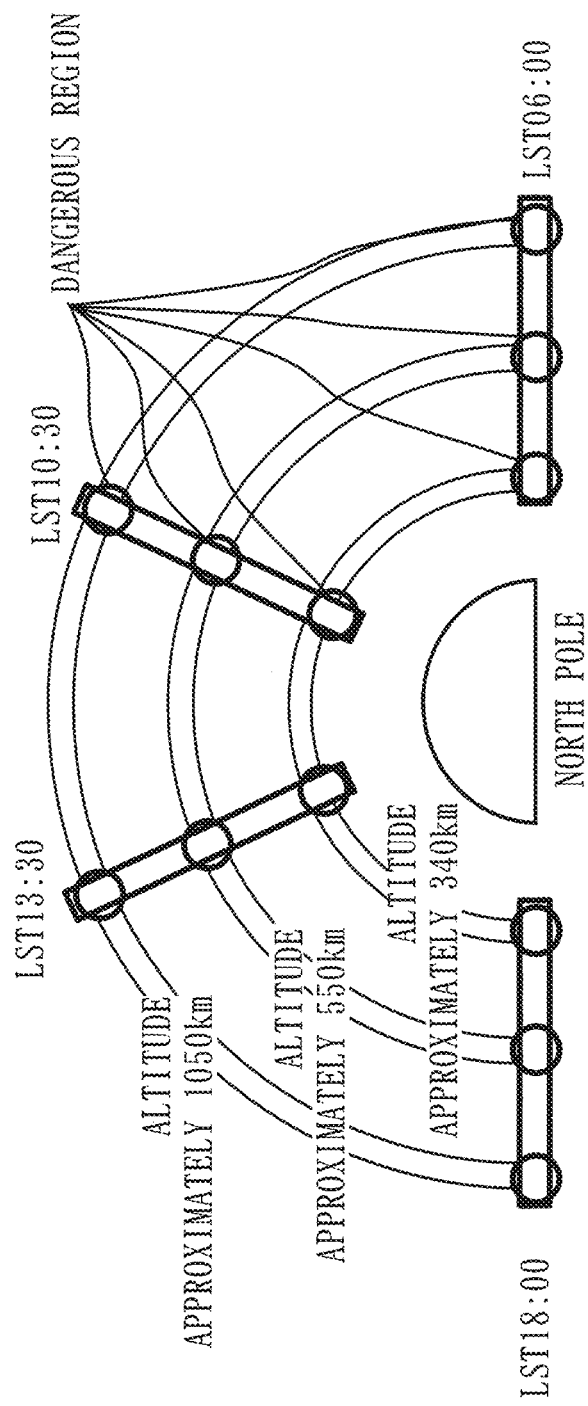
FIG. 26 is a diagram illustrating an example of crowded region identification information according to Embodiment 2.
Figure 27:
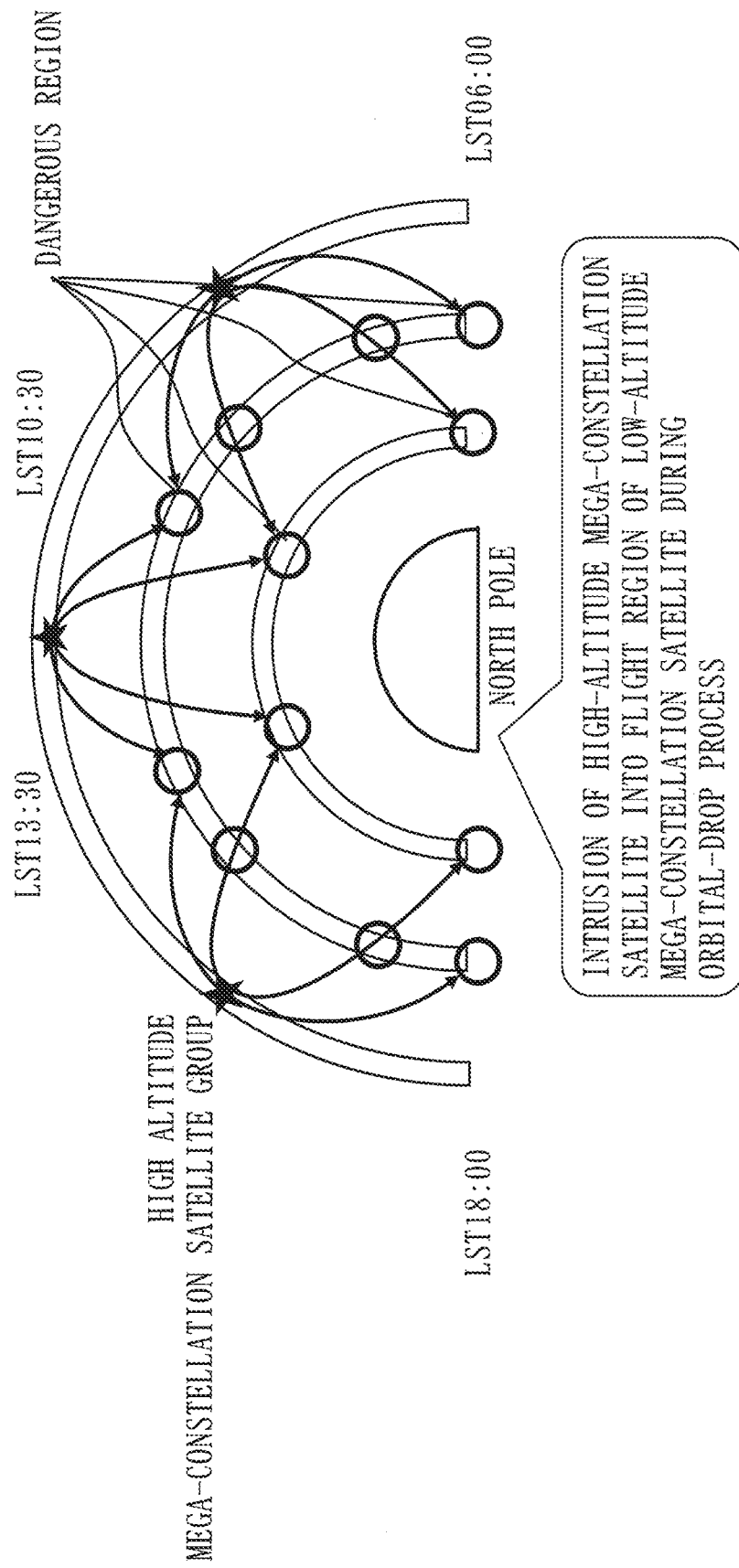
FIG. 27 is a diagram illustrating an example of dangerous region identification information according to Embodiment 2.
Figure 28:
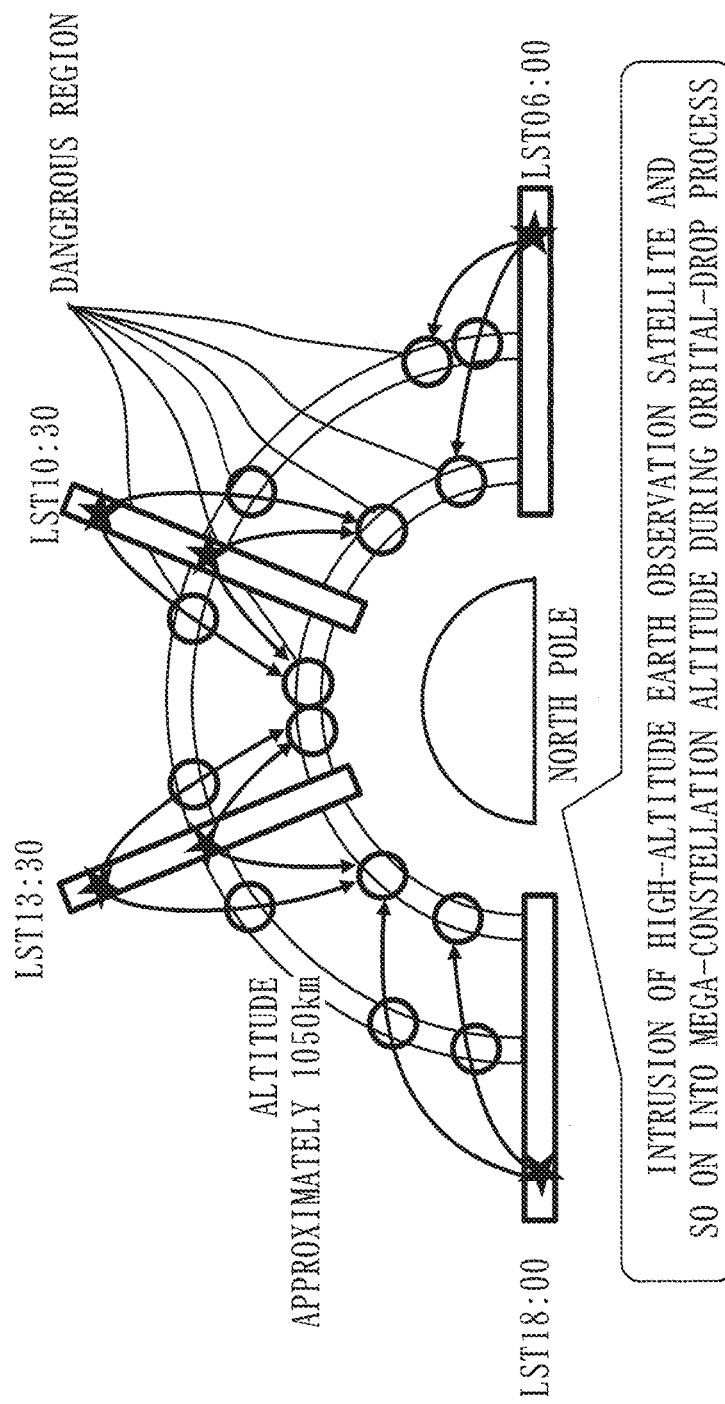
FIG. 28 is a diagram illustrating an example of the dangerous region identification information according to Embodiment 2.
Figure 29:
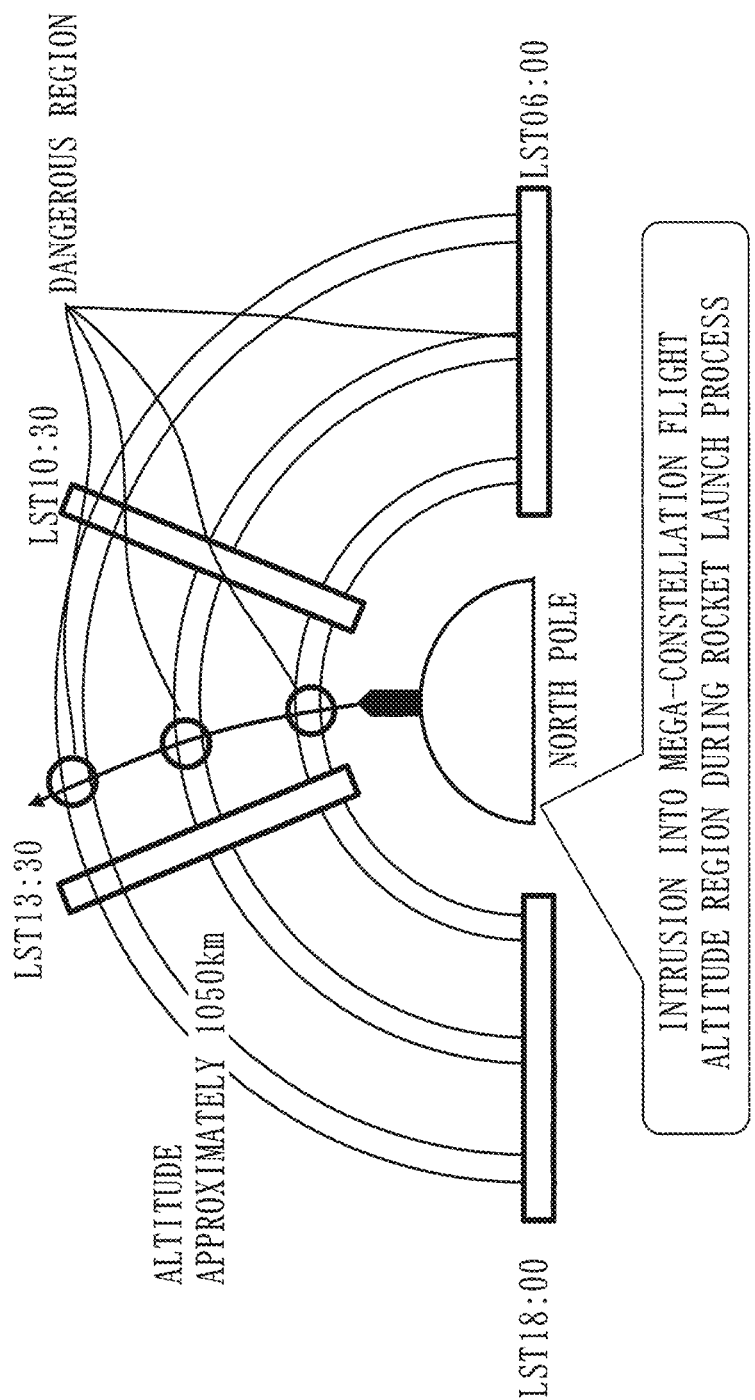
FIG. 29 is a diagram illustrating an example of the dangerous region identification information according to Embodiment 2.
Figure 30:
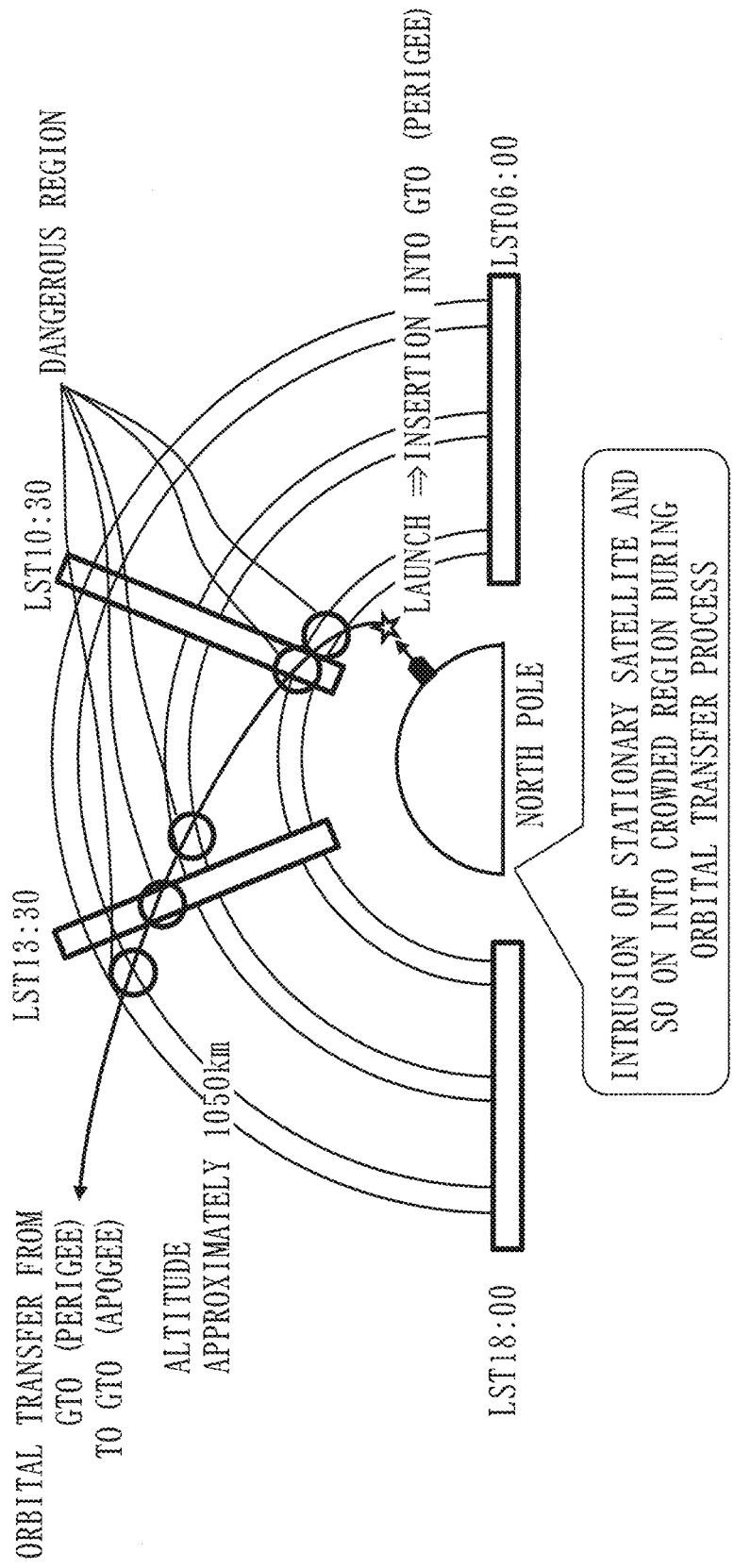
FIG. 30 is a diagram illustrating an example of the dangerous region identification information according to Embodiment 2.

FIG. 26 is a diagram illustrating an example of the crowded region identification information 621 according to the present embodiment.

The crowded region identification information 621 includes following regions.

- A region in the vicinity of 10:30 LST of a sun-synchronous orbit and at an orbital altitude of 500 km or more to 1,000 km or less
- A region in the vicinity of 13:30 LST of a sun-synchronous orbit and at an orbital altitude of 500 km or more to 1,000 km or less
- A region in the vicinity of 06:00 LST of a sun-synchronous orbit and at an orbital altitude of 500 km or more to 1,000 km or less
- A region in the vicinity of 18:00 LST of a sun-synchronous orbit and at an orbital altitude of 500 km or more to 1,000 km or less
- A region at a latitude of 80 degrees or more north and at an orbital altitude of 500 km or more to 1,000 km or less
- A region at a latitude of 80 degrees or more south and at an orbital altitude of 500 km or more to 1,000 km or less
- Orbital altitude regions where fly mega-constellation satellite groups having the same nominal orbital altitude and each realizing a proper service with a satellite group of 500 or more satellites flying at an orbital altitude of 100 km or more to less than 2,000 km <Dangerous Region Identification Information 622>

FIGS. 27, 28, 29, and 30 are diagrams each illustrating an example of the dangerous region identification information 622 according to the present embodiment.

The dangerous region identification information 622 is a region where crowded regions intersect with each other. The dangerous region identification information 622 includes a region in which one of the following regions intersects with orbital altitude regions where fly mega-constellation satellite groups having the same nominal orbital altitude and each realizing a proper service with using a satellite group of 1,000 or more satellites flying at an orbital altitude of 500 km or more to less than 1,000 km.

- A region in the vicinity of 10:30 LST of a sun-synchronous orbit and at an orbital altitude of 500 km or more to 1,000 km or less
- A region in the vicinity of 13:30 LST of a sun-synchronous orbit and at an orbital altitude of 500 km or more to 1,000 km or less
- A region in the vicinity of 06:00 LST of a sun-synchronous orbit and at an orbital altitude of 500 km or more to 1,000 km or less
- A region in the vicinity of 18:00 LST of a sun-synchronous orbit and at an orbital altitude of 500 km or more to 1,000 km or less Example 1 of Traffic Management Rule Information 623

Example 1 of the traffic management rule information 623 in the dangerous region includes following rules.

- A rule that all mega-constellation satellite groups realizing proper services maintain orbital altitudes in a regular operation at a nominal orbital altitude of Ha±ΔHa km
- A rule that prohibits a sun-synchronous orbit satellite from intruding into the nominal orbital altitude of Ha±ΔHa km in a regular operation Note that ΔHa is 2 or more to 10 or less.

A region at a nominal orbital altitude of Ha km where the mega-constellation satellite groups fly is a region where the satellite groups fly actively over the equator as a central altitude within a scope of about 0±40 degrees, that is, from approximately 40 degrees north latitude to 40 degrees south latitude. If a sun-synchronous orbit satellite intrudes into this region, a high collision risk is resulted, which is dangerous. Therefore, in consideration of fluctuations of the nominal orbital altitude of Ha km and a distribution of the satellite groups, a region of ±ΔHa km is determined as the region where the mega-constellation side is responsible for keeping the orbital altitude and where the sun-synchronous orbit satellite is prohibited from intruding into. According to this rule, regions where crowded regions intersect are eliminated, and safe flight is ensured.

With the presently known mega-constellation construction plan alone, satellite groups each consisting of several hundred or more satellites are to be inserted into the following orbital altitudes.

- 2,493 satellites for a nominal orbital altitude of 335.9 km
- 2,478 satellites for a nominal orbital altitude of 340.8 km
- 2,547 satellites for a nominal orbital altitude of 345.6 km
- 784 satellites for a nominal orbital altitude of 591 km
- 1,296 satellites for a nominal orbital altitude of 610 km
- 1,156 satellites for a nominal orbital altitude of 629 km If ΔHa is 10 km, two regions, that is, a region of 345.9 to 355.6 km and a region of 581 to 639 km, will be occupied by the mega-constellation satellite groups. This is disadvantageous for Earth observation satellites because a highly demanded region that the Earth observation satellites have used frequently becomes a no-intrusion area over a wide range.

On the other hand, if ΔHa is 2 km, it would be technically possible for the mega-constellation satellite groups to realize orbital altitude management of ±2 km by performing orbit control at high accuracy and high frequency.

According to the flight safety measure of the mega-constellation satellite groups, a passive safety ensuring solution exists that achieves a zero basic collision probability by dispersing orbital altitudes even if a human control function is lost due to collision with external debris. It is, however, difficult to realize a technique that disperses the orbital altitude within a range of ΔHa=±2 km. Hence, for the flight safety measure for prevention of intra-system collision of a mega-constellation, it would be essential to adopt a time-division technique. This is disadvantageous because a collision risk arises when the human control function is lost.

Despite these constraints, Example 1 of the traffic management rule information 623 achieves an effect that collision in a regular operation between a mega-constellation satellite group and a sun-synchronous satellite group can be avoided.

Example 2 of Traffic Management Rule Information 623

Example 2 of the traffic management rule information 623 in the dangerous range includes the following rules.

- A rule that all mega-constellation satellite groups realizing proper services maintain orbital altitudes in a regular operation at a nominal orbital altitude of Ha±2 km where the nominal orbital altitude Ha is 500 km or more to 1,000 km or less
- A rule that prohibits a sun-synchronous orbit satellite from intruding into the nominal orbital altitude of Ha±2 km in a regular operation Orbital altitudes of 500 km or more to 1,000 km or less are altitude regions where sun-synchronous satellite groups fly most. Meanwhile, among currently known mega-constellation construction plans, the nominal orbital altitude is 500 km or more to 1,000 km or less in the following plans.

- 1,600 satellites for a nominal orbital altitude of 550 km
- 784 satellites for a nominal orbital altitude of 591 km
- 1,296 satellites for a nominal orbital altitude of 610 km
- 1,156 satellites for a nominal orbital altitude of 629 km When the rule according to Example 1 of the above traffic management rule information 623 is applied, the mega-constellations occupy following orbital altitudes.

- 548 to 552 km (550±2 km)
- 589 to 593 km (591±2 km)
- 608 to 612 km (610±2 km)
- 627 to 631 km (629±2 km)

It would be technically possible to realize orbital altitude management of ±2 km by performing orbit control at high accuracy and high frequency.

Consequently, within a range of orbital altitudes of 500 km or more to 1,000 km or less frequently used by the sun-synchronous satellite groups, the sun-synchronous satellite groups can use orbital altitudes as follows.

- 500 to 548 km (524±24 km)
- 552 to 589 km (571±19 km)
- 593 to 608 km (600.5±7.5 km)
- 612 to 627 km (619.5±7.5 km)
- 631 to 1,000 km (815.5±184.5 km)

Example 2 of the traffic management rule information 623 achieves an effect that collision in a regular operation between a mega-constellation satellite group and a sun-synchronous satellite group can be avoided.

Example 3 of Traffic Management Rule Information 623

Example 3 of the traffic management rule information in the dangerous region includes the following rules.
  A rule that a space object business operator anticipating passage through a region at a nominal orbital altitude of Ha±ΔHa km must disclose dangerous region intrusion notice information to a danger alarm device
  A rule that a business device which manages a satellite group at the nominal orbital altitude of Ha must disclose collision avoidance action implementation plan information With the presently known mega-constellation construction plan alone, satellite groups each consisting of several hundred or more satellites are to be inserted into the following orbital altitudes. Hence, a rocket launched to an orbital altitude of 340 km or more or a satellite in a de-orbit process of de-orbiting from an orbital altitude of 340 km or more will inevitably pass through an orbital altitude where a mega-constellation satellite group flies.
  2,493 satellites for a nominal orbital altitude of 335.9 km
  2,478 satellites for a nominal orbital altitude of 340.8 km
  2,547 satellites for a nominal orbital altitude of 345.6 km
  1,600 satellites for a nominal orbital altitude of 550 km
  784 satellites for a nominal orbital altitude of 591 km
  1,296 satellites for a nominal orbital altitude of 610 km
  1,156 satellites for a nominal orbital altitude of 629 km
  2,956 satellites for a nominal orbital altitude of 1,030 to 1,080 km
  2,808 satellites for a nominal orbital altitude of 1,150 km
  Approximately 600 satellites for a nominal orbital altitude of 1,200 km Likewise, there is a possibility that a stationary satellite which performs orbital transfer from a perigee of a Geo Transfer Orbit to an apogee, or a quasi-zenith satellite having an orbital insertion process similar to that of the stationary satellite, also passes, in an orbital transfer process, through an orbital altitude where a mega-constellation satellite group flies.

According to Example 3 of the traffic management rule information 623, the rule of disclosing the dangerous region intrusion notice information to the danger alarm device is applied, and the rule of disclosing the collision avoidance action implementation plan information is applied to the mega-constellation business operator. Hence, an effect is achieved that information sharing can be performed reliably, and flight safety is ensured.

Embodiment 3

In the present embodiment, a difference from Embodiment 1 or 2, or an additional point to Embodiment 1 or 2 will mainly be described. In the present embodiment, the same configuration as in Embodiment 1 or 2 will be denoted by the same reference sign, and its description will sometimes be omitted.

In international discussion of STM, a necessity to ensure information transparency and third-party verification, as well as information sharing, has come to be appealed.

This was triggered by anti-satellite weapon (ASAT) test (artificial-satellite destruction by an anti-satellite missile in outer space) conducted by India on Mar. 27, 2019. Concerning debris caused by the ASAT test, India asserted that since the explosion test had been carried out at a low orbit, the debris would enter Earth's atmosphere in 45 days. However, even now, half a year later, flight of wreckage is still confirmed, and accordingly a third-party monitoring function is required.

In a space traffic management system according to the present embodiment, information concerning flight safety is shared among a plurality of business devices, and a space traffic management device having standard equipment with a common algorithm contributing to danger analysis and error-information close inspection is defined. On the basis of this, a plurality of business operators form a space traffic management system in which compatible space traffic management devices as standard equipment are connected via a communication line.

As a result of this, sharing of orbital information of the space object, and sharing of a danger alarm and danger avoidance action plan information are performed quickly and with a small energy. Furthermore, an atmosphere in which the third party can compare and evaluate information from a plurality of information sources is realized, achieving an effect of enabling transparency-ensured, high-reliability flight safety management.

* Description of Configurations *

In the present embodiment, configurations of a satellite constellation forming system 600, space traffic management system 500, and space traffic management device 100 are the same as those described in Embodiment 1 with referring to FIGS. 5 to 9.

Figure 31:
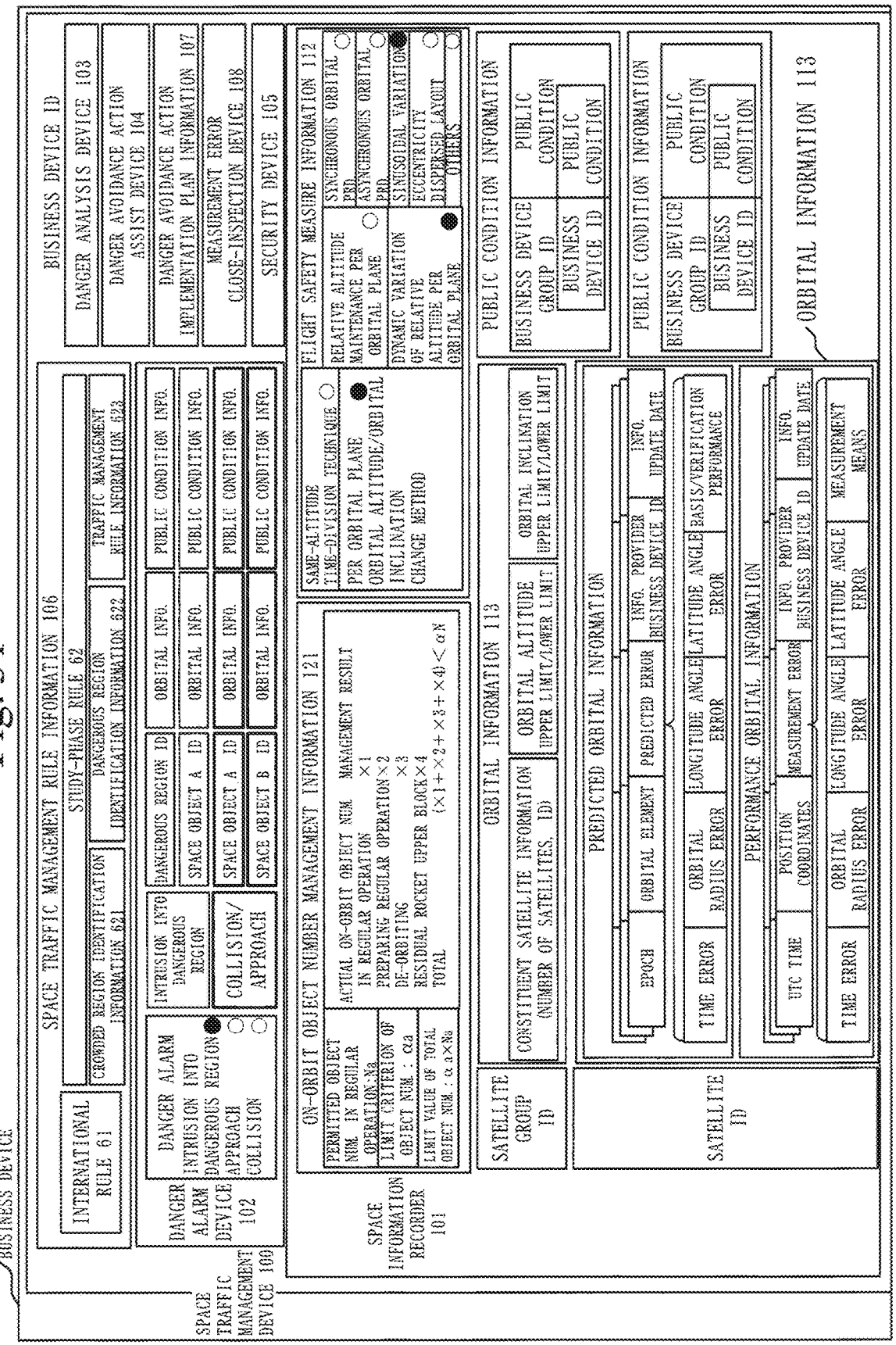
FIG. 31 is a diagram illustrating Example 1-4 of a space traffic management device according to Embodiment 3.

FIG. 31 is a diagram illustrating Example 1-4 of the space traffic management device 100 according to the present embodiment.

The space traffic management device is provided with all or some of: space traffic management rule information 106; a space information recorder 101; a danger alarm device 102; a danger analysis device 103; a danger avoidance action assist device 104; danger avoidance action implementation plan information 107; a measurement error close-inspection device 108; and a security device 105.

The space information recorder 101 records orbital information of a space object. Also, the space information recorder 101 is provided with all or some of: on-orbit object number management information 121; and flight safety measure information 112.

The danger alarm device 102 announces approach or danger of collision of a space object.

The danger analysis device 103 performs orbital analysis of a space object.

The danger avoidance action assist device 104 displays role division of a space-object avoidance action.

The security device 105 prevents information falsification.

A flight safety ensuring action, early danger anticipation, prompt information sharing, and a rational coping action in a normal situation are required to relax a space-object collision risk and to ensure flight safety.

The space traffic management rule information 106, the space information recorder 101, the danger alarm device 102, the danger analysis device 103, the danger avoidance action assist device 104, the danger avoidance action implementation plan information 107, and the security device 105 are information and tools that are important for ensuring flight safety. If business devices that manage the space objects are provided with these contents in common and further the space information recorder 101 is provided with the on-orbit object number management information 121, the number of space objects can be appropriately managed.

If the flight safety measure information 112 is provided, flight safety in a normal situation can be ensured.

If the measurement error close-inspection device 108 closely inspects a measurement error of orbital information acquired by a plurality of measurement means, an effect of enabling safety management using higher-accuracy orbital information is achieved.

The orbital information for performing tracking control of a space object managed by the satellite business operator, the rocket business operator, and the debris removal business operator, thereby ensuring flight safety, is indispensable for the business operators, and is essential information of the space information recorder.

In addition, it is expected that, in a case where another space object or debris is approaching, if a danger alarm device that announces the danger is available and a span of time and position information about a collision risk can be anticipated, the collision might be avoided by taking a danger avoidance action. Also, a security device to prevent intentional falsification of a third party is required. Therefore, it is rational to provide the business device with the configuration of Example 1-4 of the space traffic management device 100 in FIG. 31.

Figure 32:
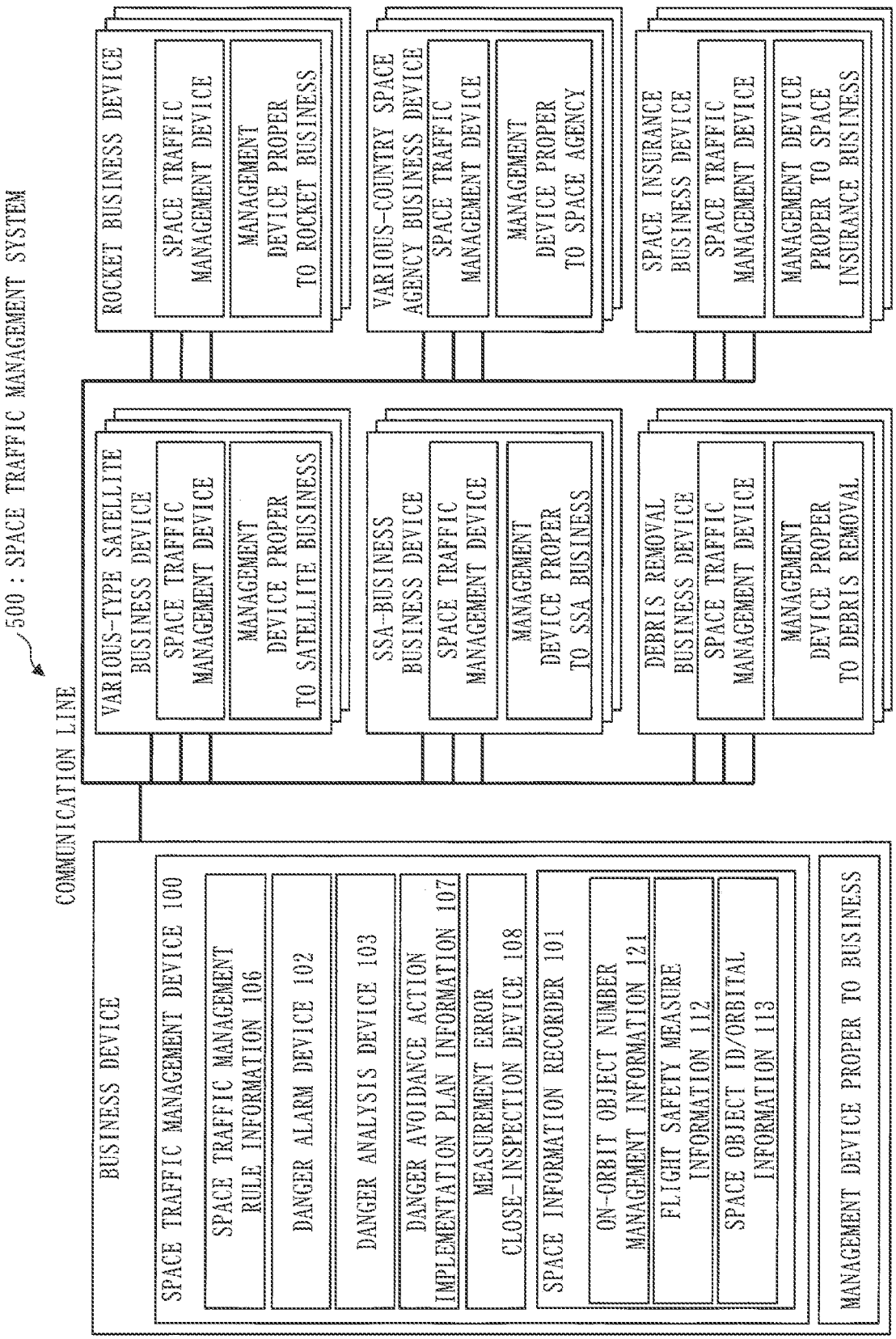
FIG. 32 is a diagram illustrating Example 5-7 of the space traffic management system according to Embodiment 3.

FIG. 32 is a diagram illustrating Example 5-7 of the space traffic management system 500 according to the present embodiment.

In FIG. 32, details of a configuration of Example 1-4 of the space traffic management device 100 of FIG. 31 are omitted.

The space traffic management system 500 is provided with a plurality of space traffic management devices 100 each mounted in a business device of each of a plurality of management business operators. The plurality of space traffic management devices 100 are connected to each other via a communication line.

A plurality of space information recorders 101 are each provided with a space object ID which identifies a space object, orbital information, and public condition information; and a business device ID which identifies a business device, and public condition information.

The plurality of space traffic management devices 100 have data format compatibility with each other. The plurality of space traffic management devices 100 share the space object ID and the business device ID. Furthermore, the plurality of space traffic management devices 100 share space information corresponding to the space object ID among business devices that comply with the public condition information. Also, in a danger analysis device 103 and a measurement error close-inspection device 108, the plurality of space traffic management devices 100 are provided with an algorithm that is common to different business devices.

The plurality of space traffic management devices 100 have satellite ID compatibility and orbital information compatibility. The danger analysis devices 103 of the plurality of space traffic management devices 100 are each provided with an algorithm that is common to different business devices.

For example, a business device that has anticipated collision of a space object A and a space object B by the danger analysis device 103 transmits an ID of the space object A and an ID of the space object B with using the danger alarm device 102. Then, an effect is achieved in another business device, that orbital information is acquired by the space information recorder 101, and that anticipation of the collision can be reproduced by the danger analysis device 103 having the common algorithm.

Further, the plurality of space traffic management devices 100 have satellite ID compatibility and orbital information compatibility. The measurement error close-inspection devices 108 of the plurality of space traffic management devices 100 are each provided with an algorithm that is common to different business devices.

Consequently, orbital information of the same space object C measured by different space situational awareness business operators, that is, an SSA business operator A and an SSA business operator B, can be information-updated by combining components having small measurement errors. Also, an effect is achieved in another business device, that orbital information is acquired by a space information recorder and that updated contents of the measurement information can be reproduced by the measurement error close-inspection device 108 having the common algorithm.

As a result, information can be verified by a third party, so that an effect of ensuring information transparency is achieved.

Figure 33:
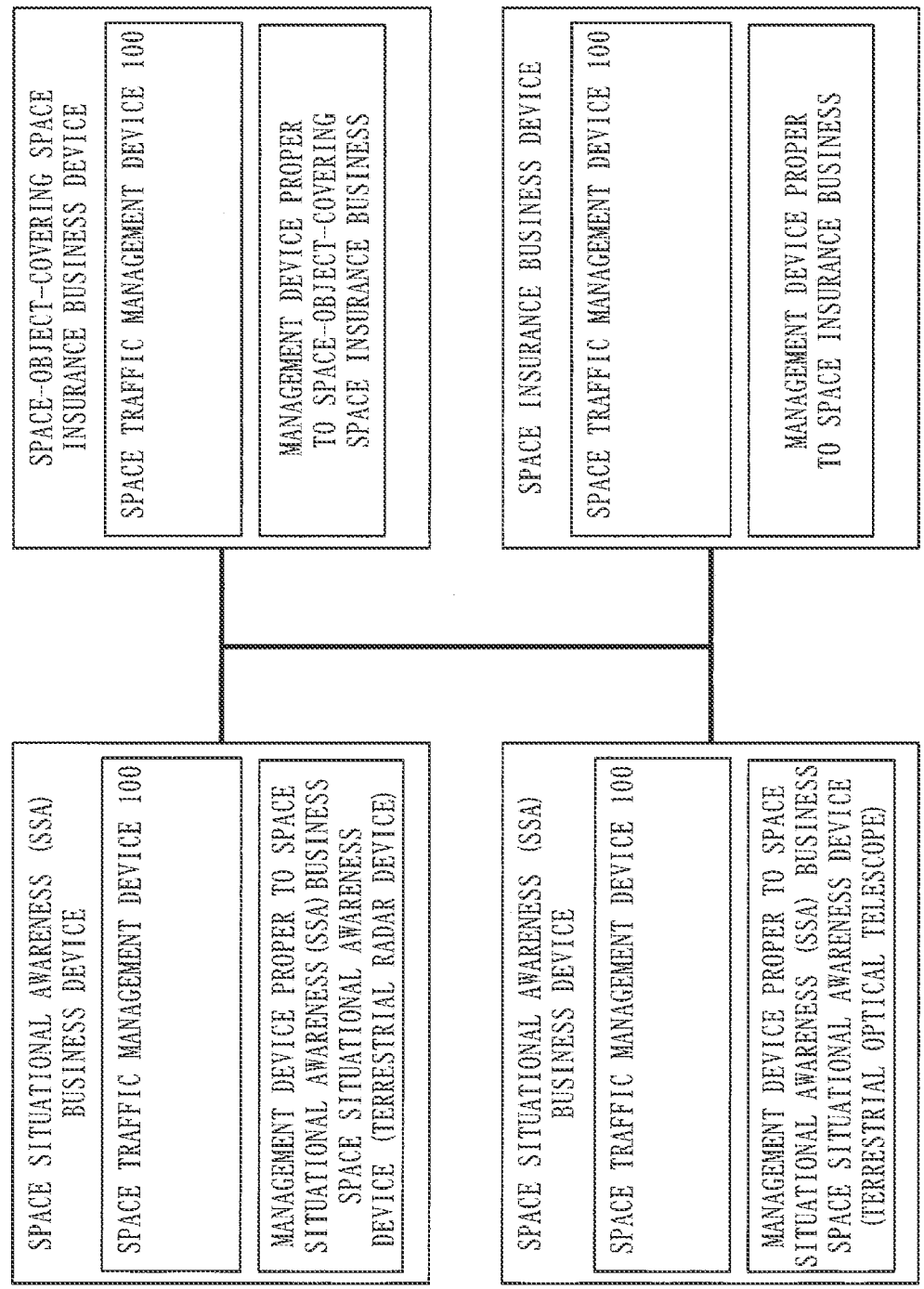
FIG. 33 is a diagram illustrating Example 5-8 of the space traffic management system according to Embodiment 3.
Figure 34:
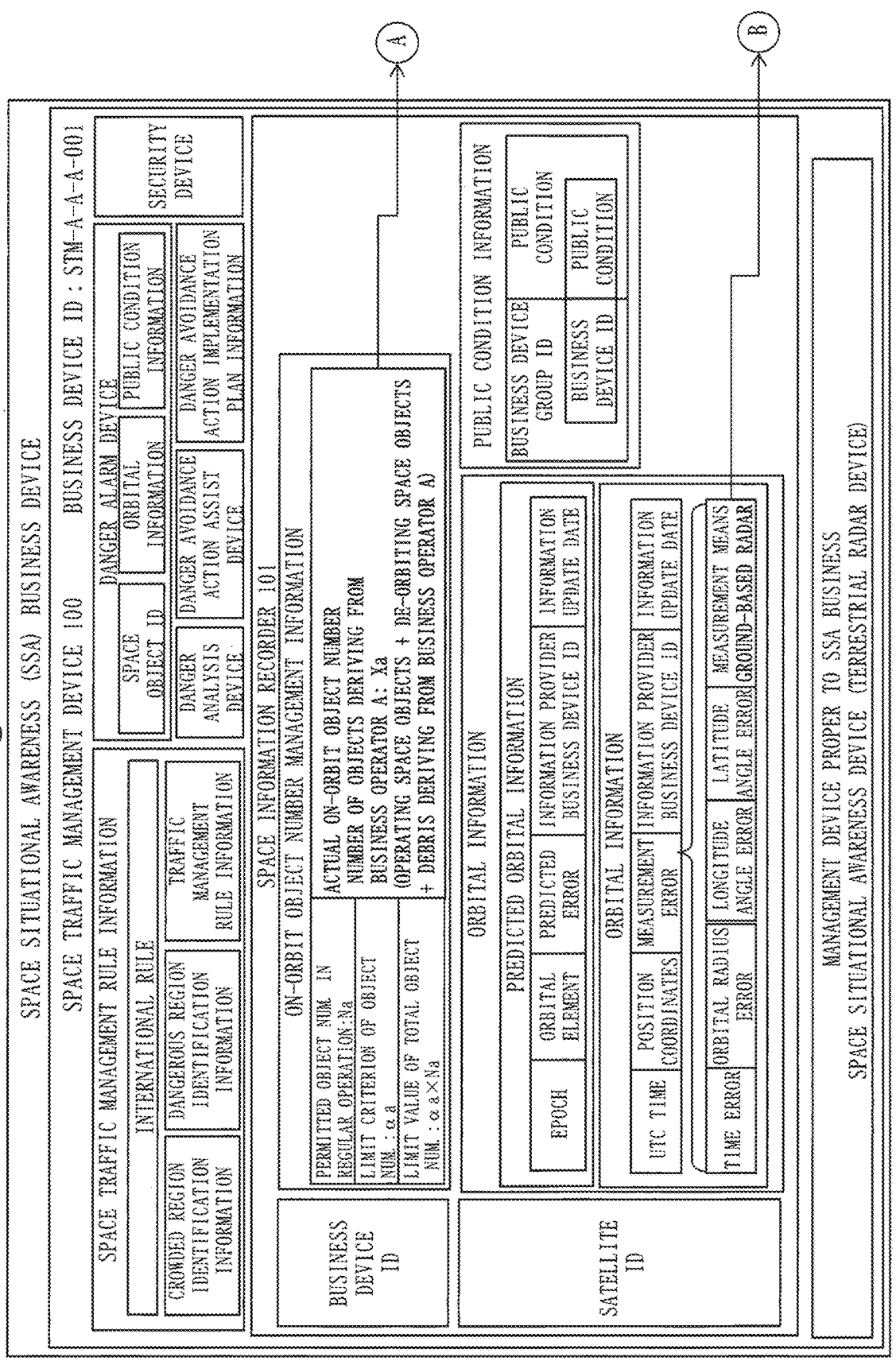
FIG. 34 is a diagram illustrating in detail a configuration of a business device in Example 5-8 of a space traffic management system 500 of FIG. 33 according to Embodiment 3.
Figure 35:
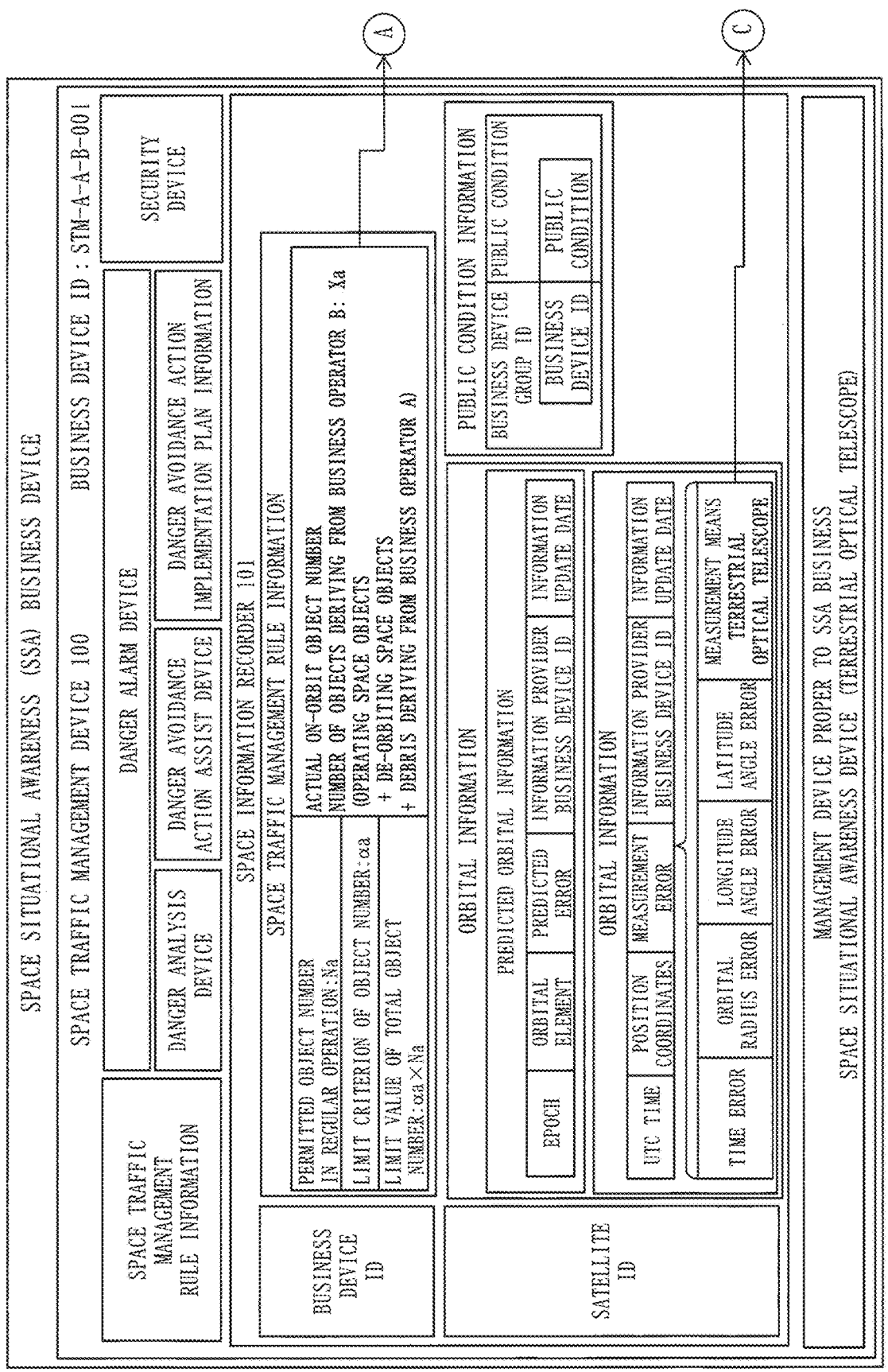
FIG. 35 is a diagram illustrating in detail a configuration of a business device in Example 5-8 of the space traffic management system 500 of FIG. 33 according to Embodiment 3.
Figure 36:
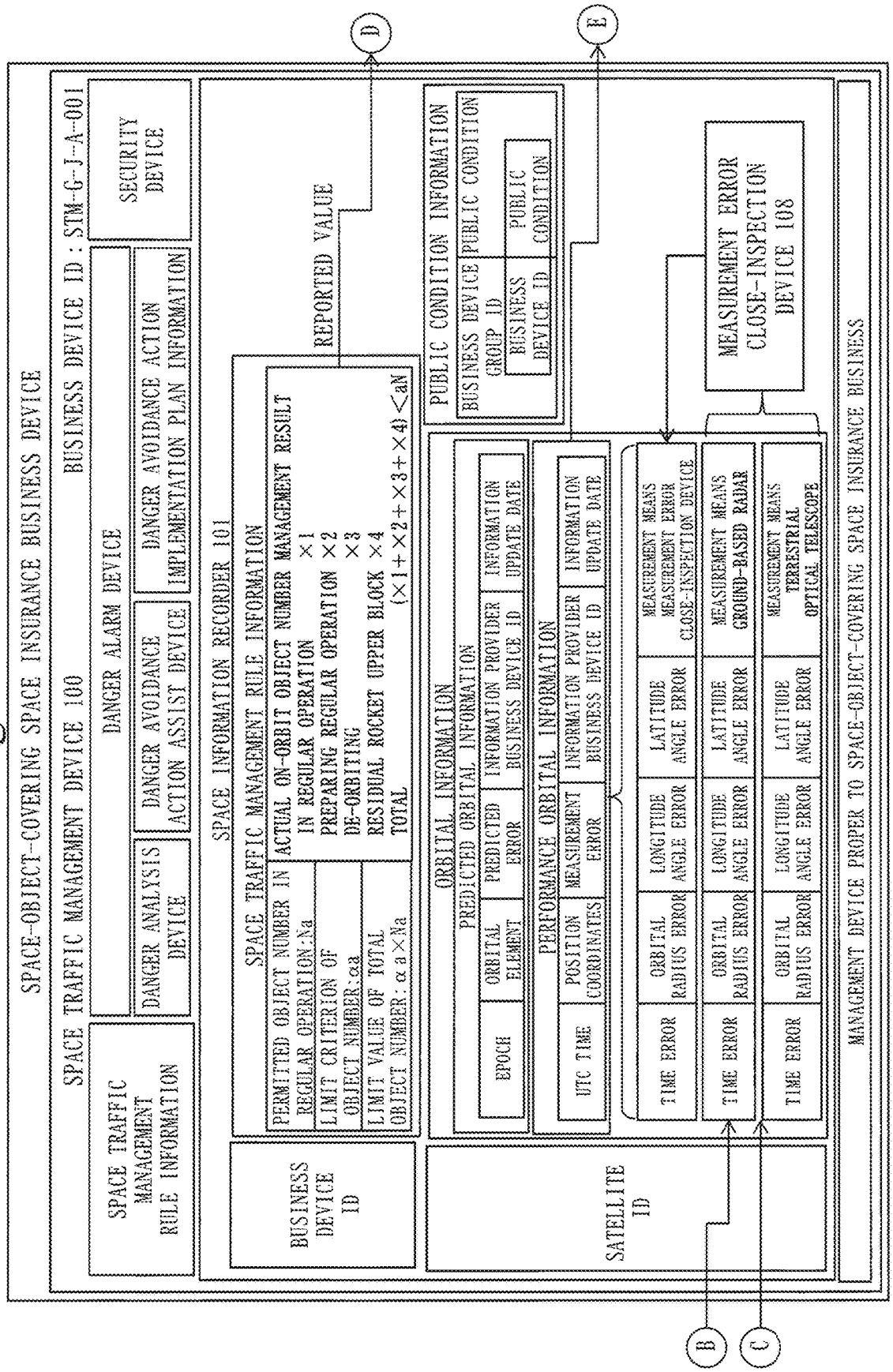
FIG. 36 is a diagram illustrating in detail a configuration of a business device in Example 5-8 of the space traffic management system 500 of FIG. 33 according to Embodiment 3.
Figure 37:
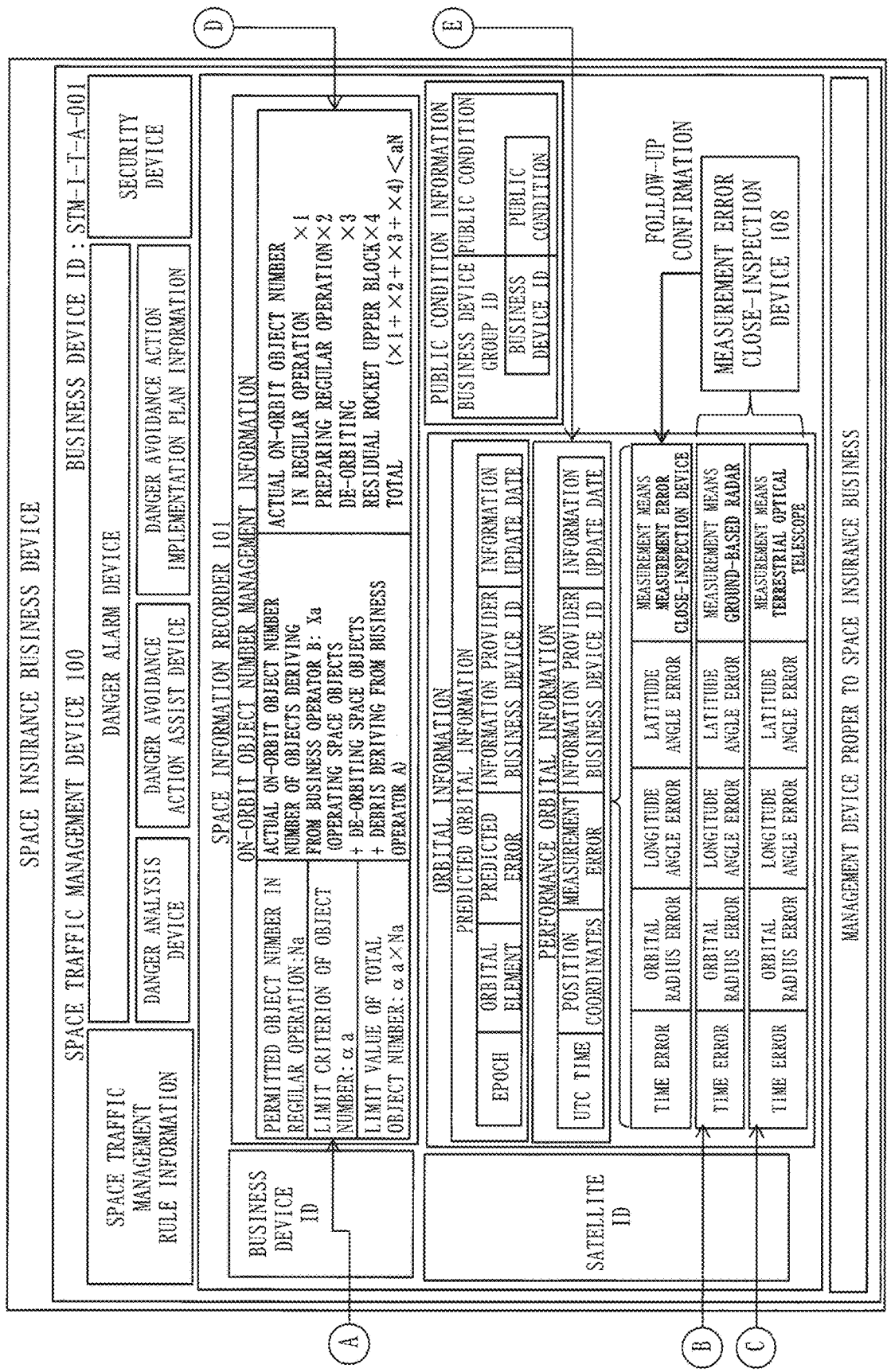
FIG. 37 is a diagram illustrating in detail a configuration of a business device in Example 5-8 of the space traffic management system 500 of FIG. 33 according to Embodiment 3.

FIG. 33 is a diagram illustrating Example 5-8 of the space traffic management system 500 according to the present embodiment.

FIGS. 34, 35, 36, and 37 are diagrams each illustrating in detail a configuration of a business device in Example 5-8 of the space traffic management system 500 of FIG. 33.

A space information recorder 101 acquires, as on-orbit object number management information, on-orbit object number management information acquired from a business device that manages a concerned space object, and on-orbit object number management information acquired by a different measurement means, from another business device, and performs comparative evaluation against disclosed information of the business devices that manage the concerned space object, so that third-party verification can be performed.

The space information recorder 101 acquires, as orbital information concerning a particular space object ID, orbital information acquired from a business operator that manages a concerned space object, and orbital information acquired by a different means, from another business operator, and performs comparative evaluation against the disclosed information of the business operator that manages the concerned space object, so that third-party verification can be performed.

The space information recorder 101 acquires, as a measurement error included in the orbital information, a measurement error acquired from the business device that manages the concerned space object, and a measurement error acquired by a different measurement means, from another business device, and performs comparative evaluation against the disclosed information of the business device that manages the concerned space object, so that third-party verification can be performed.

In space collision insurance which pays for damage of collision with a space object by an insurance premium, a business device that manages a space insurance business acquires orbital information of a space object covered by a space insurance, from a business device that manages the concerned space object, and from a business device of the SSA business operator, and performs comparative evaluation. Thus, a space insurance business operator can verify, as the third party, validity of disclosed information of the business device that manages the concerned space object.

Also, the space insurance business operator can acquire orbital information of the same space object from a plurality of space situational awareness business devices and can perform evaluation.

With the space collision insurance, when assessing a payment insurance premium in accordance with a deviation distance between predicted orbital information and performance orbital information, orbital information acquired from a business device of a space object that caused collision is comparatively evaluated against orbital information acquired by a different means, so that third-party verification becomes possible. This achieves an effect of guaranteeing information reliability and information fairness.

Figure 38:
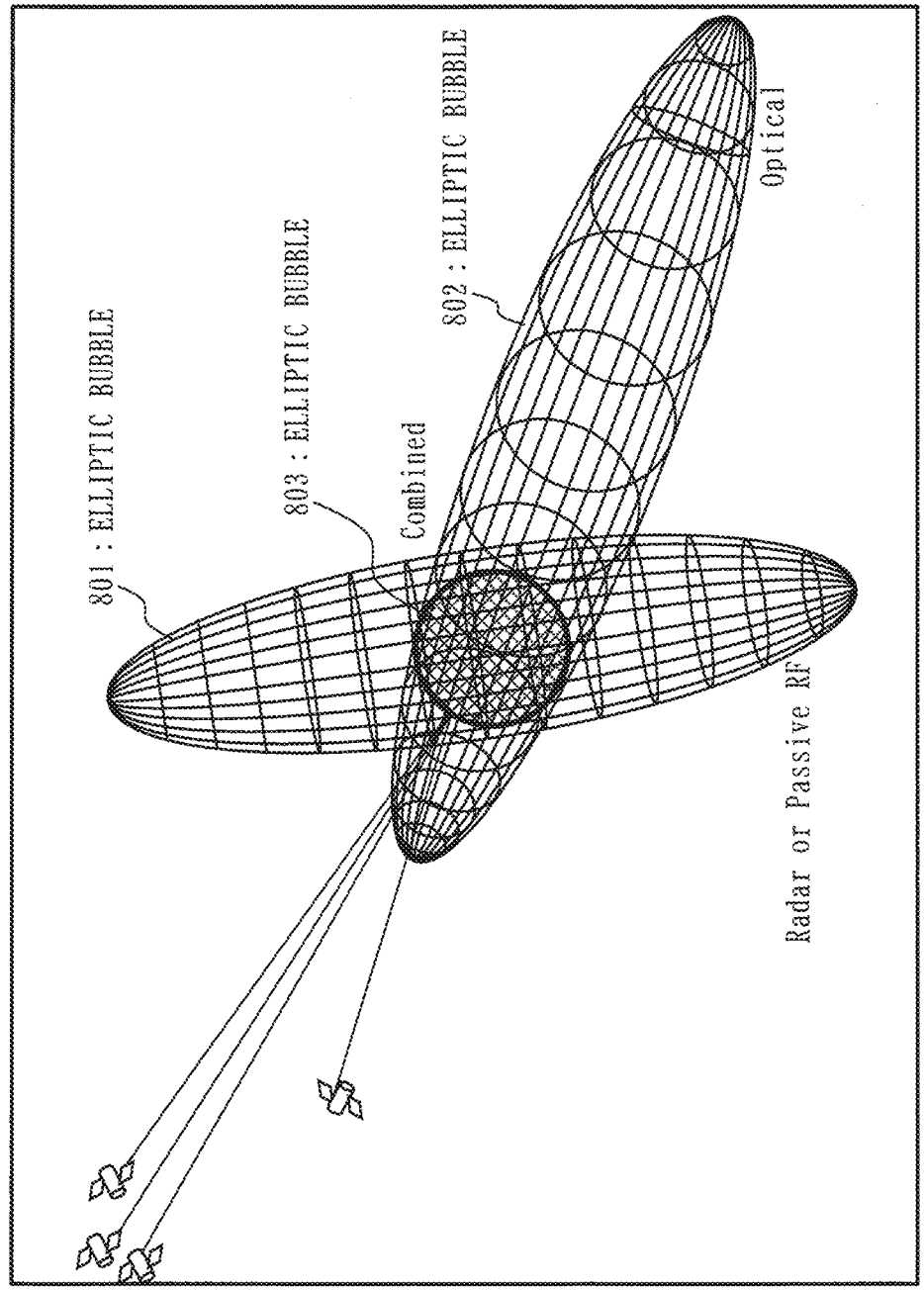
FIG. 38 is a diagram illustrating an effect of Example 5-8 of the space traffic management system 500 according to Embodiment 3.

FIG. 38 is a diagram illustrating an effect of Example 5-8 of the space traffic management system 500 according to the present embodiment.

In an insurance system where the smaller the measurement error, the higher the insurance money to be paid, it is possible to adopt a high-accuracy component from orbital information acquired from a plurality of SSA business operators. For example, information measured by a terrestrial radar device has an excellent ranging performance and accordingly has high orbital-altitude measurement accuracy (elliptic bubble 801). Information measured by a terrestrial optical telescope has an excellent angle measurement performance and accordingly has high orbital-position measurement accuracy (elliptic bubble 802). Because of these features, it is rational to acquire an orbital altitude from an SSA business device by radar measurement and positional information from an SSA business device by optical telescopic measurement, and to merge acquired orbital information (elliptic bubble 803). Note that it is indispensable to ensure transparency and objectivity when updating information with information acquired from different information sources.

In view of this, a framework is proposed where a measurement error close-inspection device having a common data processing algorithm is provided not only with a business device of a space object to be covered by the space insurance but also with an insurance business device, so that validity of updated orbital information can be verified by a third party.

As a result, an effect of realizing information update with guaranteed transparency and objectivity, and improving accuracy is achieved.

Embodiment 4

In the present embodiment, a difference from Embodiments 1 to 3 or an additional point to Embodiments 1 to 3 will mainly be described. In the present embodiment, the same configuration as in Embodiments 1 to 3 will be denoted by the same reference sign, and its description will sometimes be omitted.

* Description of Configurations *

In the present embodiment, configurations of a satellite constellation forming system 600, space traffic management system 500, and space traffic management device 100 are the same as those described in Embodiment 1 with referring to FIGS. 5 to 9.

The present embodiment describes an example of a process conducted by the space traffic management device 100 mounted in a debris removal business operator, of giving an intrusion alarm 111 to warn of intrusion of debris into a crowded orbit. The space traffic management device 100 may have a function of a debris removal control device 190 below.

In the present embodiment, a satellite orbit region 301 includes an orbit of approximately 10:30 Local Sun Time (LST) of a sun-synchronous orbit and at an altitude of approximately 500 to 800 km. An alarm notification unit 130 gives an intrusion alarm 111 to a debris removal business device 45 utilized by a debris removal business operator which removes debris, to warn that debris will intrude into the orbit of approximately 10:30 Local Sun Time (LST) of the sun-synchronous orbit and at an altitude of approximately 500 to 800 km.

Figure 39:
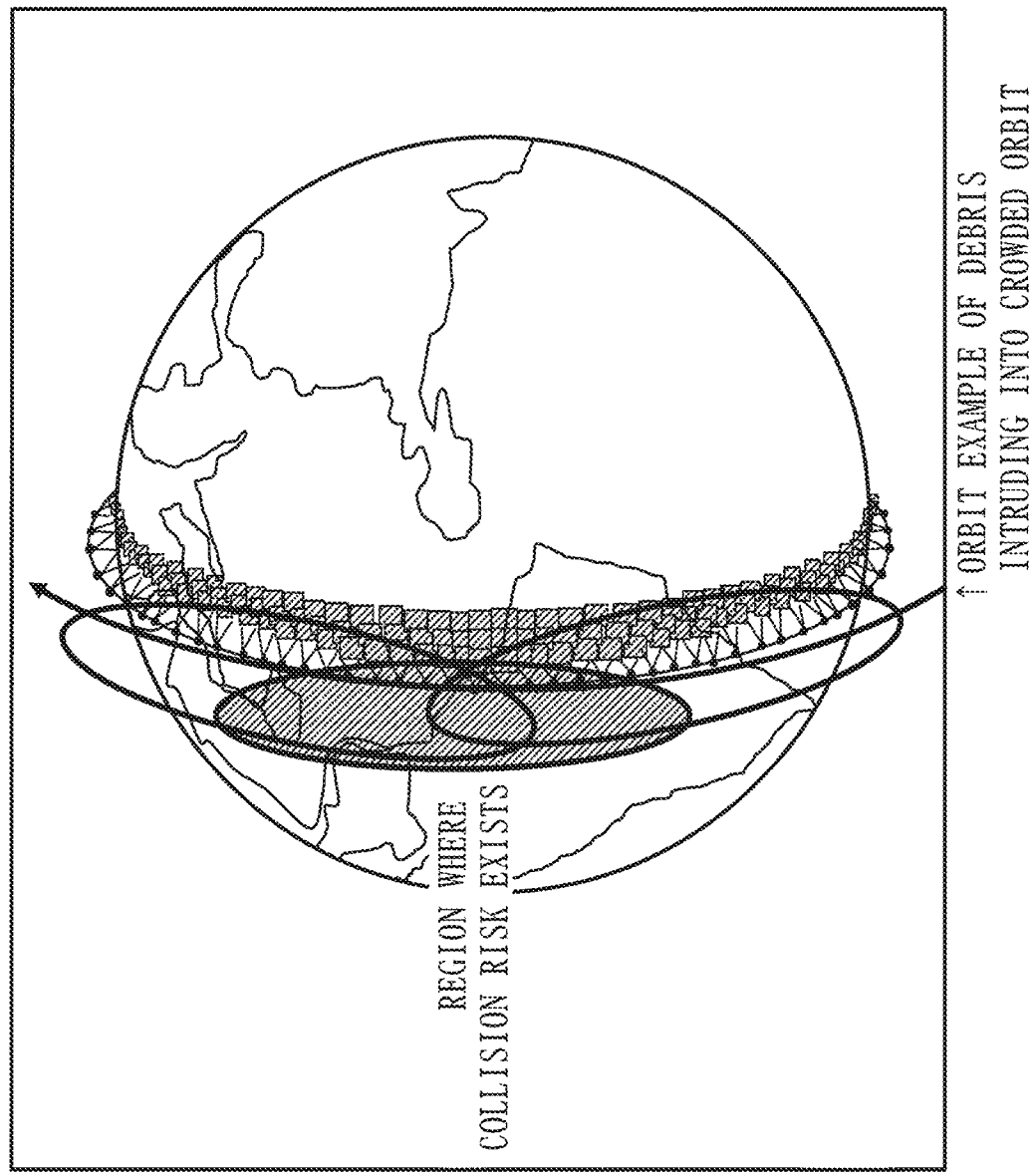
FIG. 39 presents an orbit example of debris intruding into a satellite orbit region according to Embodiment 4.

FIG. 39 is a diagram illustrating an orbit example of debris intruding into the satellite orbit region 301 according to the present embodiment.

Even currently, satellites of a large number of business operators from a plurality of countries are flying in the vicinity of 10:30 LST of the sun-synchronous orbit, which is used frequently by Earth observation optical satellites, and at an altitude of approximately 500 to 800 km. It is anticipated that this orbit will be a crowded orbit in the future where satellites of a large number of stakeholders operate in a string. If debris intrudes into a plane almost the same as this crowded orbital plane, a large number of satellites are the target to be notified of an approach alarm or collision alarm.

Furthermore, on this orbit, a satellite not having a means for taking an avoidance action by itself, such as a small satellite called Cube Sat, cannot take an avoidance action even when a collision alarm is issued. If a satellite that takes an avoidance action and a satellite that does not are mixed on a crowded orbit, a secondary collision risk may occur in which a satellite that has avoided debris collides against another satellite. Therefore, in a crowded orbit, it is not always rational to take an avoidance action.

If a predicted debris-coming time includes an error, when a satellite flight direction and a debris flight direction are near, the error appears as a large distance through distance conversion, and a large number of satellites are exposed to a collision risk.

A low-orbital satellite goes round the Earth once in about 90 to 100 minutes. If coming of debris involves an uncertainty of about ±50 minutes, a collision risk arises for every satellite on the corresponding orbital plane.

When a collision accident occurs on a crowded orbit, a risk of chained collision is very high, which is also an issue.

Therefore, when orbital prediction of debris intruding into a crowded orbit is found, it is rational to promptly issue an alarm to a debris removal business operator so that the debris is removed.

Figure 40:
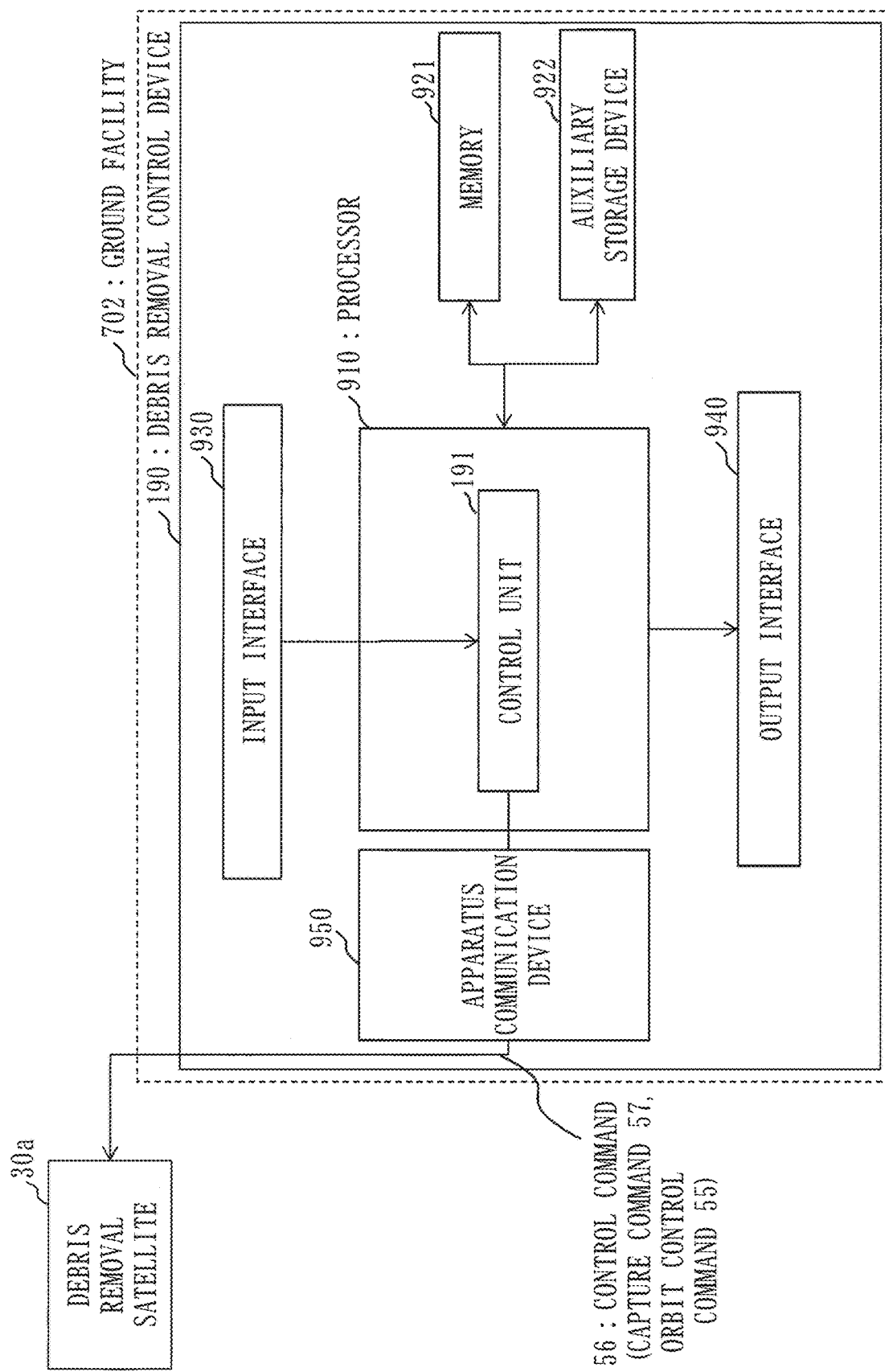
FIG. 40 is a configuration diagram of a debris removal device according to Embodiment 4.

FIG. 40 is a diagram illustrating a configuration example of the debris removal control device 190 according to the present embodiment.

Figure 41:
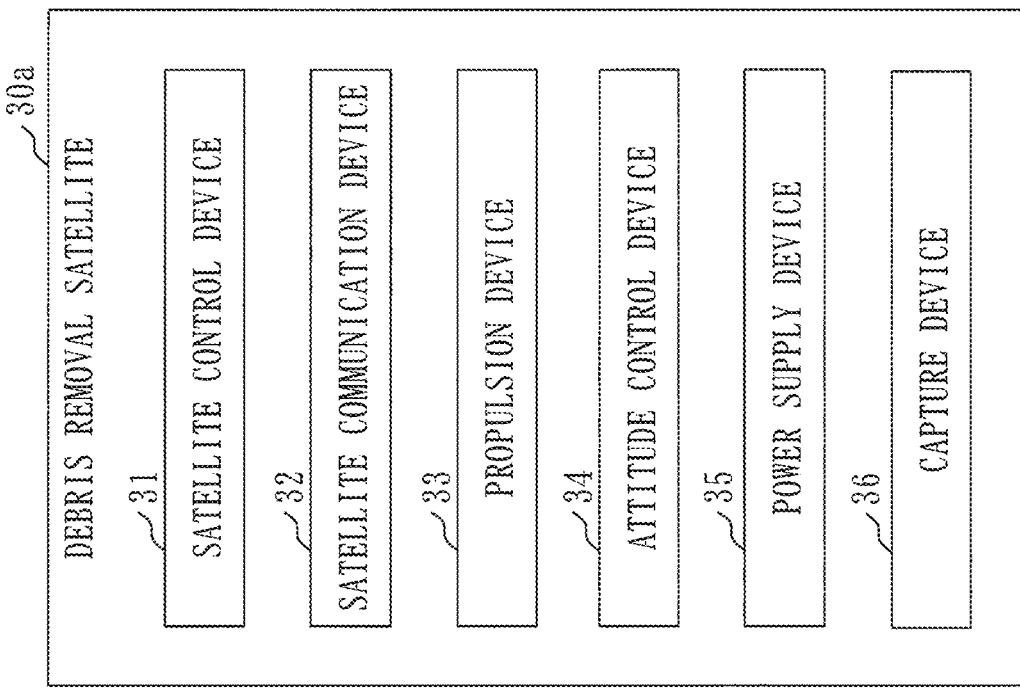
FIG. 41 is a configuration diagram of a debris removal satellite according to Embodiment 4.

FIG. 41 is a diagram illustrating a configuration example of a debris removal satellite 30a according to the present embodiment.

The debris removal satellite 30a is provided with a capture device 36 to capture debris, in addition to the configuration of the satellite 30 described with referring to FIGS. 5 to 8. The debris removal satellite 30a captures the debris in response to a control command 56 from the debris removal control device 190, and in a de-orbit process that lasts until atmospheric entry, performs an orbital-drop active control operation of dropping while avoiding a region where a collision risk against a space object is high. The orbital-drop active control operation is also called active de-orbit operation.

The debris removal control device 190 may be mounted in a ground facility 702. Alternatively, the debris removal control device 190 may be mounted in a debris removal business device 45, or in another device that communicates with the debris removal business device 45.

A control unit 191 of the debris removal control device 190 generates the control command 56 to be transmitted to the debris removal satellite 30*a*. The control command 56 includes a capture command 57 and an orbit control command 55.

The control unit 191 generates the capture command 57 for capturing the debris with using the capture device 36. The control unit 191 also generates the orbit control command 55 for practicing the active de-orbit operation on the debris removal satellite 30*a* that has captured the debris.

The debris removal satellite 30*a* captures the debris on the basis of the control command 56 and performs the active de-orbit operation.

The satellite orbit region 301 may include a high-latitude region including a polar region. The alarm notification unit 130 gives the intrusion alarm 111 to the debris removal business device 45 utilized by a debris removal business operator which removes debris, for warning of debris intruding into the high-latitude region including the polar region.

Figure 42:
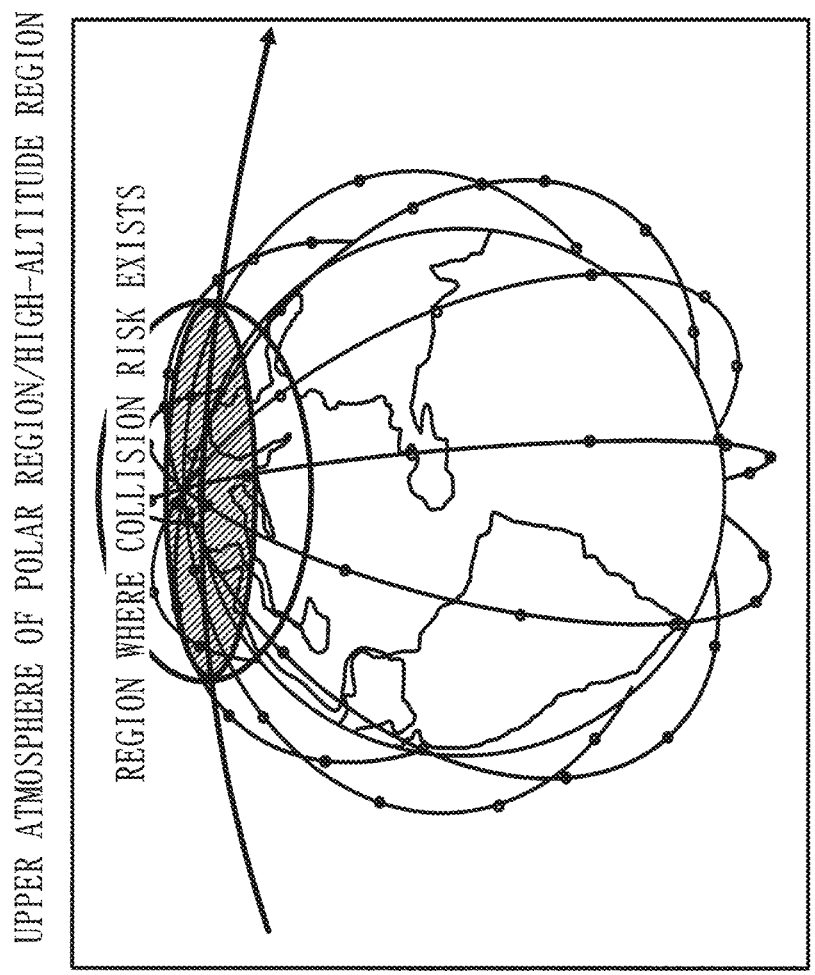
FIG. 42 presents orbit examples of debris intruding into a satellite orbit region according to Embodiment 4.

FIG. 42 is a diagram illustrating an orbit example of the debris intruding into the satellite orbit region 301 according to the present embodiment.

In the constellation of polar-orbital satellites, since every orbital plane passes through the polar region, the polar region becomes a crowded region.

If a debris-coming time has a predicted error of ±50 minutes, there is a possibility that every satellite of every orbital plane faces a collision risk. Even if a satellite wishes to take an avoidance action, an avoidance action that a propulsion device ordinally provided to the satellite can contribute to is no more than changing the orbital altitude. This is sometimes unlikely to serve as an effective risk avoiding means, and a situation where taking an avoidance action is substantially almost impossible may occur.

Therefore, when orbital prediction of debris intruding above a high-latitude region including a polar region is found, it is rational to promptly issue an alarm to a debris removal business operator so that the debris is removed.

In Embodiment 1, an example of an intrusion alarm for a satellite constellation business operator such as a mega-constellation business operator has been described. The intrusion alarm for the satellite constellation business operator is similar to, for example, announcement of an intrusion alarm issued for a supervisory management organization of a huge condominium at the time a suspicious person is found. In Embodiment 2, an example of an intrusion alarm for a debris removal business operator has been described. The intrusion alarm for the debris removal business operator is similar to announcement of an intrusion alarm for a security service organization.

The space traffic management system may be provided with: a space information recorder to record space object information acquired from a management business device utilized by a management business operator which manages a plurality of space objects; and a server. The space traffic management system may be provided with a database to store the space object information acquired from the space information recorder. The server transmits an intrusion alarm to the management business device to assist avoiding collision against a space object.

The server is specifically a space traffic management system. The database may be provided to the server, or to a device other than the server. The server implements the following phases (to be referred to as means or units as well) with processing circuitry such as a processor and an electronic circuit.

The database may be specifically a memory, an auxiliary storage device, or a file server. The space information recorder records the space object information acquired from the management business device utilized by the management business operator which manages the plurality of space objects. The space traffic management system may be provided with the space information recorder. The space information recorder may contain orbit prediction information.

The server is provided with the following phases.

A phase of defining and registering a crowded region in which a large number of space objects fly A phase of identifying a space object A anticipated to intrude into one of crowded regions, from the space object information recorded in the space information recorder A phase of transmitting an intrusion alarm to a management business device of the space object A A phase of transmitting an intrusion alarm to a management business device which manages a space object flying a crowded region The space object information includes a predicted epoch of a space object, a predicted orbital element, and a predicted error.

The crowded region is within a range of an orbital altitude of 300 to 1,000 km where a satellite group at 10:00 to 11:00 LST of a sun-synchronous orbit exists.

The crowded region is located at 80 degrees north latitude or more or 80 degrees south latitude or more and is within a range of an orbital altitude of 300 to 1,000 km.

The crowded region includes an altitude range and a latitude range which are acquired from a management business device of a satellite group constituting a mega-constellation and where constellation satellite groups fly at the same nominal altitude to implement the same mission by cooperation.

The server is provided with a phase of analyzing a span of predicted time of from when the space object A intrudes into the crowded region through to when it leaves, and predicted orbital information.

The server is also provided with a phase of transmitting a span of predicted time of from when the space object A intrudes into the crowded region through to when it leaves, and the predicted orbital information, to the management business device of the space object A and the management business device of the space object flying in the crowded region.

The server is also provided with a phase of transmitting an intrusion alarm predicting the space object A intruding into the crowded region, a span of predicted time of from when the space object A intrudes into the crowded region through to when it leaves, and the predicted orbital information, to the management business device of the debris removal business operator which manages a debris removal satellite.

The server is also provided with a phase of transmitting an intrusion alarm predicting the space object A intruding into the crowded region, a span of predicted time of from when the space object A intrudes into the crowded region through to when it leaves, and the predicted orbital information, to the management business device of the space insurance business operator which runs a space insurance.

The management business device of the mega-constellation business operator is provided with a means for performing collision analysis on the basis of space object information of the satellite group of the mega-constellation and the space object information of the space object A.

In a collision avoiding method according to which a satellite of the mega-constellation avoids collision when the collision is anticipated by collision analysis, the server is provided with a phase of transmitting an intrusion alarm to the management business device of the mega-constellation business.

The management business device of the debris removal business operator which is provided with a debris removal means carries out a collision avoiding method of capturing the space object A at a predicted orbital position with the debris removal means prior to an intrusion predicted time, on the basis of the space object information of the space object A, thereby avoiding intrusion. In the collision avoiding method, the server transmits the intrusion alarm to the management business device of the debris removal business operator.

The space insurance business operator operates an insurance money payment system in which a damage resulting from collision of a space object is covered by insurance money payment from, as resources, an insurance premium which was collected and accumulated in advance. The insurance money payment system is a system in which a contract is initiated after collision of a space object is anticipated. In the insurance money payment system, the server transmits the intrusion alarm to the management business device of the space insurance business operator.

The space object A is a newly launched rocket. Alternatively, the space object A is a stationary satellite or quasi-zenith satellite during orbital transfer. Alternatively, the space object A is a space object during orbital drop in the de-orbit process.

Embodiment 5

In the present embodiment, examples of a device, a system, and so on, each formed of a combination of Embodiments 1 to 4, will mainly be described. In the present embodiment, the same configuration as in Embodiments 1 to 4 will be denoted by the same reference sign, and its description will sometimes be omitted.

A satellite business device 43 comprises the space traffic management device 100 of Embodiment 1, and is provided to the space traffic management system 500 described in Embodiment 1.

A satellite constellation business device comprises the space traffic management device 100 of Embodiment 1, and is provided to the space traffic management system 500 described in Embodiment 1.

A mega-constellation business device 41 comprises the space traffic management device 100 of Embodiment 1, and is provided to the space traffic management system 500 described in Embodiment 1.

A rocket launch business device 46 comprises the space traffic management device 100 of Embodiment 1, and is provided to the space traffic management system 500 described in Embodiment 1.

A debris removal business device 45 comprises the space traffic management device 100 of Embodiment 1, and is provided to the space traffic management system 500 described in Embodiment 1.

A space situational awareness business device (SSA business device 47) comprises the space traffic management device 100 of Embodiment 1, and is provided to the space traffic management system 500 described in Embodiment 1.

A danger avoidance assist business device comprises the space traffic management device 100 of Embodiment 1, and is provided to the space traffic management system 500 described in Embodiment 1.

The danger avoidance assist business device is a management business device 40 that manages assist information for preventing a collision accident of a space object.

A space insurance business device comprises the space traffic management device 100 of Embodiment 1, and is provided to the space traffic management system 500 described in Embodiment 1.

The space insurance business device is a management business device 40 that operates space insurance.

A satellite business device 43 comprises the space traffic management device 100 of Embodiment 2, and is provided to the space traffic management system 500 described in Embodiment 2.

A satellite constellation business device comprises the space traffic management device 100 of Embodiment 2, and is provided to the space traffic management system 500 described in Embodiment 2.

A mega-constellation business device 41 comprises the space traffic management device 100 of Embodiment 2, and is provided to the space traffic management system 500 described in Embodiment 2.

A rocket launch business device 46 comprises the space traffic management device 100 of Embodiment 2, and is provided to the space traffic management system 500 described in Embodiment 2.

A debris removal business device 45 comprises the space traffic management device 100 of Embodiment 2, and is provided to the space traffic management system 500 described in Embodiment 2.

A space situational awareness business device (SSA business device 47) comprises the space traffic management device 100 of Embodiment 2, and is provided to the space traffic management system 500 described in Embodiment 2.

A danger avoidance assist business device comprises the space traffic management device 100 of Embodiment 2, and is provided to the space traffic management system 500 described in Embodiment 2.

The danger avoidance assist business device is a management business device 40 that manages assist information for preventing a collision accident of a space object.

A space insurance business device comprises the space traffic management device 100 of Embodiment 2, and is provided to the space traffic management system 500 described in Embodiment 2.

The space insurance business device is a management business device 40 that operates space insurance.

A rocket launch business device 46 comprises the space traffic management device 100 of Embodiment 3, and is provided to the space traffic management system 500 described in Embodiment 3.

A debris removal business device 45 comprises the space traffic management device 100 of Embodiment 3, and is provided to the space traffic management system 500 of Embodiment 3.

A space situational awareness business device (SSA business device 47) comprises the space traffic management device 100 of Embodiment 3, and is provided to the space traffic management system 500 described in Embodiment 3.

A danger avoidance assist business device comprises the space traffic management device 100 of Embodiment 3, and is provided to the space traffic management system 500 described in Embodiment 3.

The danger avoidance assist business device is a management business device 40 that manages assist information for preventing a collision accident of a space object.

A space insurance business device comprises the space traffic management device 100 of Embodiment 3, and is provided to the space traffic management system 500 described in Embodiment 3.

The space insurance business device is a management business device 40 that operates space insurance.

A space information recorder 101 is provided to the space traffic management device 100 described in Embodiment 1, 2, or 3, and is provided to the space traffic management system 500 described in Embodiment 1, 2, or 3. The space information recorder 101 comprises a space object ID which identifies a space object, orbital information, and public condition information; and a business device ID which identifies a business device, and public condition information.

A danger alarm device 102 is provided to the space traffic management device 100 described in Embodiment 1, 2, or 3, and is provided to the space traffic management system 500 described in Embodiment 1, 2, or 3. The danger alarm device 102 comprises all or some of: a collision alarm displayed when collision of a space object A and a space object B is anticipated; an approach alarm displayed when approach of a space object A and a space object B to each other is anticipated; an intrusion alarm displayed when intrusion of a space object A into a flight region of a satellite group C is anticipated; a space object ID of a space object A; a space object ID of a space object B; and a satellite group ID of a satellite group C intrusion into which is anticipated.

A danger analysis device 103 is provided to the space traffic management device 100 described in Embodiment 1, 2, or 3, and is provided to the space traffic management system 500 described in Embodiment 1, 2, or 3. The danger analysis device 103 is provided with an algorithm that is common to a plurality of business devices. Upon input of the space object ID of the space object A and the space object ID of the space object B which are included in the danger alarm device 102, the danger analysis device 103 can reproduce an analysis result of a danger analysis device owned by a business operator that has transmitted a danger alarm.

A danger analysis device 103 is provided to the space traffic management device 100 described in Embodiment 1, 2, or 3, and is provided to the space traffic management system 500 described in Embodiment 1, 2, or 3. Assume a case where an intrusion alarm against a space object A intruding into a dangerous region is displayed and the dangerous region is a region in which a mega-constellation or constellation satellite group C flies. When the space object 1D of the space object A and the space object ID of the satellite group which are included in the danger alarm device are inputted to the danger analysis device 103, a mega-constellation business device or a constellation business device performs danger analysis using detailed satellite-group orbital information from a space information recorder mounted in its own device, anticipates collision of an individual satellite, and outputs a collision time and collision point coordinates.

A danger avoidance action assist device 104 is provided to the space traffic management device 100 described in Embodiment 1, 2, or 3, and is provided to the space traffic management system 500 described in Embodiment 1, 2, or 3. The danger avoidance action assist device 104 displays to the space object A, the space object B, or the satellite group C whose danger is announced by the danger alarm device, all or some of followings: a business device of the space object A takes a danger avoidance action; a business device of the space object B takes a danger avoidance action; a business device of the satellite group C takes a danger avoidance action; a debris removal business device takes a danger avoidance action; neither the space object A nor the space object B takes a danger avoidance action; neither the space object A nor the satellite group C takes a danger avoidance action; a rocket launch business device takes a danger avoidance action; a business device of a space object during orbital transfer takes a danger avoidance action; a business device of a de-orbiting space object takes a danger avoidance action; consensus has been made among related parties; and consensus has not been made yet among related parties and adjustment is required.

A security device 105 is provided to the space traffic management device 100 described in Embodiment 1, 2, or 3, and is provided to the space traffic management system 500 described in Embodiment 1, 2, or 3. The security device 105 is constituted of all or some of: an encryption device; a password system; and a biometric system, which are designed to prohibit an unauthorized user from changing information.

A space information recorder 101 is provided to the space traffic management device 100 described in Embodiment 1, 2, or 3, and is provided to the space traffic management system 500 described in Embodiment 1, 2, or 3. The space information recorder 101 is provided to the space traffic management device 100 included in the business device (management business device 40) described in Embodiments 1 to 4.

A danger alarm device 102 is provided to the space traffic management device 100 described in Embodiment 1, 2, or 3, and is provided to the space traffic management system 500 described in Embodiment 1, 2, or 3. The danger alarm device 102 is provided to the space traffic management device 100 included in the business device (management business device 40) described in Embodiments 1 to 4.

A danger analysis device 103 is provided to the space traffic management device 100 described in Embodiment 1, 2, or 3, and is provided to the space traffic management system 500 described in Embodiment 1, 2, or 3. The danger analysis device 103 is provided to the space traffic management device 100 included in the business device (management business device 40) described in Embodiments 1 to 4.

A danger avoidance action assist device 104 is provided to the space traffic management device 100 described in Embodiment 1, 2, or 3, and is provided to the space traffic management system 500 described in Embodiment 1, 2, or 3. The danger avoidance action assist device 104 is provided to the space traffic management device 100 included in the business device (management business device 40) described in Embodiments 1 to 4.

Embodiment 6

In the present embodiment, a difference from Embodiments 1 to 5 or an additional point to Embodiments 1 to 5 will mainly be described. In the present embodiment, the same configuration as in Embodiments 1 to 5 will be denoted by the same reference sign, and its description will sometimes be omitted.

In the present embodiment, a space traffic management system 500 provided with a terminal 481 or a portable terminal 482, in addition to the business devices (management business devices 40) of various types of businesses, will be described. The terminal 481 is, for example, a personal computer, and is also called a terminal device. The portable terminal 482 is, for example, a computer such as a portable personal computer, a smartphone, and a portable telephone, and is also called a portable terminal device.

Figure 43:
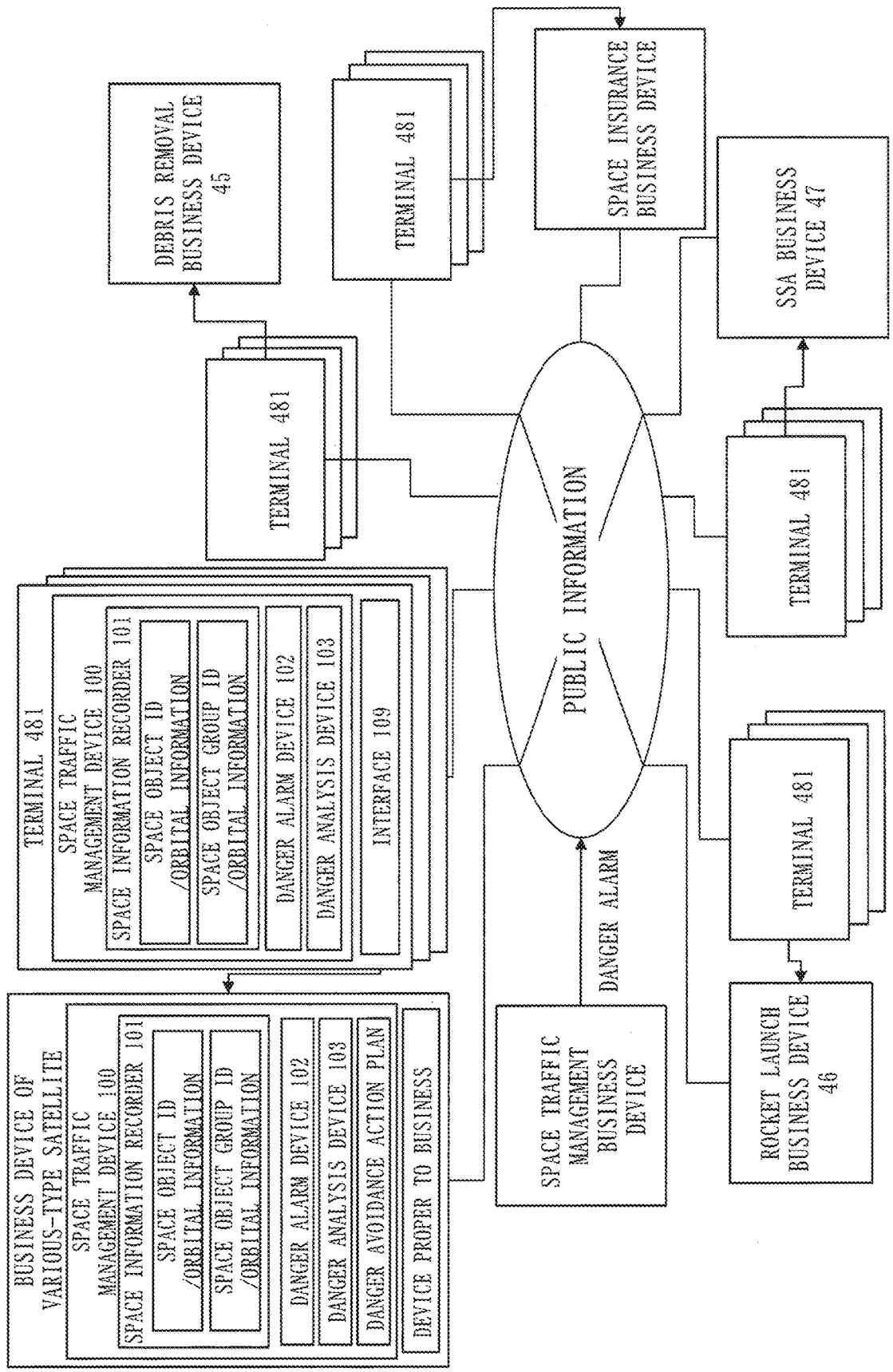
FIG. 43 is a configuration diagram of Example 5-9 of a space traffic management system 500 according to Embodiment 6.

FIG. 43 is a configuration diagram of Example 5-9 of the space traffic management system 500 according to the present embodiment.

In Example 5-9, the space traffic management system 500 is provided with terminals 481 in addition to business devices of various types of businesses. FIG. 43 illustrates business devices of various types of satellites, a debris removal business device 45, an SSA business device 47, a rocket launch business device 46, a space insurance business device, and a space traffic management business device, as examples of the business devices of the various types of businesses. A business device that performs another business may also be included.

A space information recorder 101 is provided with a space object ID which identifies a space object, and orbital information; and a space object group ID of a space object group flying at the same nominal altitude, and orbital information.

A plurality of space traffic management devices 100 in Example 5-9 of the space traffic management system 500 have data format compatibility, share the space object ID, and share orbital information corresponding to the space object ID among business devices that comply with public condition information.

Danger analysis devices 103 of various business devices are provided with a common algorithm or compatible algorithms.

The terminal 481 is provided with: a space traffic management device 100 including a space information recorder 101, a danger alarm device 102, and a danger analysis device 103; and an interface 109 for connection with a business device.

In Example 5-9 of the space traffic management system 500, the plurality of terminals 481 are connected to corresponding business devices.

In the future, there will be a case where an information disclosure service, such as announcement of a collision alarm for a private space object which is conventionally conducted by US CSpOC, is succeeded by a space traffic management business operator. In this case, the space traffic management business operator carries out danger analysis of space object information collected by the space traffic management business device independently, and presents a danger alarm as public information. Specifically, when approach accompanying danger, collision of space objects with each other, or intrusion of a space object into a crowded region of a large number of satellites having the same nominal altitude, as in a mega-constellation, is anticipated, the space traffic management business operator presents a danger alarm as public information.

This public information can be acquired by the various business devices, and can be shared immediately by individual terminals owned by the various business operators.

There is a problem that when a danger alarm is issued at midnight and must be responded urgently, if this information is shared only among business devices owned by corporate bodies, response to the danger alarm is delayed.

In view of this, a space traffic management system is realized in which a danger alarm can be shared promptly by private terminals having a responsibility and authority for operation of a business device, and if necessary, an operation can be instructed to the business device having the responsibility and authority via the private terminals.

With a portable terminal, it is difficult to perform danger analysis of two arbitrary objects among an enormous number of space objects. If, however, identification IDs of two objects whose danger is anticipated are disclosed, even a terminal such as a personal computer can reproduce the danger analysis. Also, if the algorithm is common, an effect of reproducing the same analysis result as that of the business operator that has reported the danger alarm is achieved.

Furthermore, there is a case where a business operator is independently equipped with a danger analysis device with a high-intelligent performance than the disclosed algorithm, as a device proper to the business operator. In this case, if a detailed analysis is instructed via an interface with the individual business device provided to the terminal, high-accuracy danger analysis unique to the business device can be performed.

A person engaged in the SSA business can, with his or her own terminal, instruct a space situational awareness device he or she manages to independently measure again orbital information of a space object reported by a danger alarm. The measured orbital information is presented from an SSA business device to public information, so that an effect of sharing high-accuracy SSA measurement information among related parties is achieved.

There is a case where a person engaged in a service business using a mega-constellation satellite group acquires, with his or her own terminal, an intrusion alarm that warns of an intrusion into an altitude zone where a satellite group he or she manages. In this case, this person instructs a business device to perform collision analysis regarding an individual satellite, with using real-time high-accuracy orbital information of the mega-constellation satellite group he or she manages, so that, if necessary, an avoidance action can be taken.

Public information of the space traffic management system may be also referred to as Open Architecture Data Repository (OADR).

Figure 44:
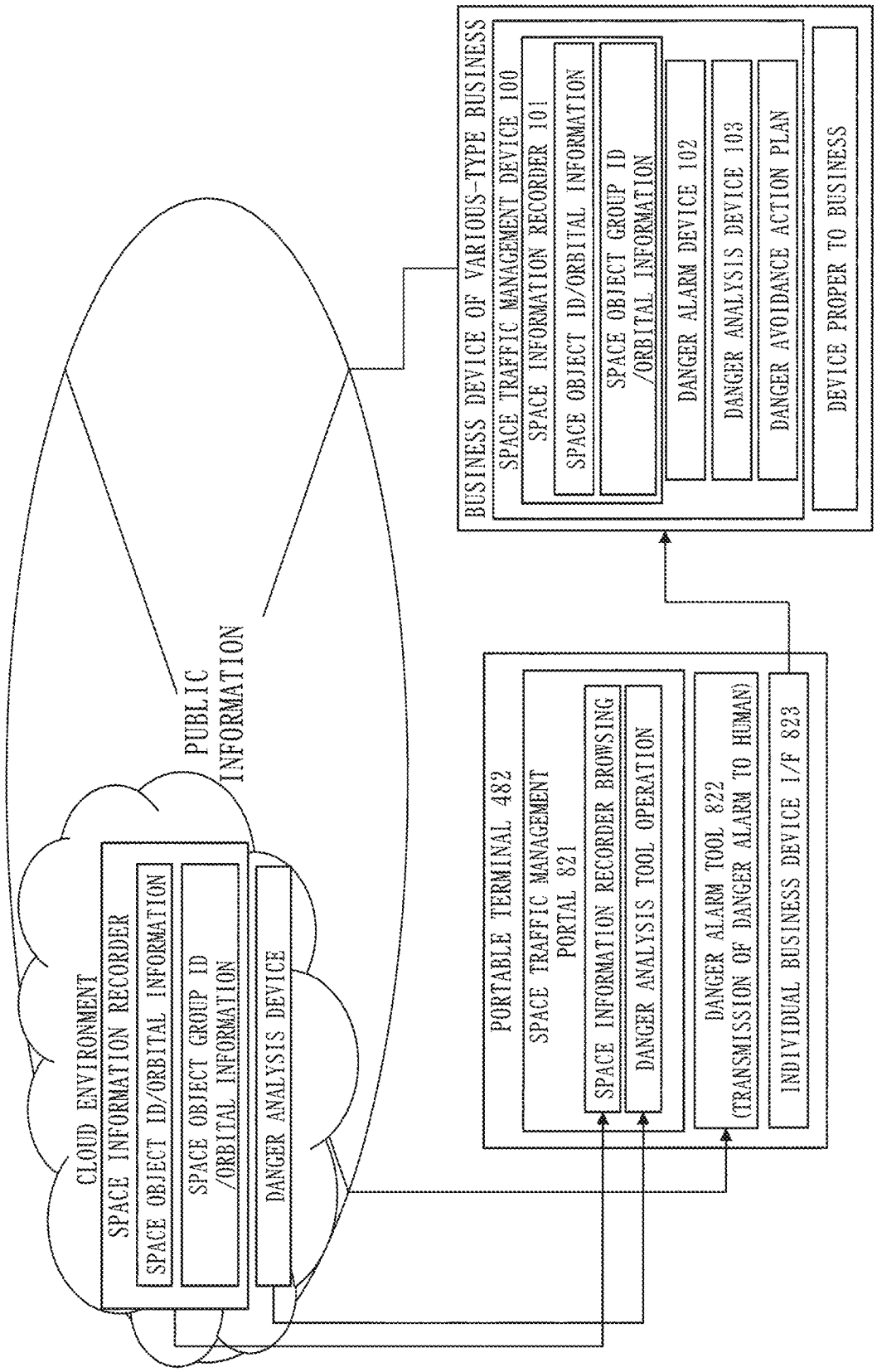
FIG. 44 is a configuration diagram of Example 5-10 of the space traffic management system 500 according to Embodiment 6.

FIG. 44 is a configuration diagram of Example 5-10 of the space traffic management system 500 according to the present embodiment.

In Example 5-10 of the space traffic management system 500, a portable terminal 482 and business devices of various types of businesses are connected. A cloud environment is provided with a space information recorder 101 and a danger analysis device 103.

The portable terminal 482 comprises a space traffic management portal 821 to function as a portal site of a space traffic management device 100, a danger alarm tool 822 to announce danger by screen display, sound, or vibration, and an interface 823 for connection with an individual business device.

The space traffic management portal 821 is provided with a means to browse the space information recorder 101, and a means to operate a danger analysis tool. The space traffic management portal 821 is compatible with, for example, a terminal 481, and has an operation screen to operate the space information recorder 101 which can browse public information of the space traffic management system 500. Also, the portable terminal 482 is provided with an operation screen to operate the danger analysis tool which is common to or compatible with a danger analysis device 103 provided to the terminal 481.

The danger alarm tool 822 is a tool that acquires danger information announced by a danger alarm device 102 announcing approach, collision, or intrusion into a dangerous region, of a space object, from the public information of the space traffic management system 500, and transmits an alarm via vision, hearing, or touch.

In the portable terminal 482, the danger alarm tool acquires IDs of two space objects whose danger is anticipated, or an ID of a space object whose intrusion into the dangerous region is anticipated and an ID of a space object group flying in the dangerous region, as the danger information from the public information of the space traffic management system 500. Then, the space traffic management portal 821 acquires orbital information of the space object of a concerned ID from the public information, and operates the danger analysis tool, so that an occurrence time and position information of the anticipated danger are displayed.

The portable terminal 482 is, for example, a portable personal computer, a smartphone, a portable telephone, or the like. Regarding the portable terminal 482, data or an application is placed in a cloud environment. The portable terminal side only needs to be provided with a human transmission function concerning vision, hearing, or touch, to realize the same operation as that the terminal 481 does.

The interface 823 with the individual business device may be provided with, for example, a function that can be remote-operated directly, or may be a communication means such as mail or telephone.

The portable terminal 482, even if it is a portable terminal with a limited memory area, can perform the same operation as the terminal 481 does. Thus, an effect that the space traffic management portal 821 with an excellent portability can be carried is achieved.

The SSA business device 47 according to the present embodiment is provided with a space situational awareness device. The SSA business device 47 acquires a space object ID and an orbital information acquisition instruction from the terminal 481 or the portable terminal 482, via the interface for connection with the business device included in the terminal 481 or portable terminal 482. Then, the SSA business device 47 acquires orbital information of the corresponding ID with the space situational awareness device.

The mega-constellation business device 41 according to the present embodiment acquires a space object ID of a space object which is anticipated to intrude into an orbital altitude zone where a satellite group managed by the mega-constellation business device 41 flies, a span of time and position information of anticipated intrusion, and a detailed analysis instruction, from the terminal 481 or portable terminal 482, via the interface for connection with the business device included in the terminal 481 or the portable terminal 482. Then, the mega-constellation business device 41 performs danger analysis with using real-time high-accuracy orbital information.

The debris removal business device 45 according to the present embodiment acquires a space object ID, time information and position information of anticipated danger, and a debris removal satellite operation instruction, from the terminal 481 or portable terminal 482, via the interface for connection with the business device provided to the terminal 481 or portable terminal 482, and operates a debris removal satellite.

The rocket launch business device 46 according to the present embodiment acquires an instruction to change a rocket launch time from the terminal 481 or portable terminal 482 via the interface for connection with the business device provided to the terminal 481 or portable terminal 482, and changes a rocket launch plan.

The space insurance business device according to the present embodiment manages space insurance covering damage caused by collision of space objects with each other among a plurality of space objects flying in outer space. The space insurance business device acquires a mediation instruction of space insurance for a business device related to an anticipated danger, from the terminal 481 or portable terminal 482, via the interface for connection with a business device included in the terminal 481 or portable terminal 482, and performs space insurance solicitation.

In above Embodiments 1 to 6, individual units of the space traffic management system and space traffic management device are described as independent function blocks. However, configurations of the space traffic management system and space traffic management device need not be like configurations in the embodiments described above. The function blocks of the space traffic management system and space traffic management device may have any configurations as far as they can implement the functions described in the above embodiments. Also, the space traffic management system and space traffic management device each may be constituted of one device, or may be a system constituted of a plurality of devices.

A plurality of portions of Embodiments 1 to 6 may be practiced by combination. Alternatively, a single portion of these embodiments may be practiced. Also, these embodiments may be practiced entirely or partially by any combination.

That is, in Embodiments 1 to 6, any portions from Embodiments 1 through 6 can be combined arbitrarily, or any constituent element can be modified. Also, in Embodiments 1 to 6, any constituent element can be omitted.

The embodiments described above are essentially preferable exemplifications and are not intended to limit the scope of the present invention, the scope of application products of the present invention, and the scope of use of the present invention. Various changes can be made to the embodiments described above as necessary.

REFERENCE SIGNS LIST

20: satellite constellation; 21: orbital plane; 30: satellite; 30a: debris removal satellite; 31: satellite control device; 32: satellite communication device; 33: propulsion device; 34: attitude control device; 35: power supply device; 36: capture device; 40: management business device; 41: mega-constellation business device; 42: LEO constellation business device; 43: satellite business device; 44: orbital transfer business device; 45: debris removal business device; 46: rocket launch business device; 47: SSA business device; 51: orbit prediction information; 52: satellite orbit prediction information; 53: debris orbit prediction information; 511: space object ID; 512: predicted epoch; 513: predicted orbital element; 514: predicted error; 60: space object; 70: Earth; 100: space traffic management device; 110: passage determination unit; 111: intrusion alarm; 120: alarm generation unit; 130: alarm notification unit; 140: storage unit; 190: debris removal control device; 191: control unit; 55: orbit control command; 56: control command; 57: capture command; 301: satellite orbit region; 500: space traffic management system; 600: satellite constellation forming system; 11, 11b: satellite constellation forming unit; 300: satellite group; 700, 701, 702: ground facility; 510: orbit control command generation unit; 520: analytical prediction unit; 909: electronic circuit; 910: processor; 921: memory; 922: auxiliary storage device; 930: input interface; 940: output interface; 941: display apparatus; 950: communication device; 101: space information recorder, 102: danger alarm device; 103: danger analysis device; 104: danger avoidance action assist device; 105: security device; 106: space traffic management rule information; 107: danger avoidance action implementation plan information; 61: international rule; 62: study-phase rule; 621: crowded region identification information; 622: dangerous region identification information; 623: traffic management rule information; 121: on-orbit object number management information; 112: flight safety measure information; 113: orbital information; 801, 802, 803: elliptic bubble; 481: terminal; 482: portable terminal; 109, 823: interface; 821: space traffic management portal; 822: danger alarm tool.

The invention claimed is:

1. A space traffic management system comprising a plurality of space traffic management devices each mounted in a business device of each of a plurality of management business operators which manage a space object flying in space, the space traffic management devices performing flight safety management of the space object,
wherein the plurality of space traffic management devices are connected to each other via a communication line,
wherein each of the plurality of space traffic management devices comprises:
a space information recorder to record orbital information of the space object;
a danger alarm to announce approach or danger of collision of the space object;
danger analysis circuitry to perform orbital analysis of the space object;
danger avoidance action assist circuitry to display role division of an avoidance action against the space object; and
security circuitry to prevent information falsification,
wherein the space information recorder includes a space object Identifier (ID) which identifies the space object, the orbital information, and public condition information; and a business device ID which identifies a business device, and the public condition information, and
wherein the plurality of space traffic management devices have data format compatibility, share the space object ID and the business device ID, and share orbital information corresponding to the space object ID among business devices that comply with the public condition information.

2. The space traffic management system according to claim 1,
wherein the business devices include at least one of:
a government-affiliated business device which manages domestic and foreign government-affiliated satellites;
a space agency business device which manages satellites owned by domestic and foreign space agencies;
a mega-constellation business device which manages a satellite constellation constituted of a satellite group of 100 or more satellites;
a constellation business device which manages a satellite constellation constituted of a satellite group of 10 or more satellites;
a satellite business device constituted of less than 10 single-function satellites or a small number of satellites;
a rocket launch business device;
a Space Situational Awareness (SSA) business device which manages information of self-generated space objects;
an SSA business device which manages information of artificial space objects;
a debris removal business device which captures and removes a space object being debris;
a danger avoidance assist business device which manages assist information that prevents a collision accident of a space object; and
a space insurance business device which operates space insurance.

3. The space traffic management system according to claim 1,
wherein flight safety management of a space object includes at least one of:
orbit management of a space object;
management of rocket launch timing;
de-orbit orbit management of a space object;
prediction management of collision among a plurality of space objects;
monitoring management of a space object;
prevention management of collision of a plurality of space objects;
information management after occurrence of a collision accident; and
damage compensation management after occurrence of a collision accident.

4. The space traffic management system according to claim 1,
wherein the space object ID provided to the space information recorder and having compatibility is constituted of all or some of: a satellite ID which identifies an individual satellite; and a satellite group ID which identifies a satellite group in which a plurality of satellites cooperate with each other to fulfill a single function or performance,
wherein orbital information of the individual satellite includes an orbital epoch, an orbital element, and a predicted error of the individual satellite, and
wherein orbital information of the satellite group includes an upper limit value and a lower limit value of an orbital altitude of the constituent satellite group, and an upper limit value and a lower limit value of an orbital inclination.

5. The space traffic management system according to claim 1,
wherein the public condition information provided to the space information recorder includes a business device ID, and a business device group ID which identifies a business device group formed of a plurality of business devices, and
wherein a public condition is constituted of all or some of: a condition for permitting publication or not; a condition of cost allocation; and an information update condition indicating a frequency of information update or an event that triggers the information update.

6. The space traffic management system according to claim 1,
wherein the danger alarm includes at least one of:
a collision alarm displayed when collision between a space object A and a space object B is anticipated;
an approach alarm displayed when approach of a space object A and a space object B to each other to fall within a dangerous distance is anticipated;
an intrusion alarm displayed when intrusion of a space object A into a flight region of a satellite group C is anticipated;
a space object ID of a space object A;
a space object ID of a space object B; and
a satellite group ID of a satellite group C intrusion into which is anticipated.

7. The space traffic management system according to claim 6,
wherein the danger analysis circuitry of each of the plurality of business devices includes a common algorithm, and upon input of the space object ID of the space object A and the space object ID of the space object B which are included in the danger alarm, produces an analysis result of the danger analysis circuitry of a business operator that has transmitted the danger alarm.

8. The space traffic management system according to claim 6,
wherein in a case where an intrusion alarm for the space object A intruding into a dangerous region is displayed and the dangerous region is a region in which a mega-constellation or constellation satellite group C flies,
the danger analysis circuitry performs danger analysis using detailed satellite-group orbital information from a space information recorder mounted in an own device, anticipates collision of an individual satellite, and outputs a collision time and point coordinates, using the space object ID of the space object A and a space object ID of the space object B which are included in a danger alarm.

9. The space traffic management system according to claim 1,
wherein the danger avoidance action assist circuitry displays to a space object A, a space object B, or a satellite group C whose danger is announced by the danger alarm, content including at least one of:
a business device of the space object A takes a danger avoidance action,
a business device of the space object B takes a danger avoidance action,
a business device of the satellite group C takes a danger avoidance action,
a debris removal business device takes a danger avoidance action,
neither the space object A nor the space object B takes a danger avoidance action,
neither the space object A nor the satellite group C takes a danger avoidance action,
a rocket launch business device takes a danger avoidance action,
a business device of a space object during orbital transfer takes a danger avoidance action,
a business device of a de-orbiting space object takes a danger avoidance action,
consensus has been made among related parties, and
consensus has not been made yet among related parties and adjustment is required.

10. The space traffic management system according to claim 1, wherein the security circuitry includes at least one of:
an encryption device;
a password system; and
a biometric system,
which are designed to prohibit an unauthorized user from changing information.

11. The space traffic management system according to claim 1,
wherein the space information recorder includes at least one of:
a plurality of pieces of orbital information which are provided by different business devices; and
a plurality of pieces of orbital information which are updated at different information update dates,
concerning a space object ID.

12. The space traffic management system according to claim 1, wherein the space traffic management device functions as a portal site.

13. A space traffic management device included in a space traffic management system comprising a plurality of space traffic management devices each mounted in a business device of each of a plurality of management business operators which manage a space object flying in space, the space traffic management devices performing flight safety management of the space object,
wherein the space traffic management device is connected to the other space traffic management devices via a communication line, and comprises:
a space information recorder to record orbital information of the space object;
a danger alarm to announce approach or danger of collision of the space object;
danger analysis circuitry to perform orbital analysis of the space object;
danger avoidance action assist circuitry to display role division of an avoidance action against the space object; and
security circuitry to prevent information falsification,
wherein the space information recorder includes a space object Identifier (ID) which identifies the space object, the orbital information, and public condition information; and a business device ID which identifies a business device, and public condition information, and
wherein the space traffic management device has data format compatibility with the other space traffic management devices, shares the space object ID and the business device ID with the other space traffic management devices, and shares orbital information corresponding to the space object ID among business devices that comply with the public condition information.

14. A space traffic management system comprising a plurality of space traffic management devices each mounted in a business device of each of a plurality of management business operators which manage a space object flying in space, the space traffic management device performing flight safety management of the space object,
wherein the plurality of space traffic management devices are connected to each other via a communication line,
wherein each of the plurality of space traffic management devices is provided with space traffic management rule information, a danger alarm, and a danger avoidance action implementation plan information,
wherein the space traffic management rule information includes
an international rule internationally accepted according to Space Law, and
a study-phase rule before international acceptance, and
wherein the study-phase rule includes all or some of:
crowded region identification information which identifies a crowded region;
dangerous region identification information which identifies a dangerous region where crowded regions intersect; and
traffic management rule information in a dangerous region.

15. The space traffic management system according to claim 14,
wherein the crowded region identification information includes
a region in a vicinity of 10:30 LST of a sun-synchronous orbit and at an orbital altitude of 500 km or more to 1,000 km or less,
a region in a vicinity of 13:30 LST of a sun-synchronous orbit and at an orbital altitude of 500 km or more to 1,000 km or less,
a region in a vicinity of 06:00 LST of a sun-synchronous orbit and at an orbital altitude of 500 km or more to 1,000 km or less,
a region in a vicinity of 18:00 LST of a sun-synchronous orbit and at an orbital altitude of 500 km or more to 1,000 km or less,
a region at a latitude of 80 degrees or more north and at an orbital altitude of 500 km or more to 1,000 km or less,
a region at a latitude of 80 degrees or more south and at an orbital altitude of 500 km or more to 1,000 km or less, and
orbital altitude regions where fly mega-constellation satellite groups having a same nominal orbital altitude and each realizing a proper service with a satellite group of 500 or more satellites flying at an orbital altitude of 100 km or more to less than 2,000 km.

16. The space traffic management system according to claim 14,
wherein the dangerous region identification information about intersection of the crowded regions includes a region in which one of
a region in a vicinity of 10:30 LST of a sun-synchronous orbit and at an orbital altitude of 500 km or more to 1,000 km or less,
a region in a vicinity of 13:30 LST of a sun-synchronous orbit and at an orbital altitude of 500 km or more to 1,000 km or less,
a region in a vicinity of 06:00 LST of a sun-synchronous orbit and at an orbital altitude of 500 km or more to 1,000 km or less, and
a region in the vicinity of 18:00 LST of a sun-synchronous orbit and at an orbital altitude of 500 km or more to 1,000 km or less
intersects with
orbital altitude regions where fly mega-constellation satellite groups having the same nominal orbital altitude and each realizing a proper service with using a satellite group of 1,000or more satellites flying at an orbital altitude of 500 km or more to less than 1,000 km.

17. The space traffic management system according to claim 14,
wherein traffic management rule information in the dangerous region includes
a rule that all mega-constellation satellite groups realizing proper services maintain orbital altitudes in a regular operation at a nominal orbital altitude of $Ha \pm \Delta Ha$ km, and
a rule that prohibits a sun-synchronous orbit satellite from intruding into the nominal orbital altitude of $Ha \pm \Delta Ha$ km in a regular operation,
where $\Delta Ha$ is 2 or more to 10 or less.

18. The space traffic management system according to claim 14,
wherein traffic management rule information in the dangerous range includes
a rule that all mega-constellation satellite groups realizing proper services maintain orbital altitudes in a regular operation at a nominal orbital altitude of $Ha \pm 2$ km where the nominal orbital altitude Ha is 500 km or more to 1,000 km or less, and
a rule that prohibits a sun-synchronous orbit satellite from intruding into the nominal orbital altitude of $Ha \pm 2$ km in a regular operation.

19. The space traffic management system according to claim 14,
wherein the traffic management rule information in the dangerous region includes
a rule that a space object business operator anticipating passage through a region at a nominal orbital altitude of $Ha \pm \Delta Ha$ km must disclose dangerous region intrusion notice information to a danger alarm, and
a rule that a business device which manages a satellite group at the nominal orbital altitude of Ha must disclose collision avoidance action implementation plan information.

20. A space traffic management device included in a space traffic management system comprising a plurality of space traffic management devices each mounted in a business device of each of a plurality of management business operators which manage a space object flying in space, the space traffic management device performing flight safety management of the space object,
wherein the plurality of space traffic management devices are connected to each other via a communication line,
wherein the space traffic management device is provided with space traffic management rule information, a danger alarm, and a danger avoidance action implementation plan information,
wherein the space traffic management rule information is provided with
an international rule internationally accepted according to Space Law, and
a study-phase rule before international acceptance, and
wherein the study-phase rule is provided with all or some of:
crowded region identification information which identifies a crowded region;
dangerous region identification information which identifies a dangerous region where crowded regions intersect; and
traffic management rule information in a dangerous region.

21. A space traffic management system comprising a plurality of space traffic management devices each mounted in a business device of each of a plurality of management business operators which manage a space object flying in space, the space traffic management device performing flight safety management of the space object,
wherein the plurality of space traffic management devices are connected to each other via a communication line,
wherein each of the plurality of space traffic management devices comprises:
a space information recorder to record orbital information of the space object;
a danger alarm to announce approach, collision, or intrusion into a dangerous region of a space object; and
danger analysis circuitry to perform orbital analysis of the space object;

wherein the space information recorder is provided with a space object Identifier (ID) which identifies a space object, and orbital information; and a space object group ID of a space object group flying at the same nominal altitude, and orbital information, wherein the plurality of space traffic management devices have data format compatibility, share the space object ID, and share orbital information corresponding to the space object ID among business devices that comply with the public condition information, wherein the danger analysis circuitry is provided with a common algorithm or compatible algorithms, and wherein in the space traffic management system, the business devices are connected to a plurality of terminals each being provided with: a space traffic management device including the space information recorder, the danger alarm, and the danger analysis circuitry; and an interface for connection with each business device.

22. The terminal provided to the space traffic management system according to claim 21.

* * * * *